United States Patent [19]
Yoshida et al.

[11] Patent Number: 5,305,029
[45] Date of Patent: Apr. 19, 1994

[54] PROJECTOR

[75] Inventors: Kazushi Yoshida; Yasuyuki Tejima; Satoru Tachihara; Nobutaka Minefuji, all of Tokyo, Japan

[73] Assignee: Asahi Kogaku Kogyo Kabushiki Kaisha, Tokyo, Japan

[21] Appl. No.: 17,406

[22] Filed: Feb. 11, 1993

Related U.S. Application Data

[63] Continuation of Ser. No. 617,509, Nov. 23, 1990, abandoned.

[30] Foreign Application Priority Data

| Nov. 22, 1989 | [JP] | Japan | 1-304196 |
| Apr. 5, 1990 | [JP] | Japan | 2-91234 |
| Apr. 5, 1990 | [JP] | Japan | 2-91235 |
| Apr. 20, 1990 | [JP] | Japan | 2-105640 |
| Apr. 20, 1990 | [JP] | Japan | 2-105641 |

[51] Int. Cl.⁵ .............................. G03B 21/00
[52] U.S. Cl. ......................... 353/37; 353/94; 353/31
[58] Field of Search .............. 353/37, 33, 31, 30, 353/98, 99, 94, 122, 82; 358/60, 64, 231; 359/629, 630, 618, 635, 636

[56] References Cited

U.S. PATENT DOCUMENTS

| 4,376,949 | 3/1983 | Rowe | 358/60 |
| 4,432,011 | 2/1984 | Lehnert | 358/60 |
| 4,458,993 | 7/1984 | Kempf | 353/94 |
| 4,679,069 | 7/1987 | Andrea et al. | 353/30 |
| 4,730,211 | 3/1988 | Hasegawa | 358/64 |
| 4,969,730 | 11/1990 | Varder Brandt | 353/37 |
| 4,981,352 | 1/1991 | Tejima et al. | 353/31 |
| 5,010,397 | 4/1991 | Hasegawa | 358/64 |
| 5,105,265 | 4/1992 | Sato et al. | 353/31 |
| 5,181,054 | 1/1993 | Nicolas et al. | 353/37 |

FOREIGN PATENT DOCUMENTS

| 0160437 | 7/1987 | Japan | 353/30 |
| 1-267612 | 10/1989 | Japan | |

Primary Examiner—William A. Cuchlinski, Jr.
Assistant Examiner—William C. Dowling
Attorney, Agent, or Firm—Sandler Greenblum & Bernstein

[57] ABSTRACT

A projector has projecting optical systems which include image formers and projecting lenses for projecting the formed images onto a screen. The optical axes of the projecting lenses are intersected with each other on or very near the surface of the screen. The image formers are arranged such that an image surface of each image former is coincident with the screen in accordance with Scheimpflug's rule.

23 Claims, 44 Drawing Sheets

PROJECTOR

This application is a continuation of application Ser. No. 07/617,509, filed Nov. 23, 1990, now abandoned.

BACKGROUND OF THE INVENTION

1. Field of the Invention

This invention relates to a projector such as a video projector, a liquid crystal projector or the like, and particularly to a projector for projecting images of image forming means, which correspond to the colors of, for example, B (blue), G (green) and R (red), onto a screen in an overlapping fashion to form a composite multicolor image.

2. Description of the Prior Art

FIG. 71 shows the optical system of a conventional projector.

The projector in FIG. 71 has image forming means 1, 2, 3 such as a liquid crystal display (hereinafter referred to as the "LCD") or as a CRT. charts form pictures, and projecting lenses 4, 5 and 6 having optical axes Ax1, Ax2, Ax3 are perpendicular to each image forming means. The chart 1 and the lens 4 comprise a projecting optical system A. The chart 2 and the lens 5, the chart 3 and the lens 6 comprise projecting optical systems B, C. In FIG. 71, principal rays emitting from three points of each image forming means are shown.

The optical axis Ax2 of the central projecting lens 5 is perpendicular to a screen 7 onto which images are projected, while the optical axes Ax1, Ax3 of the projecting lenses 4, 6 intersect with the optical axis Ax2 of the projecting lens 5 on the screen and are not perpendicular to the screen 7.

It is defined here that the optical axis Ax2 is the x-axis, the crossline between a plane including three optical axes and the screen is the y-axis, and the direction perpendicular to the y-axis on the screen is the z-axis.

FIG. 72 shows an optical path of the projecting optical system C of FIG. 71. The luminous flux as shown in this Figure is converged most in the projecting lens 6.

However, the above-mentioned conventional projector has problems since images formed by the projecting optical systems A, C are angled with respect to the screen. As a result, distortion is generated and a focus error of an image is generated in the peripheral portion in the y-axis direction.

Next, the degree of focus error in the above-mentioned construction, will be described concretely by applying concrete numerical figures.

The image forming means is an LCD of three inches size. The display area is about 46 mm×61 mm. The LCD is provided on the periphery of the display area with a lead frame or a substrate for mounting a drive IC. In this example, the substrate measures 160 mm in the width direction. When, therefore, the LCDs are arranged side by side as shown in FIG. 71, the distance between the centers of the adjacent LCDs is a minimum of 160 mm. Also, it is arranged such that the focal lengths of the projecting lenses 4, 5, 6 are 75 mm, the magnification is −15.5 times, the distances from the image forming means to the corresponding projecting lenses are 79.8 mm, the distances from the projecting lenses to the screen are 1237.5 mm, and the distances from the central projecting lens 5 to the peripheral projecting lenses 4, 6 are 160 mm, respectively. According to this arrangement, the angle formed between the optical axis Ax2 of the central projecting lens 5 and the optical axes Ax1, Ax3 of the projecting lenses 4, 6 is 7.4°.

FIG. 73 shows a distortion and spot diagram of the image when lattice charts are projected to the screen by the projecting optical systems B, C. Since the spot diagram appears symmetrically with reference to y-axis, only one side is shown in the Figure.

A lattice indicated by broken lines in the Figure is a image projected by the system C, while the lattice indicated by a solid line is an image projected by the system B. Since the projecting optical system C has such distortion, a point expressed by the coordinate $(y, z)=(30.5, 22.9)$ on the LCD 12 is imaged at a point of $(y, z)=(-454.0, -337.7)$ on the screen, while a point expressed by the coordinate $(y, z)=(-30.5, 22.9)$ on the LCD 12 is imaged at a point $(y, z)=(501.1, -372.7)$ on the screen. If there were no distortion of the image, the point of the LCDs should be imaged at points $(y, z)=(\pm 472.4, -354.3)$ on the screen.

The dots in the Figure show dispersion of luminous flux on each point. If the image plane coincides with the screen, that is, if there is no focus error at any points, luminous flux is focused into one point. The size of the dot corresponds to the focus error of the image at the relevant points. FIG. 73 shows the dispersion of the luminous flux enlarged by 20 times.

A projection image projected by the other peripheral projecting optical system A generates a focus error and a line distortion symmetric with the image formed by the projecting optical system C reference to the z-axis.

In order to reduce the focus error of an image, there has also been proposed a projector shown in the type of FIG. 74.

The luminous flux having the components R, G and B and coming from the charts 1, 2 are 3 are overlapped by a dichroic prism 8 and projected to the screen 7 by the projecting lens 9. In order to overlap the luminous flux, a dichroic mirror is also used besides the dichroic prism 8.

According to this method, since the luminous flux from each chart is projected onto the screen 7 by a single projecting lens, no focus error and distortion are generated.

However, in the construction shown in FIG. 74, the parallel luminous flux is made incident to the dichroic prism, and the prism is required to be the same size as the chart. If, therefore, the size of the chart is made large in order to improve the resolution of the image the prism and the projecting lens must also be large and high cost results.

The same problem is present when a dichroic mirror is used.

SUMMARY OF THE INVENTION

This invention has been developed to solve the above-mentioned problems. It is therefore a general object of the invention to provide a projector which is capable of preventing the focus error of each image on the screen and avoiding the cost increase of the apparatus by not requiring the diameter of the projecting lens to be made large.

DETAILED DESCRIPTION OF THE EMBODIMENTS

The present invention will now be described with reference to the accompanying drawings.

Embodiment 1

Figure 1:
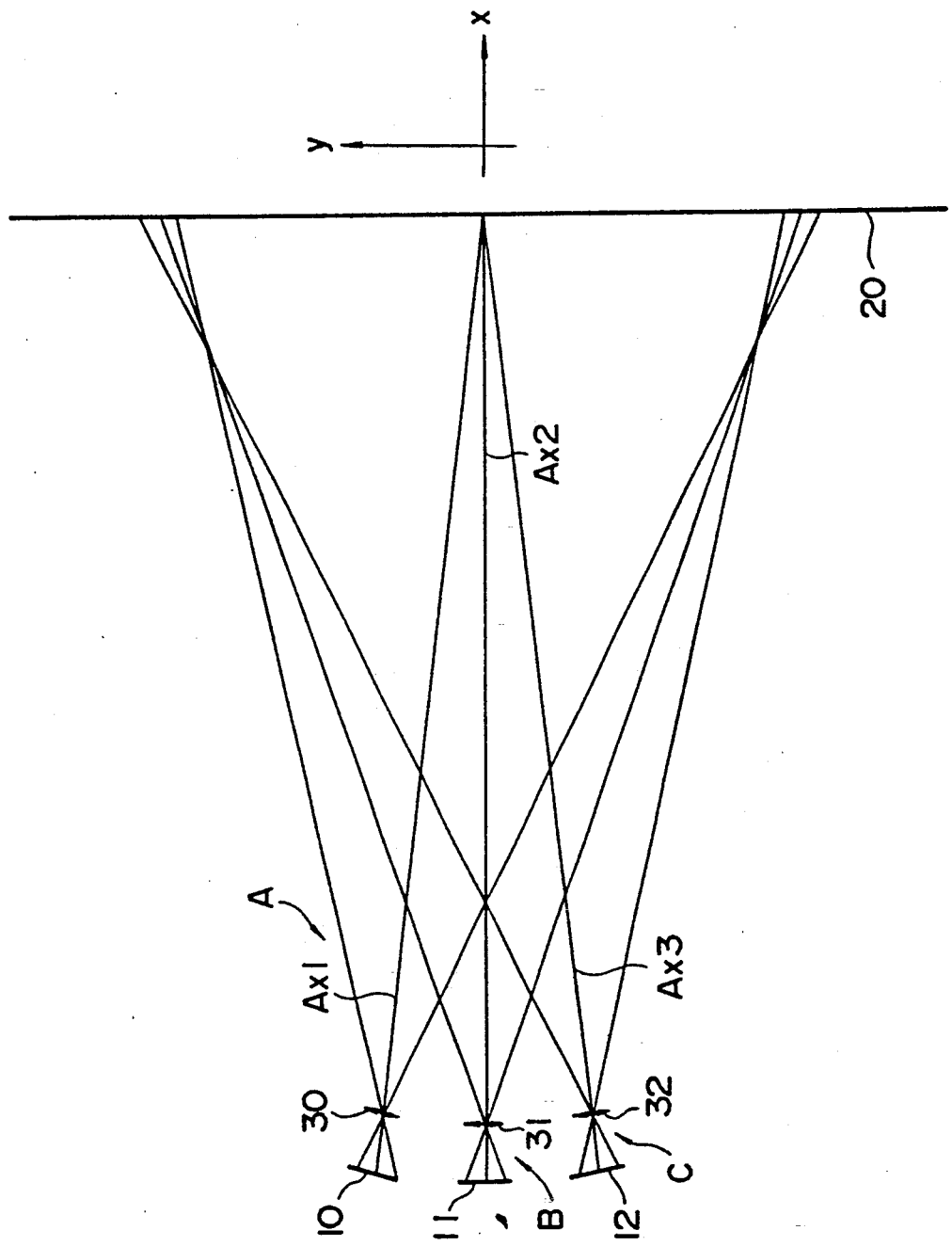
FIG. 1 is a schematic view of a projector of Embodiment 1 according to the present invention.
Figure 2:
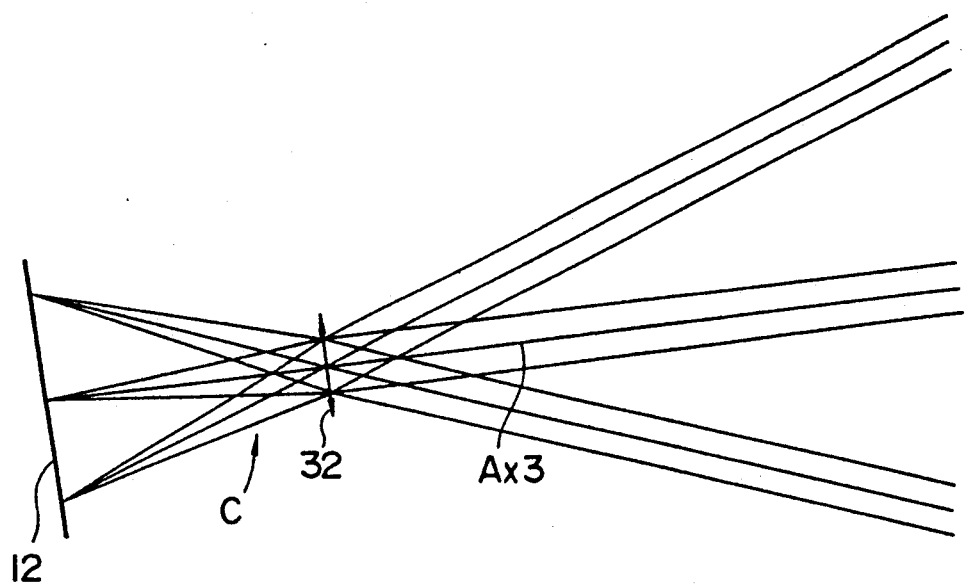
FIG. 2 is an enlarged view showing one of the peripheral projecting optical systems in FIG. 1.
Figure 3:
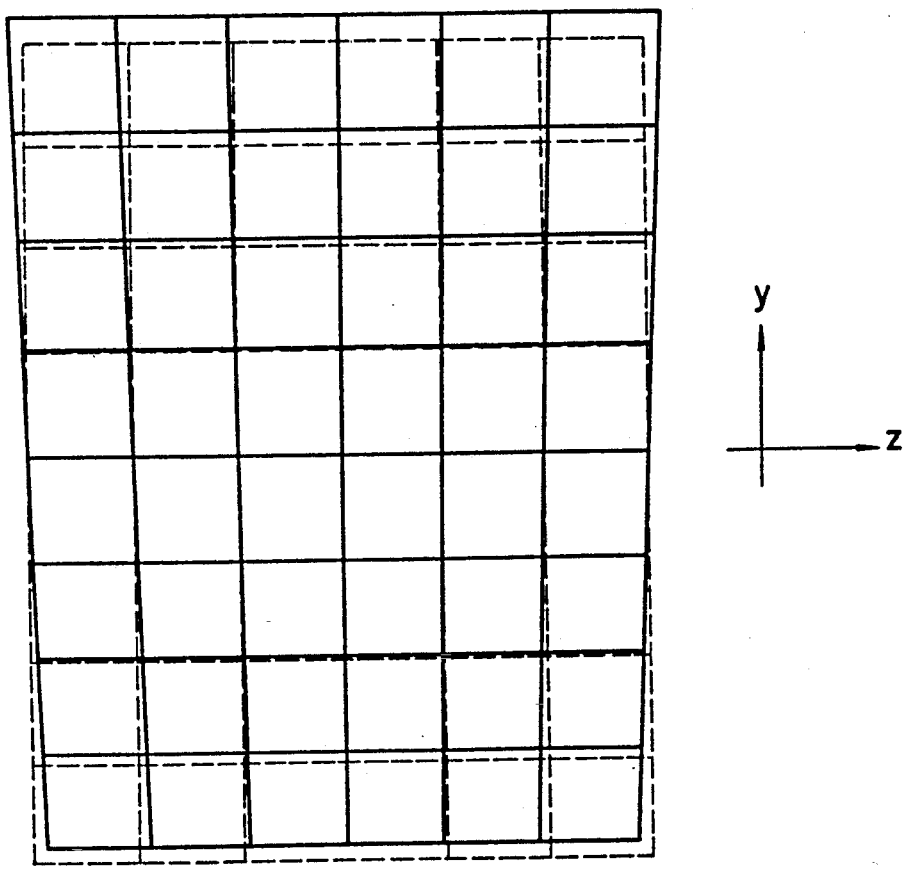
FIG. 3 is a schematic view showing the distortion of a projection pattern formed by the optical system of FIG. 2.

FIGS. 1 to 3 shows the projector of Embodiment 1.

The projector, as shown in FIG. 1, is a color projector having three projecting optical systems A, B and C and comprises three LCDs 10, 11 and 12 providing charts for forming images corresponding to colors RGB, and three projecting lenses 30, 31 and 32 disposed corresponding to the LCDs and adapted to project images onto a screen 20.

Disposed behind the LCDs are light sources (not shown) for the colors RGB. By luminous flux corresponding to the colors transmitted through the LCDs, images are formed onto the screen in an overlapping fashion through the corresponding projecting lenses.

In the description of the embodiment, one must keep in mind that the projecting lenses are ideal lenses in which the distance between two principal points is 0 and which have no aberration, and the three lenses mentioned are mutually compatible with one another. In FIG. 1, three principal rays are shown for each LCD.

The optical axis Ax2 of the central projecting lens 31 is vertical or perpendicular to the screen 20, while the optical axes Ax1, Ax3 of the projecting lenses 30, 32 intersect with the optical axis Ax2 of the projecting lens 31 at one point on the screen 20.

The LCD 11 of the central projecting optical system B is disposed so that it is vertical or perpendicular to the optical axis Ax2 of the projecting lens 31, while perpendicular lines of the LCDs 10, 12 of the peripheral projecting optical systems A, C are tilted with respect to the optical axes Ax1, Ax3 so that the image surfaces coincide with the screen 20 in accordance with the Scheimpflug rule.

The screen 20 is of a known structure provided with a Fresnel lens on its projecting lens side and with a lenticular pattern on its side that is visible to the naked eye. The directions of rays of light coming from the charts are orderly arranged with the Fresnel surface and the angle image forming means of view field being adjusted by the lenticular pattern.

It is defined here, as in the case of the prior art description, that the optical axis Ax1 is x-axis, the crossline between a plane including three optical axes and the screen is the y-axis, and the direction perpendicular to the y-axis on the screen is the z-axis.

Concrete numerical examples will now be described.

In the embodiments which will be described hereinafter, the image forming means is an LCD of three inches size, the LCD of which a display area of which is about 46 mm×61 mm, and a substrate of which is 160 mm in the width direction.

| focal length of the projecting lenses | 75 mm |
|---|---|
| magnification | −15.5 times |
| distance from the chart to the lens | 79.8 mm |
| distance from the lenses to the screen | 1237.5 mm |
| distances between the central projecting lens 31 and the peripheral projecting lenses 30, 32 | 160 mm |

The perpendicular lines of the LCDs 10, 12 form an angle of 0.5° with the optical axes Ax1, Ax3 of the projecting lenses 30, 32, and the angle formed between the optical axis Ax2 of the central projecting lens 31 and the optical axes Ax1, Ax3 of the peripheral projecting lenses 30, 32 is 7.4°.

FIG. 2 is a view showing one of the optical systems of FIG. 1, i.e., the peripheral projecting optical system C in its enlarged scale together with the luminous flux emitted thereby.

FIG. 3 is a view showing the distortion of an image which is formed when lattice charts are projected onto the screen by the peripheral projecting optical systems B, C.

One pattern, indicated by broken lines in the Figure, is a projected image by the system B, while the other pattern, indicated by a solid line, is the same image by the system C. Since the projecting optical system C has the distortion, the coordinate (y, z)=(30.5, 22.9) on the LCD 12 is imaged at a point of (y, z)=(−452.6, −336.6) on the screen, while the coordinate (y, z)=(−30.5, 22.9) on the LCD 12 is imaged at a point (y, z)=(502.8, −374.0) on the screen. If the projecting optical system C has no distortion, these points should be imaged at points (y, z)=(±472.4, −354.3) on the screen.

Figure 73:
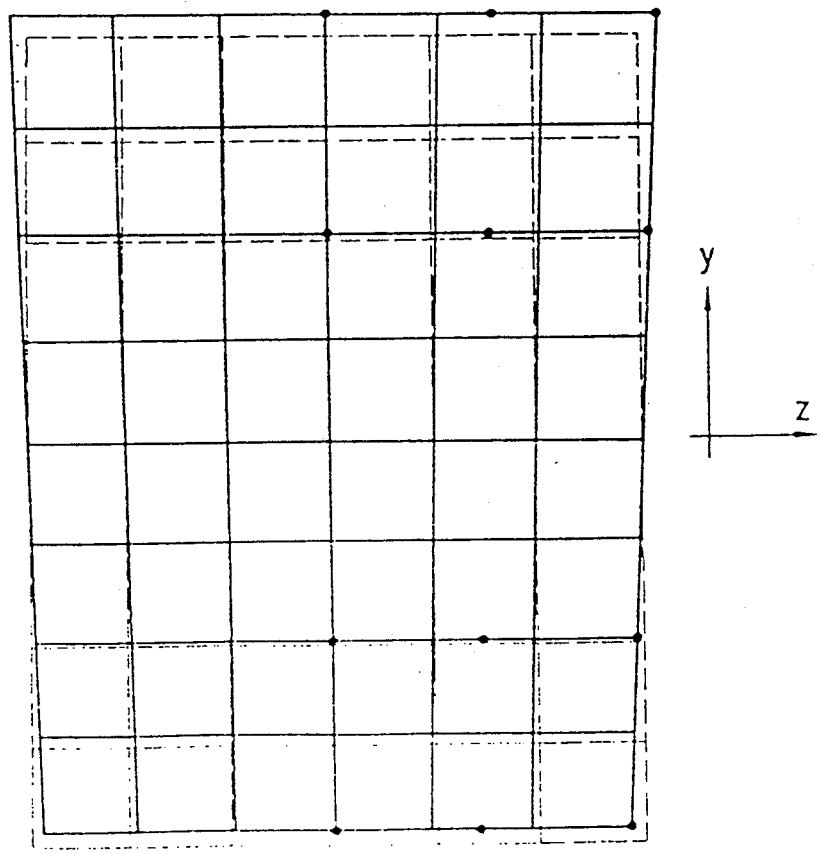
FIG. 73 is a schematic view showing the distortion of a projection pattern formed by the optical system of FIG. 71.

In the construction of this embodiment, since the image surface coincides with the screen and the luminous flux from one point on the LCD 12 is imaged at one point on the screen, the irregularity of the spots shown by dots in FIG. 73 is not detected.

An image formed by the central projecting optical system B is projected onto the screen as a regular image without focus error and distortion, while an image formed by the other peripheral projecting optical system A is projected onto the screen with a distortion symmetric with the image formed by the peripheral projecting optical system C.

Embodiment 2

Figure 4:
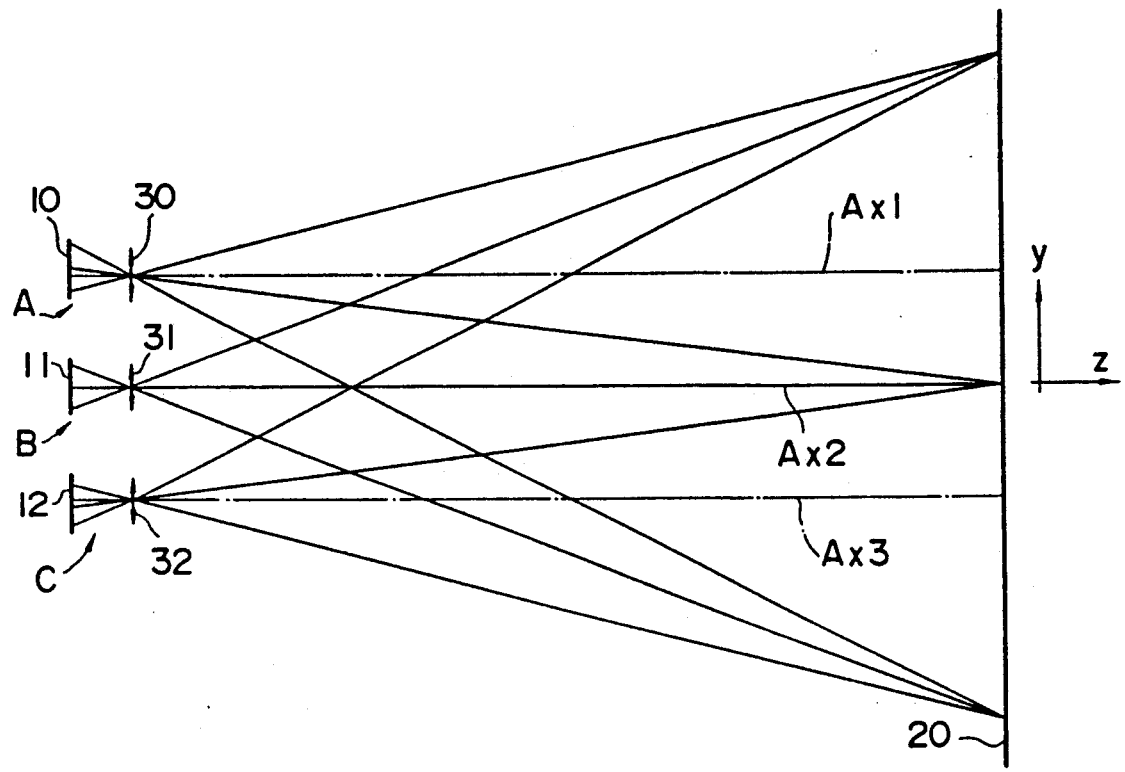
FIG. 4 is a schematic view of a projector of Embodiment 2 according to the present invention.
Figure 5:
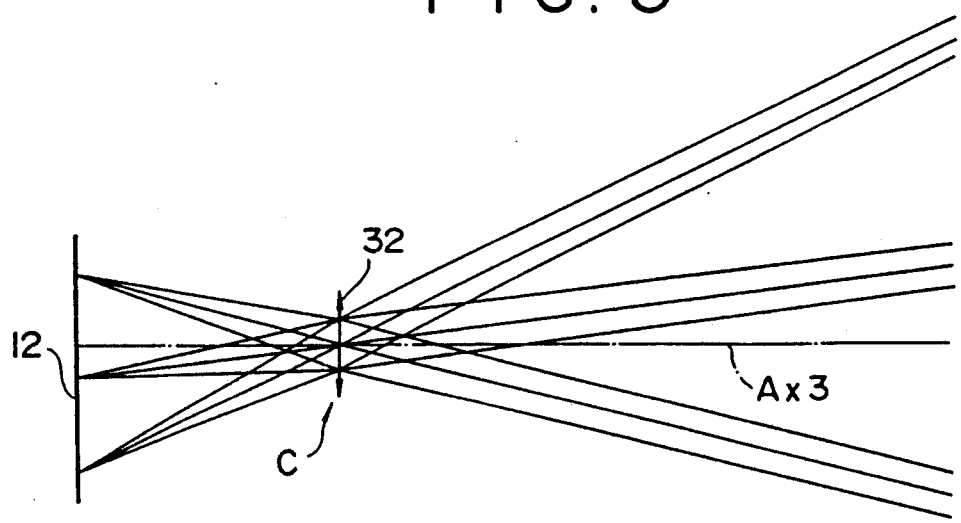
FIG. 5 is an enlarged view showing one of the peripheral projecting optical systems in FIG. 4.

FIGS. 4 and 5 show Embodiment 2 of the projector according to the present invention. Identical materials to those of Embodiment 1 are denoted by identical reference numerals in the embodiments as will be described hereinafter and duplicate description will be omitted.

In Embodiment 1, the projector has an inconvenience that a trapezoidal distortion of an image cannot be eliminated, although the focus error can successfully be eliminated. There thus shown a construction in Embodiment 2 wherein both the focus error and trapezoidal distortion can be reduced.

As is shown in FIG. 4, all of the optical axes Ax1, Ax2, Ax3 of the projecting lenses 30, 31, 32 are perpendicular to the screen 20. Also, each of the LCDs 10, 11, 12 is disposed so that it is perpendicular to the optical axis of the corresponding projecting lens. In the central projecting optical system B, the LCD 11 is symmetrically arranged with reference to the optical axis Ax2, while in the peripheral projecting optical systems A, C, the LCDs 10, 12 are disposed such that they are shifted in the y-axis direction relative to the optical axes Ax1, Ax3 of the corresponding projecting lenses.

The numerical examples of Embodiment 2 will be described.

| focal length of the projecting lenses | 75 mm |
|---|---|
| magnification | −15.5 times |
| distances between the central projecting lens 31 and the peripheral projecting lenses 30, 32 | 160 mm |

FIG. 5 is a view showing the peripheral projecting optical system C in its enlarged state together with the luminous flux. The shift amount of the LCD 12 relative to the optical axis Ax3 is 10.3 mm.

The coordinate expressed by $(y, z) = (\pm 30.5, 22.9)$ on each LCDs 10, 12 are imaged at points expressed by $(y, z) = (\pm 472.4, -354.3)$ on the screen. This coordinate is the same to the projecting point by the projecting optical system B.

According to Embodiment 2, both the focus error and trapezoidal distortion are obviated.

In the construction of Embodiment 2, since the luminous flux from the LCDs 10, 12 of the peripheral projecting optical systems A, C is made incident to the projecting lenses 30, 32 at angles, the projecting lenses 30, 32 of the peripheral projecting optical systems A, C are required to have larger image circles than the projecting lens 31 of the central projecting optical system B. Therefore, if the projecting lenses are not made all the same, in other words, if a lens of a small image circle is used as the projecting lens 31 and lenses of a large image circle are used as the projecting lenses 30, 32, amount of cost of the lenses can be reduced.

Quality of the image is deteriorated first from the peripheral portion due to decrease of light quantity. The expression "image circle" refers to a circle which serves as a border line between a portion where the quantity of an image is sufficiently clear for use in a projector and another portion where the quality of an image is not clear enough to satisfy the requirements for use in a projector.

Embodiment 3

Figure 6:
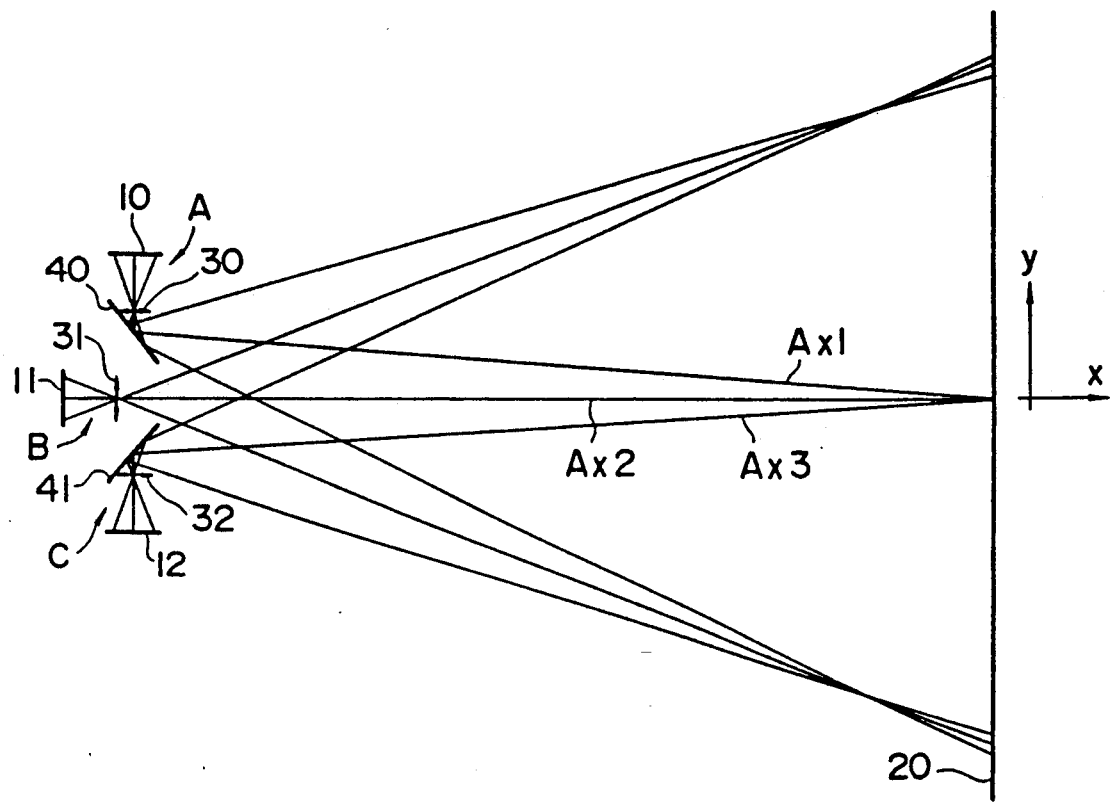
FIG. 6 is a schematic view of a projector of Embodiment 3 according to the present invention.
Figure 7:
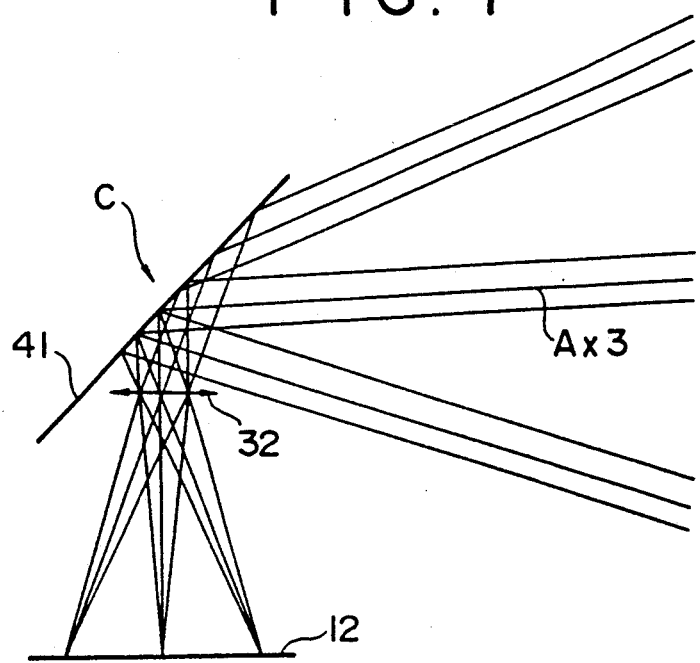
FIG. 7 is an enlarged view showing one of the peripheral projecting optical systems in FIG. 6.
Figure 8:
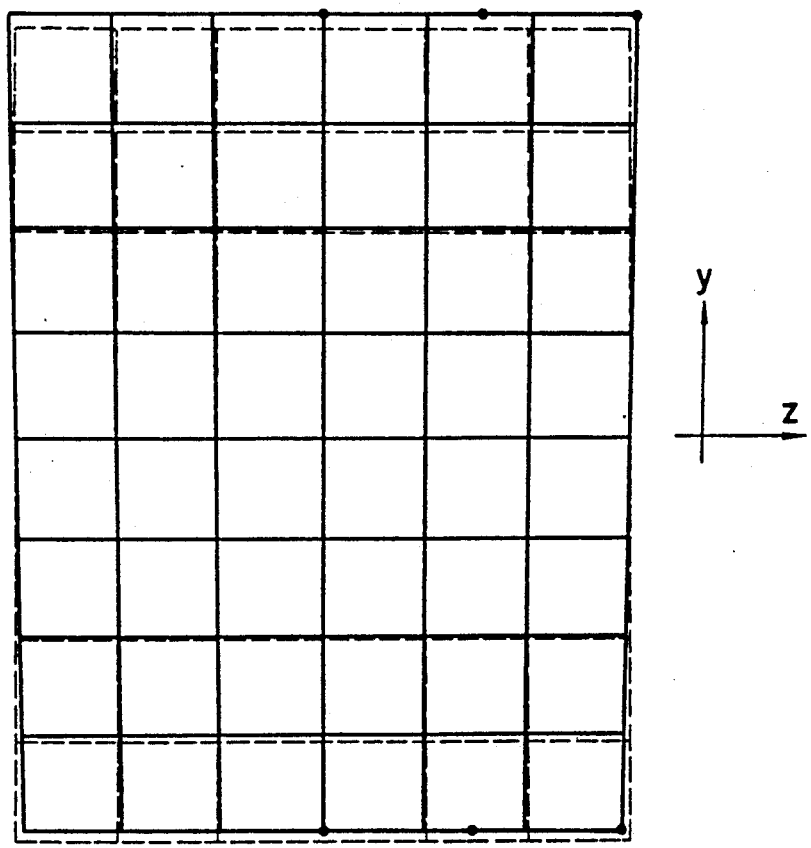
FIG. 8 is a schematic view showing the distortion of a projection pattern formed by the optical system of FIG. 7.

FIGS. 6 to 8 show Embodiment 3 of the projector according to the present invention.

In the methods of Embodiment 1 and Embodiment 2, when the width of the LCD, in particular, becomes large, the distance between the adjacent displays must be set large. Accordingly, the angle between a ray projected towards the screen from the center of a peripheral chart (i.e., 10 or 12) and the x-axis (Ax2) becomes large, and the distance between the projecting lenses becomes large.

Accordingly, the angles of rays of light are different for the colors RGB when the rays of light are projected from the screen due to difference of the angle of incidence of the rays of light relative to the screen. This means that color of the screen looks different depending on the direction from which the screen is seen, for example, in one case the image looks somewhat red when viewed from one direction, while it looks somewhat blue when viewed from the other direction.

Also, in the method of Embodiment 2, the shift amount of the LCD of the peripheral projecting optical system becomes large, and a projecting lens having a large image circle becomes necessary.

In Embodiment 3 since the mirror is used, the difference of the angle of incidence is reduced to be small even in case where the width of the LCD is large.

This projector, as shown in FIG. 6, includes the central projecting optical system B, which has a projecting lens 31 of which the optical axis is perpendicular to the screen 20, and the peripheral projecting optical systems A, C which are disposed at both sides in symmetrical relation with the central projecting optical system B placed therebetween. The projecting optical systems A, C have mirrors 40, 41 for deflecting the optical path towards for the screen 20. If the mirrors 40, 41 are not disposed, the optical axes Ax1, Ax2, Ax3 of the projecting lens 30, 31, 32 would intersect at a point near the projecting lens 31. Moreover, it is acceptable that the optical axes do not intersect at one point but they come close to one another.

Figure 71:
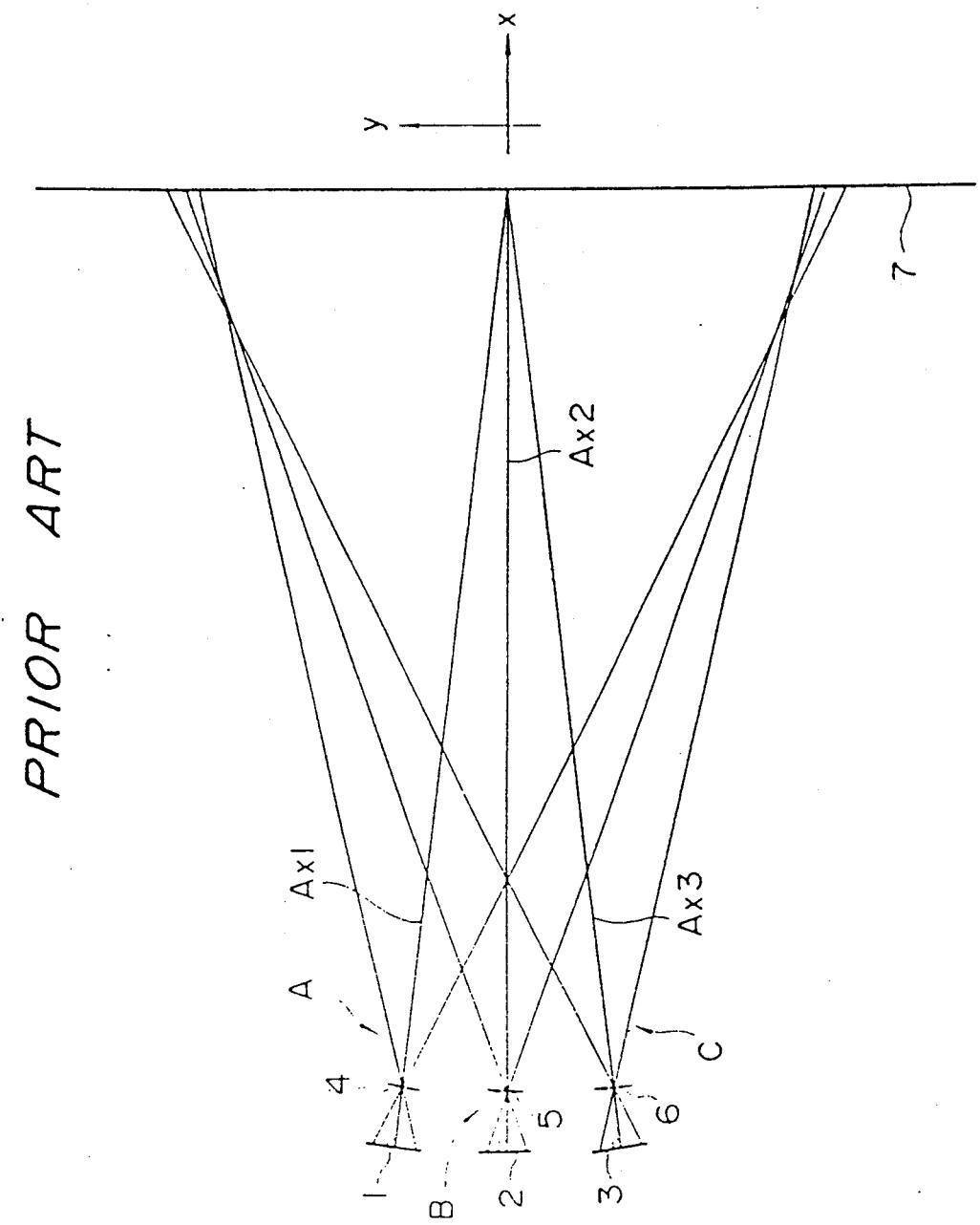
FIG. 71 is a view showing an optical system of a conventional projector.
Figure 72:
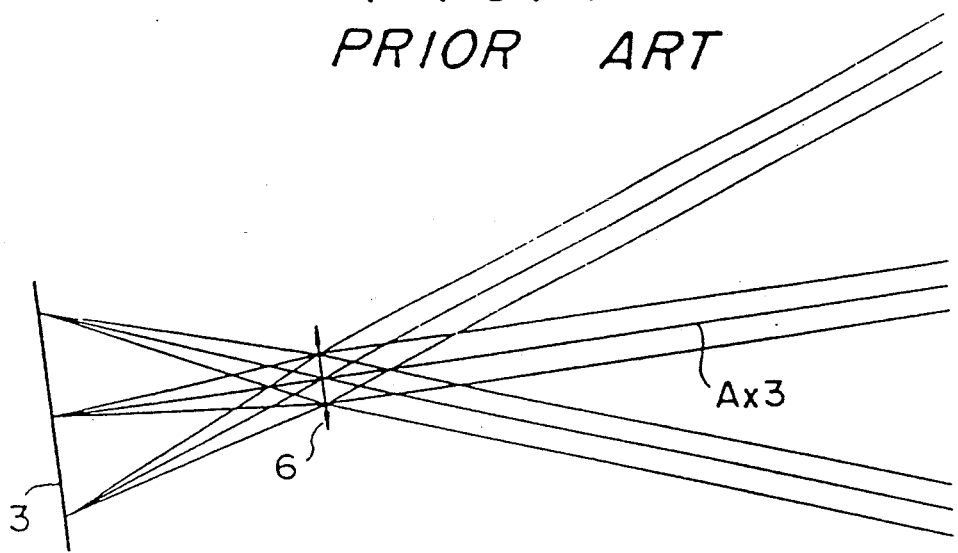
FIG. 72 is an enlarged view of the light path overlapping portion in FIG. 71.

The projector shown in FIG. 6 is appropriate to add the mirrors into the construction of FIG. 71, the optical axis Ax2 and the optical axes Ax1, Ax3 deflected by the mirrors are intersected at one point on the screen 20. Each LCD is perpendicular to each optical axis of the projecting lens.

The projector of FIG. 6 is equivalent to the construction of the prior art shown in FIG. 71 with a mirror added. Deflected optical axes are intersected at one point on the screen 20 and the LCDs thereof are perpendicular to the respective optical axes.

The numerical example of Embodiment 3 will now be described.

| focal lengths of the projecting lenses | 75 mm |
|---|---|
| magnification | −15.5 times |
| distances from the image forming means to the lenses | 79.8 mm |
| distances from the mirrors to the lenses | 25 mm |
| distances from the mirrors to the screen | 1212.5 mm |

Where the optical axes Ax1, Ax3 of the projecting lenses 30, 32 are extended from the screen 20 side disregarding the mirror, the lengths of the perpendicular lines drawn from the center of the central projecting lens 31 toward the extended optical axes are 80 mm. The angle formed between the optical axis Ax2 of the central projecting lens 11 and the optical axes Ax1, Ax3 of the deflected peripheral projecting lenses 10, 12 is 3.7°.

FIG. 7 is a view showing one of the optical systems of FIG. 6, i.e., the peripheral projecting optical system C in its enlarged scale together with a luminous flux. FIG. 8 is a view showing the distortion and spot diaphragm of the image when the lattice charts are projected onto the screen by the projecting optical system B, C.

One pattern, indicated by broken lines in the Figure, is a projected image by the system B, while the other pattern, indicated by a solid line, is the same by the system C. Since the projecting optical system C has the distortion, the coordinate $(y, z) = (30.5, 22.9)$ on the LCD 12 is imaged at a point of $(y, z) = (-452.0, -345.8)$ on the screen, while the coordinate $(y, z) = (-30.5, 22.9)$ on the LCD 12 is image at a point (y, z)=(485.4, −363.3) on the screen. If the projecting optical system C has no distortion, these points should be imaged at points (y, z)=(±472.4, −354.3) on the screen.

The dots in the Figure show dispersion of luminous flux on each point. FIG. 8 shows the dispersion of the spots in an enlarged state by twenty times.

The prior art shown in FIG. 71 and Embodiment 6 are different only in difference of angle of the optical axes of the respective projecting lens. Comparison between FIG. 73 and FIG. 8 reveals the fact that reduction of the difference in angle reduces both the distortion and focus error of the image.

An image formed by the central projecting optical system B is projected on to the screen as a regular image which has no focus error and no distortion, while an image formed by the other peripheral projecting optical system A is projected onto the screen with a distortion symmetric with the image formed by the peripheral projecting optical system C.

According to the construction of Embodiment 3, the optical axes of the projecting lenses directed toward the screen can be mutually approached irrespective of the size of the LCD, and the difference in incident angle of the luminous flux of the projecting optical systems is reduced small relative to the screen. As a result, the color shift caused by the visual recognizing direction of the screen is reduced. Moreover, the focus error and trapezoidal distortion become small.

If the mirrors 40, 41 are pivotable, even when the screen is moved and the relative position of the image is changed on the screen, the image formed by the peripheral projecting optical systems can be made coincident with the image formed by the central projecting optical system. The mirrors 40, 41 may be pivoted independently. If there is a synchronizing mechanism for causing two mirrors to pivot by the same angle, easier adjustment can be obtained.

Embodiment 4

Figure 9:
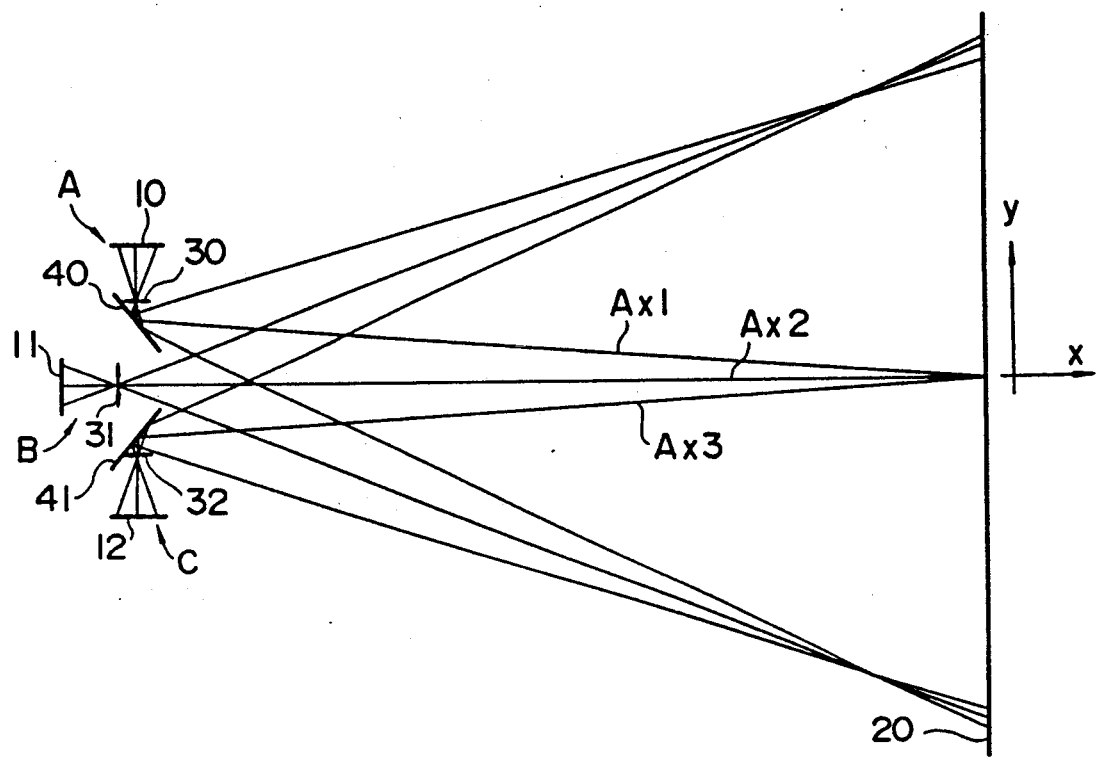
FIG. 9 is a schematic view of a projector of Embodiment 4 according to the present invention.
Figure 10:
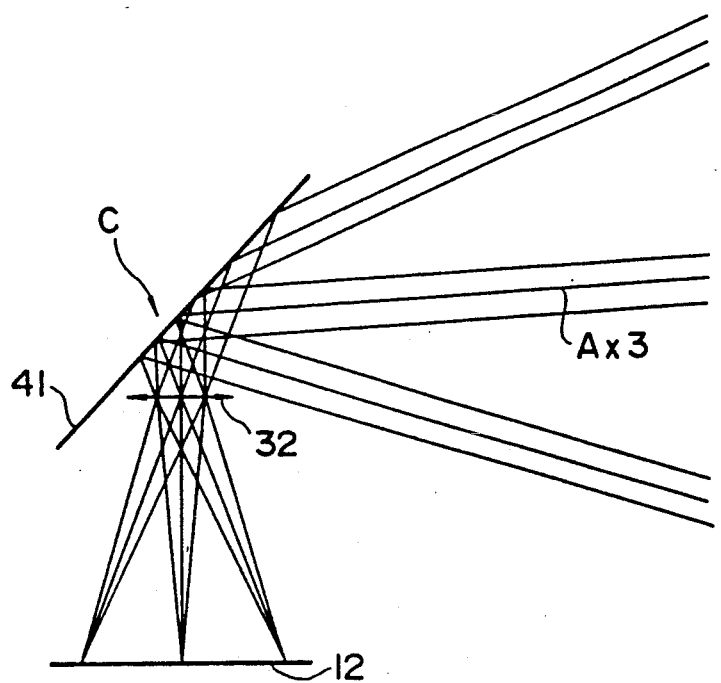
FIG. 10 is an enlarged view showing one of the peripheral projecting optical systems in FIG. 9.
Figure 11:
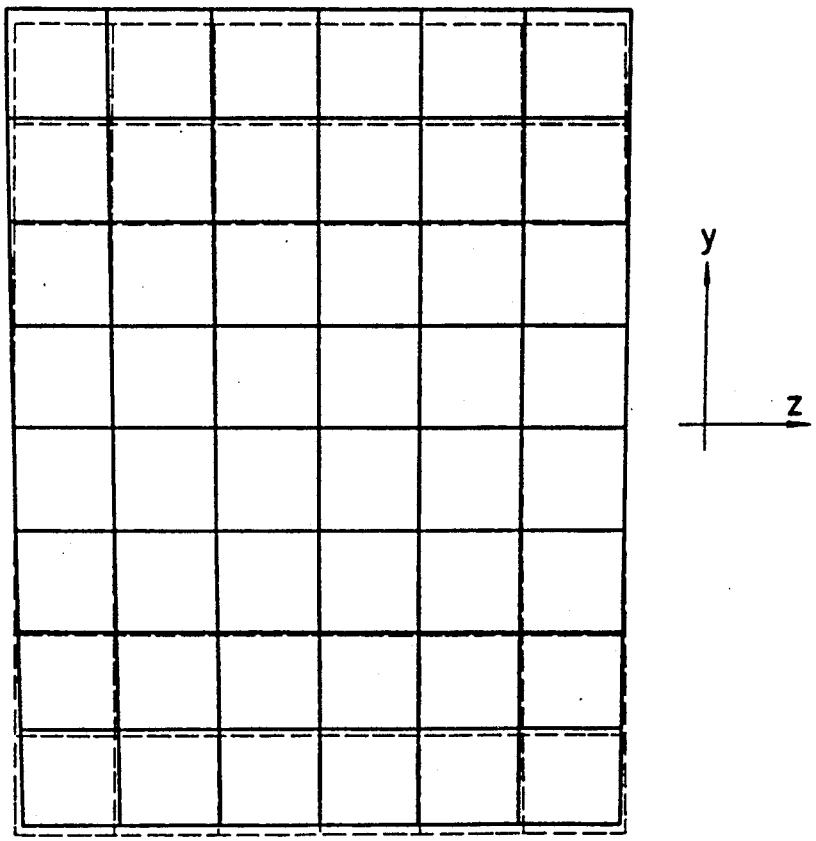
FIG. 11 is a schematic view showing the distortion of a projection pattern formed by the optical system of FIG. 10.

FIGS. 9 to 11 show the projector of Embodiment 4.

This projector has three projecting optical systems A, B, C as in Embodiment 3, and the mirrors 40, 41 are provided to the peripheral projecting optical systems A, C.

The projector of FIG. 9 is equivalent to the construction of Embodiment 1 shown in FIG. 1 with mirrors. Deflected optical axes are intersected at one point on the screen 20 and the LCDs thereof are image forming means to the optical axis Ax2, while the LCDs 10, 12 are inclined relative to the optical axes Ax1, Ax3.

The numerical example for Embodiment 4 will now be described.

| | |
|---|---|
| focal lengths of the projecting lenses | 75 mm |
| magnification | −15.5 times |
| distances from the image forming means to the lenses | 79.8 mm |
| distances from the mirrors to the lenses | 25 mm |
| distances from the mirrors to the screen | 1212.5 mm |

In the case where the optical axes Ax1, Ax3 of the peripheral lenses 30, 32 are extended from the screen 20 side disregarding the mirrors, the lengths of the perpendicular lines drawn from the center of the central projecting lens 31 toward the extended optical axes are 80 mm.

Also, the LCDs 10, 12 of the peripheral projecting optical systems A, C are disposed so that perpendicular lines of the LCDs is inclined by 0.24° relative to the optical axes Ax1, Ax3, and the angle formed between the optical axis Ax2 of the central projecting lens 11 and the optical axes Ax1, Ax3 of the peripheral projecting lenses 10, 12 becomes 3.7°.

The angle of the mirrors 40, 41 relative to the optical axis is 46.7°.

FIG. 10 is a view showing one of the optical systems of FIG. 9, i.e., the peripheral projecting optical system C in its enlarged scale together with a luminous flux.

FIG. 11 is a view showing the distortion of an image which is formed when lattice charts are projected onto the screen by this peripheral projecting optical system B, C.

One pattern, indicated by broken lines in the Figure, is a projected image by the system B, while the other pattern, indicated by a solid line, is the same by the system C. Since the projecting optical system C has the distortion, the coordinate (y, z)=(30.5,22.9) on the LCD 12 is imaged at a point of (y, z)=(−461.3, −345.3) on the screen, while the coordinate (y, z)=(−30.5,22.9) on the LCD 12 is imaged at a point (y, z)=(486.2, −363.9) on the screen. If the projecting optical system C has no distortion, these points should be imaged at points (y, z)=(± 472.4, −354.3) on the screen.

In the construction of this embodiment, since the image surface is coincident with the screen and the luminous flux from one point on the LCD 12 is imaged at one point on the screen, the dispersion of the spots shown by dots in FIG. 8 is not detected.

Embodiment 5

Figure 12:
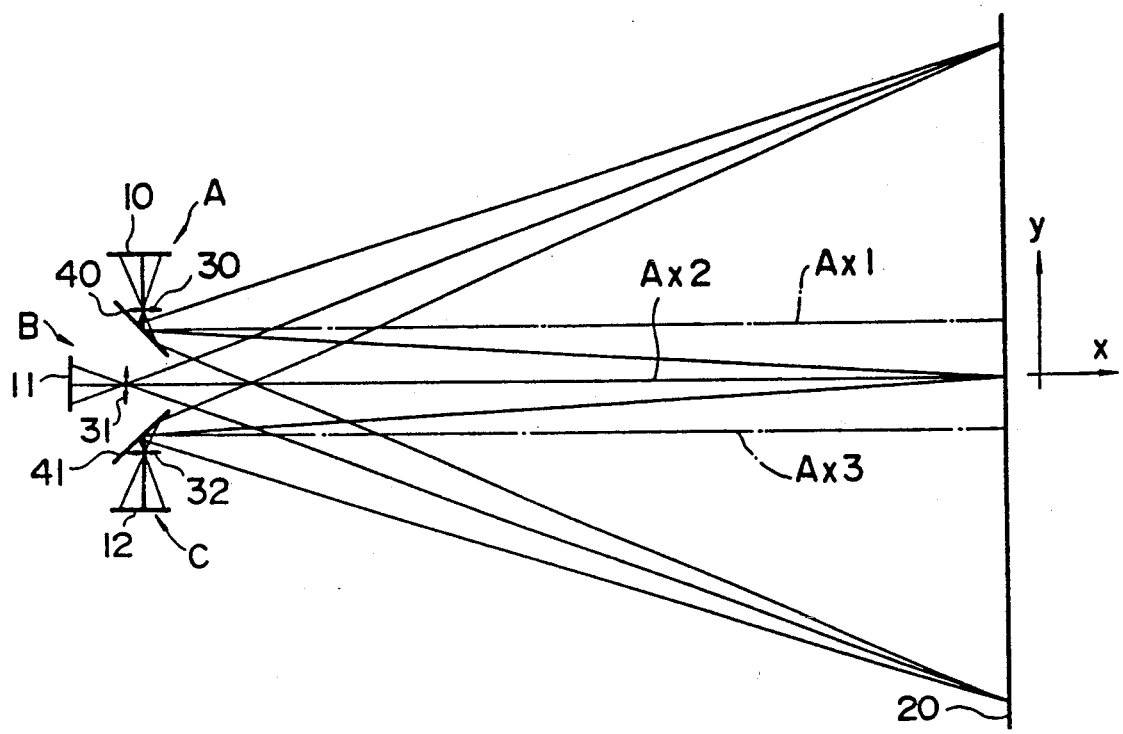
FIG. 12 is a schematic view of a projector of Embodiment 5 according to the present invention.
Figure 13:
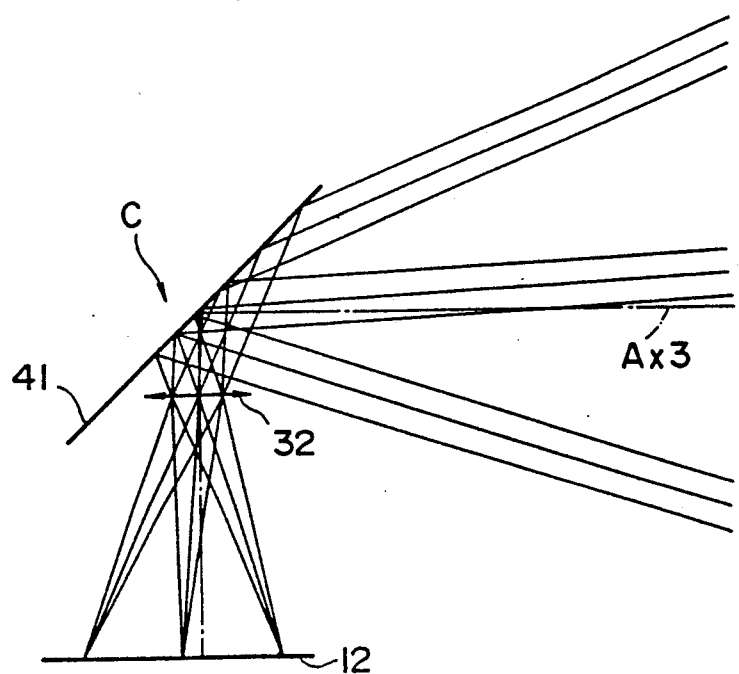
FIG. 13 is an enlarged view showing one of the peripheral projecting optical systems in FIG. 12.

FIGS. 12 and 13 show the Embodiment 5 of the projector according to the present invention.

This projector has three projecting optical systems A, B, C as in Embodiment 2 and the mirrors 40, 41 are provided to the peripheral projecting optical systems A, C.

The projector of FIG. 12 is equivalent to the construction of Embodiment 2 in FIG. 4 with mirrors added. Deflected optical axes are vertical to the screen 20, while the LCDs are vertical to the optical axis of the projecting lens.

In the central projecting optical system B, the LCD 11 is symmetrically arranged with reference to the optical axis Ax2, while in the peripheral projecting optical systems A, C, the LCDs 10, 12 are shifted relative to the optical axes Ax1, Ax3 of the corresponding projecting lenses.

The numerical examples of Embodiment 5 will be described.

| | |
|---|---|
| focal length of the projecting lenses | 75 mm |
| magnification | −15.5 times |
| distances from the image forming means to the lenses | 79.8 mm |
| distances from the mirrors to the lenses | 25 mm |
| distances from the mirrors to the screen | 1212.5 mm |

In case the optical axes Ax1, Ax3 of the peripheral lenses 30, 32 are extended from the screen 20 side disregarding the mirrors, the lengths of the perpendicular lines drawn from the center of the central projecting lens 31 toward the extended optical axes are 80 mm.

The angle of the mirrors 40, 41 relative to the optical axis is 45.0°.

FIG. 13 is a view showing one of the optical systems of FIG. 12, i.e., the peripheral projecting optical system C in its enlarged scale together with a luminous flux.

According to the above-mentioned construction, the color shift that is dependent on the visual recognizing direction by minimizing the difference in angle of incidence of the luminous flux of the respective projecting optical systems.

Also, since the images formed by the respective projecting optical systems are overlapped on the regular position as in the case of Embodiment 2 and projected in that state, the focus error and distortion of the image can be avoided.

Embodiment 6

Figure 14:
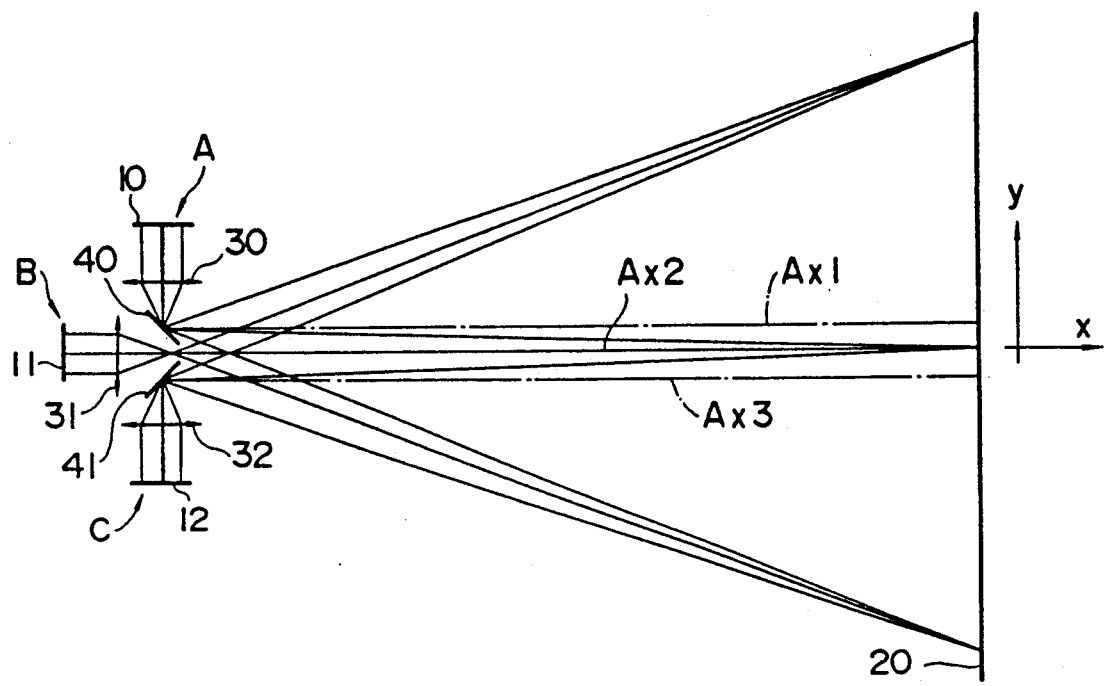
FIG. 14 is a schematic view of a projector of Embodiment 6 according to the present invention.
Figure 15:
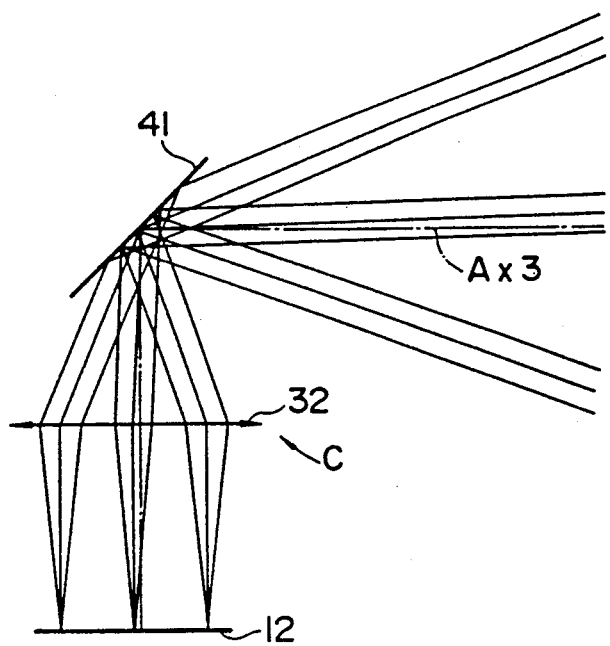
FIG. 15 is an enlarged view showing one of the peripheral projecting optical systems in FIG. 14.

FIG. 14 and FIG. 15 show Embodiment 6 of the projector according to the present invention.

This projector is a lens in which the exit pupil is located behind the lens such as, for example, a telecentric lens on the side of the image forming means.

In the projecting lens of Embodiments 3 to 5, since the exit pupil, where the luminous flux is most converged, is located within the lens, the luminous flux spreads abruptly after it transmits through the lens. In order to prevent the vignetting of the luminous flux of the central projecting optical system, the mirror is required to be disposed far from the lens.

However, if a lens in which the exit pupil is located behind the lens such, for example, a telecentric projecting lens, is used, the luminous flux is converged after the luminous flux transmits through the lens. Accordingly, even when the mirrors 40, 41 are brought to be proximate to the central projecting optical system(s), the luminous flux of the central projecting optical system is not vignetted and the optical axes of the respective projecting optical systems can be brought to be more proximate to each other.

In this embodiment, the deflected optical axes of the projecting lens are perpendicular to the screen 20 and the LCDs 11 are perpendicular to the optical axis.

In the central projecting optical system B, the LCD 11 is symmetrically arranged with reference to the optical axis Ax2, while in the peripheral projecting optical systems A, C, the LCDs 10, 12 are shifted relative to the optical axes Ax1, Ax3 of the corresponding projecting lenses.

The numerical examples of Embodiment 6 will be described.

| | |
|---|---|
| focal length of the projecting lenses | 80 mm |
| magnification | −15.5 times |
| distances from the image forming means to the lenses | 85.2 mm |
| distances from the lenses to the mirrors | 80 mm |
| distances from the mirrors to the screen | 1212.5 mm |

In case the optical axes Ax1, Ax3 of the peripheral lenses 30, 32 are extended from the screen 20 side disregarding the mirrors, the lengths of the perpendicular lines drawn from the center of the central projecting lens 31 toward the extended optical axes are 40 mm.

The angle of the mirrors 40, 41 relative to the optical axis is 45'.

FIG. 15 is a view showing one of the optical systems of FIG. 14, i.e., the peripheral projecting optical system C in its enlarged scale together with a luminous flux.

According to the above-mentioned construction, the difference in angle of the luminous flux directing toward the screen 20 from the respective projecting optical systems can be minimized, and the color shift depending on the visually recognizing direction can be reduced. Moreover, the distortion of the image and focus error can be avoided. Also, the mirror becomes smaller compared with Embodiments 3 to 5.

Embodiment 7

Figure 16:
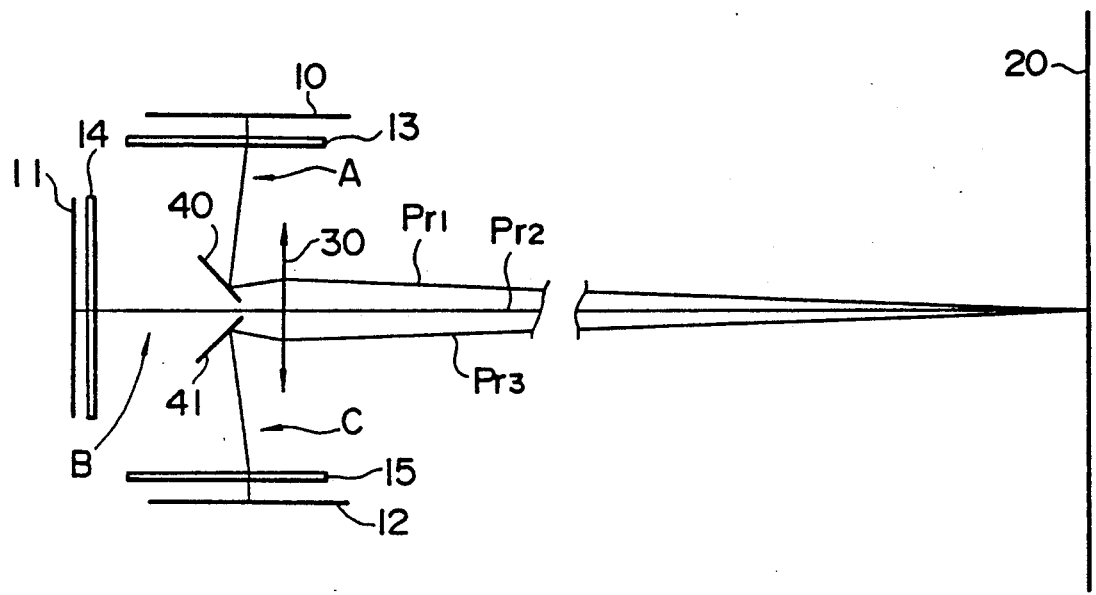
FIG. 16 is a schematic view of a projector of Embodiment 7 according to the present invention.
Figure 17:
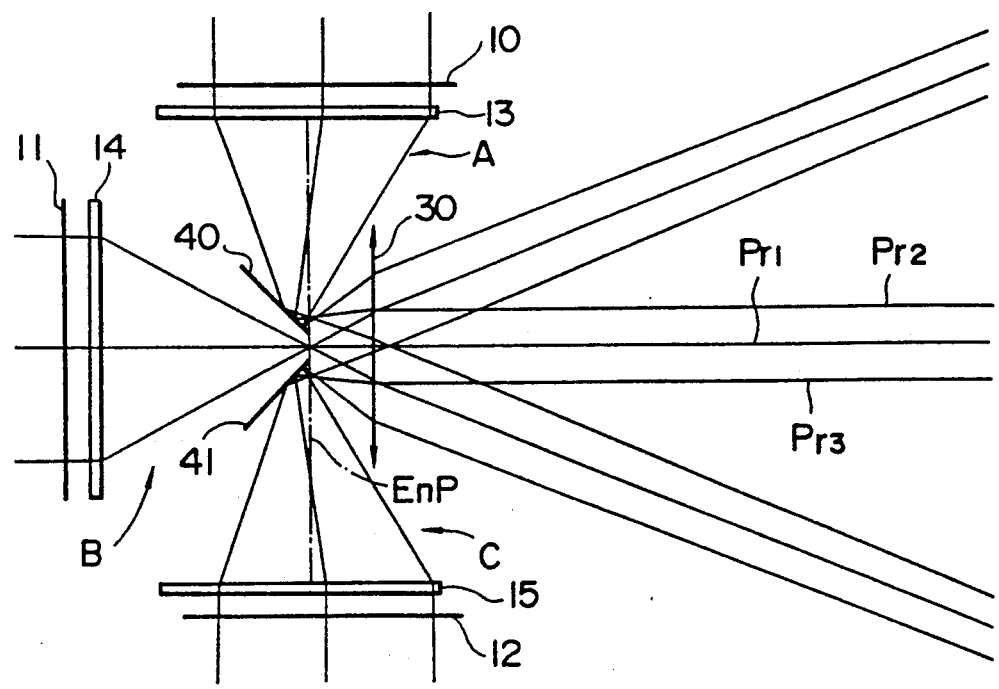
FIG. 17 is an enlarged view of the light path overlapping portion in FIG. 16.

FIGS. 16 and 17 show Embodiment 7 of the projector according to the present invention, FIG. 16 is an overall view, and FIG. 17 is an enlarged view of the luminous flux overlapping portion.

As shown in the Figures, this projector includes the LCDs 10, 11, 12, auxiliary lenses 13, 14, 15, which are adapted to reduce the diameter of the luminous flux coming from each of the LCDs, the projecting lens 30 for projecting the luminous flux transmitted from the auxiliary lenses onto the screen 20, and the mirror 40, 41 for reflecting the luminous flux from the peripheral projecting optical systems so that the luminous flux is made incident to the projecting lens 30.

In FIG. 16, principal rays Pr1, Pr2, Pr3 are shown for three projecting optical systems, while in FIG. 17, three principal rays are shown for each of them.

The optical axis of the auxiliary lens 14 of the central projecting optical system B is in alignment with the optical axis of the projecting lens 30, while the optical axes of the auxiliary lenses 13, 15 of the peripheral projecting optical systems A, C are perpendicular to the optical axis of the projecting lens. The entrance pupil EnP of the projecting lens is shown by the two-dotted chain line in FIG. 17.

The position of the entrance pupil EnP is located where the optical axes of the three auxiliary lenses are intersected. The mirrors 40, 41 are coincident with the entrance pupil EnP at end points of the center side thereof and are tilted by 45° relative to the optical axis of the projecting lens 30.

The LCD is disposed so that its central axis is in alignment with the optical axis of the auxiliary lens 14 in the central projecting optical system B, while in the peripheral projecting optical systems A, C, the central axes thereof are shifted rightward in the Figures relative to the optical axis of the auxiliary lens. Accordingly, the principal ray Pr2 of the central projecting optical system B is brought to be perpendicular to the screen 20 after passing through the optical axis, while the principal rays Pr2, Pr3 of the peripheral projecting optical systems A, C are projected to be angled with respect to the screen. Three principal rays are intersected on the screen.

The shifting of the LCD and the lens in the peripheral projecting optical system is an arrangement to avoid the focus error and trapezoidal distortion of the image. If the central axis of the LCD is aligned with the central axis of the auxiliary lens, the image projected onto the screen by the peripheral projecting optical system would include the focus error and the trapezoidal distortion.

According to the above-mentioned construction, in the central projecting optical system B among three projecting optical systems A, B, C comprising the LCD and the auxiliary lens, after the parallel luminous flux emitted from a light source is transmitted by the LCD 11, the parallel luminous flux is converted to a convergent light by the auxiliary lens 14 and made incident to the projecting lens 30. On the other hand, in the peripheral projecting optical systems A, C, the convergent light transmitted through the auxiliary lenses 13, 15 is made incident to the projecting lens through the mirrors 40, 41. These luminous flux are overlapped on the screen through the projecting lens and forms a color image thereon.

Since the luminous flux of the respective projecting optical system is once made into a convergent light by the auxiliary lens and then made incident to the projecting lens, the diameter of the projecting lens becomes small compared with the prior art shown in FIG. 71.

Also, since the luminous flux coming from the peripheral projecting optical systems A, C are reflected by the mirrors and made incident to the projecting lens 30, the angle formed between the luminous flux of the respective projecting optical systems can be made small compared with a case where the LCDs are arranged in juxtaposed relation as in the prior art shown in FIG. 71, and the colors are prevented from being shifted on the screen 20 in accord with the viewing direction.

Concrete numerical examples will now be described.

In all numerical examples listed hereinafter, the projecting lens 30 is an ideal lens in which the distance between the principal points is zero, and the auxiliary lens is a Fresnel lens of 2.000 mm in thickness. The auxiliary lens is not limited to the Fresnel lens. Instead, it may be a spherical lens or aspherical lens.

| focal length of the auxiliary lens | 60.000 mm |
|---|---|
| focal length of the projecting lens | 80.000 mm |
| the image forming means ~ an incident surface of the auxiliary lens | 7.000 mm |
| the outgoing surface of the auxiliary lens ~ entrance pupil | 60.000 mm |
| entrance pupil ~ the projecting lens | 17.918 mm |
| the projecting lens ~ the screen | 1175.333 mm |

The central axes of the LCDs 10, 12 of the peripheral projecting optical systems A, C are shifted by 4.196 mm relative to the optical axes of the auxiliary lenses 13, 15.

Figure 18:
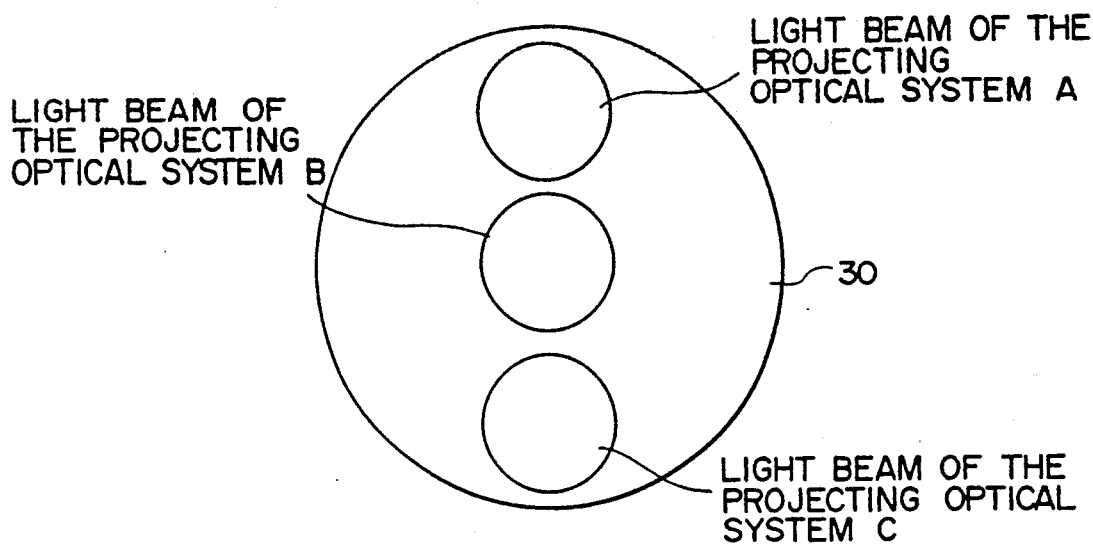
FIG. 18 is a schematic view showing the position of the luminous flux transmitted by the projecting lens in FIG. 16.

In this example, the respective projecting luminous flux transmitting through the projecting lens as shown in FIG. 18 are arranged on the diameter of the projecting lens.

Figure 19:
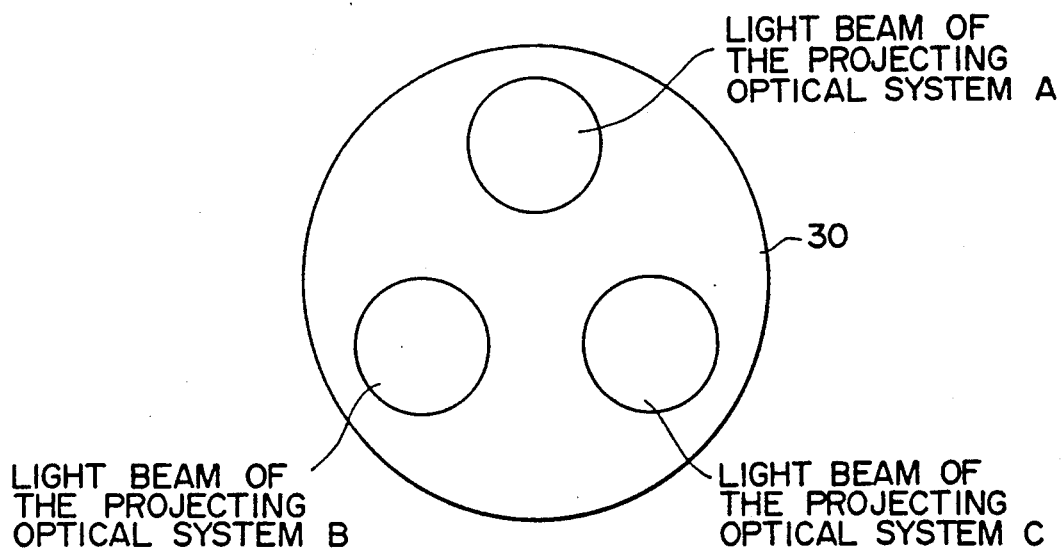
FIG. 19 is a schematic view showing another embodiment of the position of luminous flux transmitted by the projecting lens.

However, the arrangement of the projecting optical system, the invention is not limited to this construction. The central axis of the three luminous flux may be located at the apex of the triangle as shown in FIG. 19. According to this construction, since the pupil of the projecting lens can be utilized effectively, the effective aperture of the projecting lens can be reduced. This modification of the arrangement of the projecting system can likewise be utilized in other embodiments.

Embodiment 8

Figure 20:
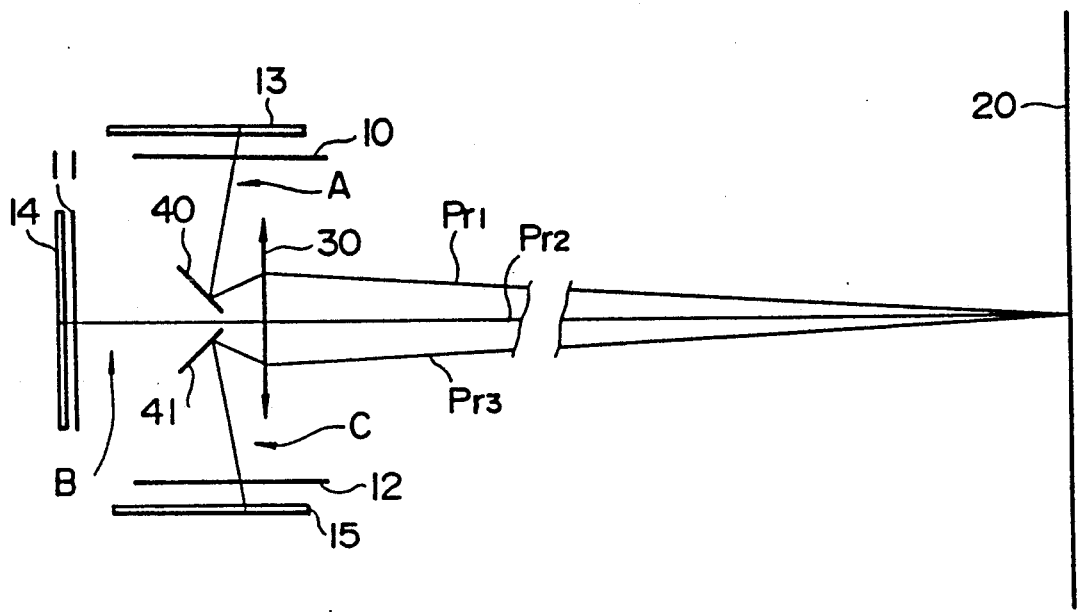
FIG. 20 is a schematic view of a projector of Embodiment 8 according to the present invention.
Figure 21:
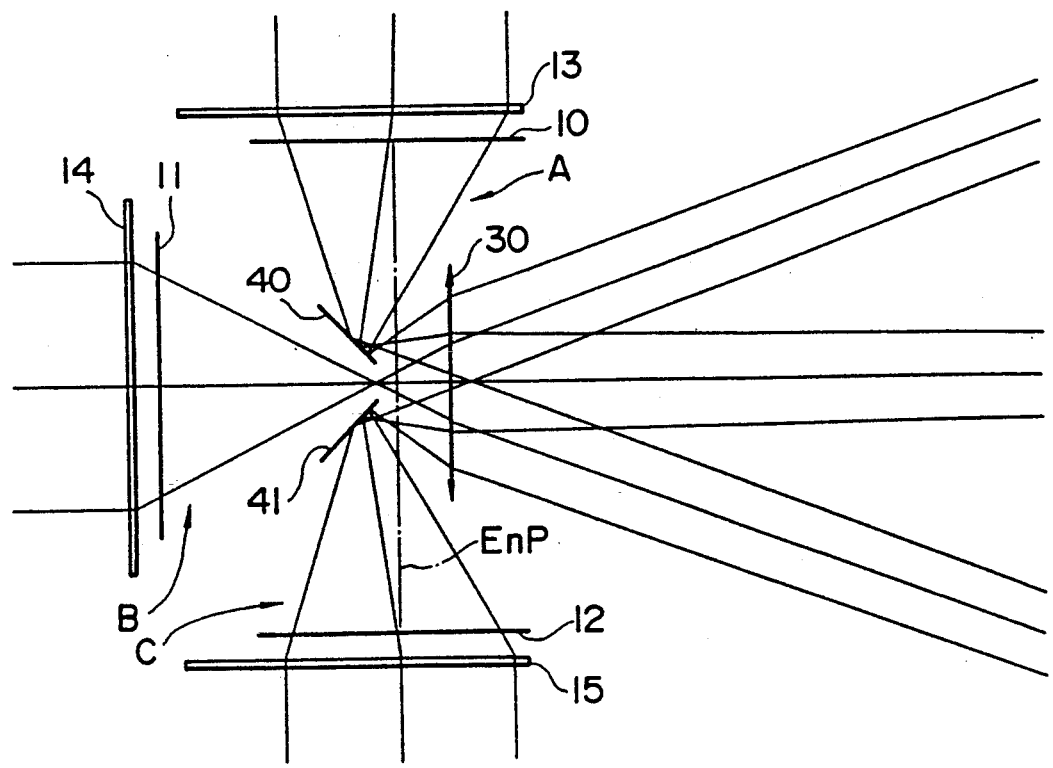
FIG. 21 is an enlarged view of the light path overlapping portion in FIG. 20.

FIG. 20 and FIG. 21 show Embodiment 8 of the projector according to the present invention.

This projector has an auxiliary lens disposed between a light source and a liquid crystal panel, so that the luminous flux made incident to the liquid crystal panel is made as a convergent light. All the other components are the same to the above-mentioned Embodiment 7.

Next, a concrete numerical construction will be described.

| focal length of the auxiliary lens | 70.000 mm |
|---|---|
| focal length of the projecting lens | 80.000 mm |
| the outgoing surface of the auxiliary lens ~ the chart | 7.000 mm |
| the image forming means ~ entrance pupil | 63.000 mm |
| entrance pupil ~ the projecting lens | 22.161 mm |
| the projecting lens ~ the screen | 1320.000 mm |

The central axes of the liquid crystal panels 10, 12 of the peripheral projecting optical systems A, C are disposed in such a manner as to be shifted relative to the optical axis of the auxiliary lenses 13, 15.

As for the mirror, a dichroic mirror may also be used besides a total reflection mirror.

Embodiment 9

Figure 22:
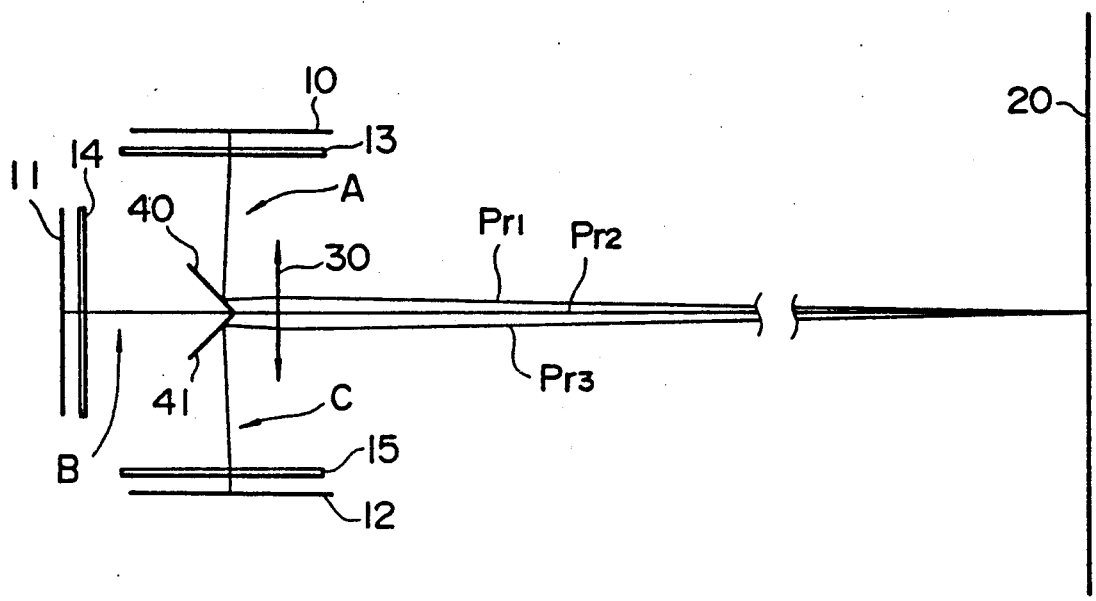
FIG. 22 is a schematic view of a projector of Embodiment 9 according to the present invention.
Figure 23:
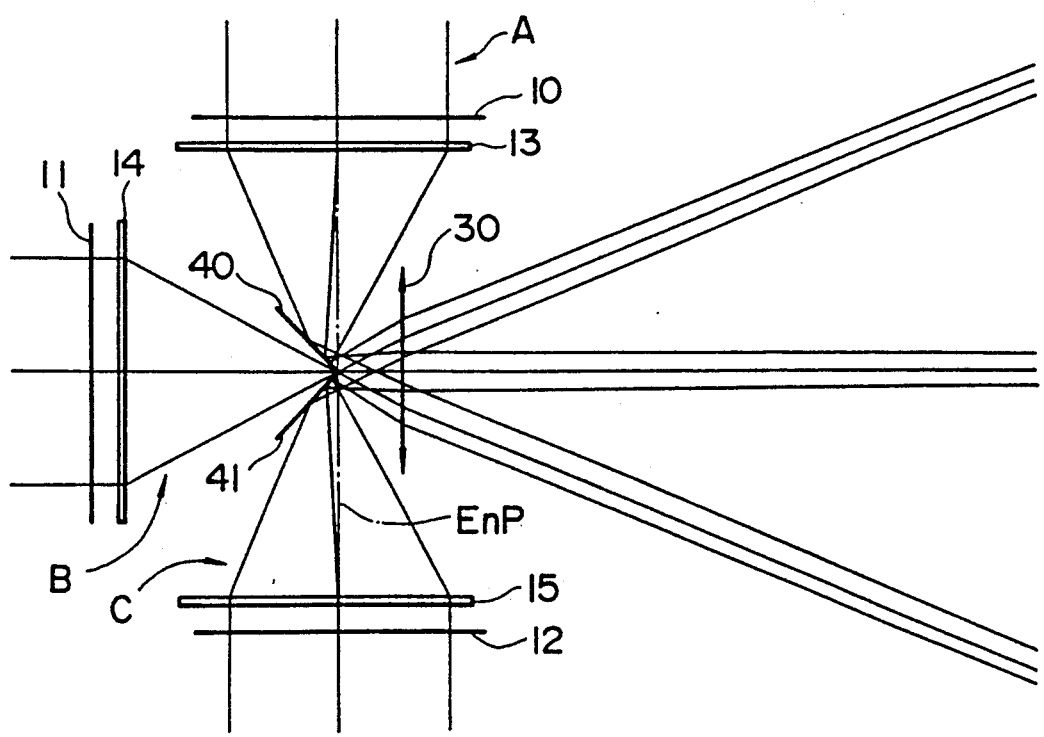
FIG. 23 is an enlarged view of the light path overlapping portion in FIG. 22.

FIG. 22 and FIG. 23 show Embodiment 9 of the projector according to the present invention, FIG. 22 is an overall view, and FIG. 23 is an enlarged view of a portion where the luminous flux are overlapped.

As illustrated, this projector includes LCDs 10, 11, 12, the auxiliary lenses 13, 14, 15, the projecting lens 30, and dichroic mirrors 40, 41 disposed so that each of them occupy a half of the optical path of the central projecting optical system respectively.

In FIG. 22, principal rays Pr1, Pr2 and Pr3 are shown, while in FIG. 23, three principal rays are shown for each of the LCDs.

The optical axis of the auxiliary lens 14 of the central projecting optical system B is aligned with the optical axis of the projecting lens 30, while the optical axes of the auxiliary lenses 13, 15 of the peripheral projecting optical systems A, C are perpendicular to the optical axis of the projecting lens. The entrance pupil EnP of the projecting lens is in a position where the optical axes of the three auxiliary lenses are intersected as shown by the two-dotted chain line in FIG. 23. The dichroic mirrors 40, 41 are mutually contacted at end points of the central side thereof in the intersecting position of the optical axis of the auxiliary lens and are tilted by 45° relative to the optical axis of the projecting lens 30 to form a roof type arrangement.

If the projecting optical systems A, B, C are presumed to be projecting optical systems for R, G, B here, one dichroic mirror 40 has such characteristics to reflect the R component and permit the other components to transmit therethrough, while the other dichroic mirror 41 has such characteristics as to reflect the B component and permit other components to transmit therethrough.

The LCDs 10, 11 and 12 are perpendicular to the optical axis of the auxiliary lenses 13, 14 and 15. And, the central axis of the LCD 11 is aligned with the optical axis of the auxiliary lens 14, while the central axes of the LCDs 13, 15 are shifted rightward in the Figure relative to the optical axes of the auxiliary lenses 10, 12. Accordingly, the principal rays Pr2 of the central projecting optical system B is vertical to the screen 20, while the principal rays Pr2, Pr3 of the peripheral projecting optical systems A, C are not perpendicular to the screen. The three principal rays are intersected on the screen.

The shifting of the LCD and the lens in the peripheral projecting optical system is an arrangement for obviating the focus error and trapezoidal distortion of the image. If the central axis of the LCD should be aligned with the central axis of the auxiliary lens, the image projected onto the screen by the peripheral projecting optical system would include the focus error and the trapezoidal distortion.

According to the above-mentioned construction, in the central projecting optical system B, after the parallel luminous flux having a G component and emitted from a light source through the LCD 11, the parallel luminous flux is converted to a convergent light by the auxiliary lens 14 and made incident to the projecting lens 30 after transmitting through the dichroic mirrors 40, 41. On the other hand, in the peripheral projecting optical systems A, C, the convergent light having R, B components and transmitted through the auxiliary lenses 13, 15 is reflected by the dichroic mirrors 40, 41 and made incident to the projecting lens. These luminous flux are overlapped on the screen through the projecting lens and forms a color image thereon.

Since the luminous flux coming from the respective projecting optical systems is reflected by the dichroic mirror and then made incident to the projecting lens, the angle between the luminous flux of the respective projecting lens 11 become small compared with the prior art shown in FIG. 71 where the LCDs are arranged in juxtaposed relation, and the colors are prevented from being one sided on the screen 20.

Concrete numerical examples will now be described.

The distances listed hereunder are along the principal rays Pr1, Pr2, Pr3.

| focal length of the auxiliary lens | 60.000 mm |
| focal length of the projecting lens | 80.000 mm |
| the image forming means ~ incident surface of the auxiliary lens | 7.000 mm |
| the outgoing surface of the auxiliary lens ~ entrance pupil | 60.000 mm |
| entrance pupil ~ the projecting lens | 17.918 mm |
| the projecting lens ~ the screen | 1175.333 mm |

Figure 24:
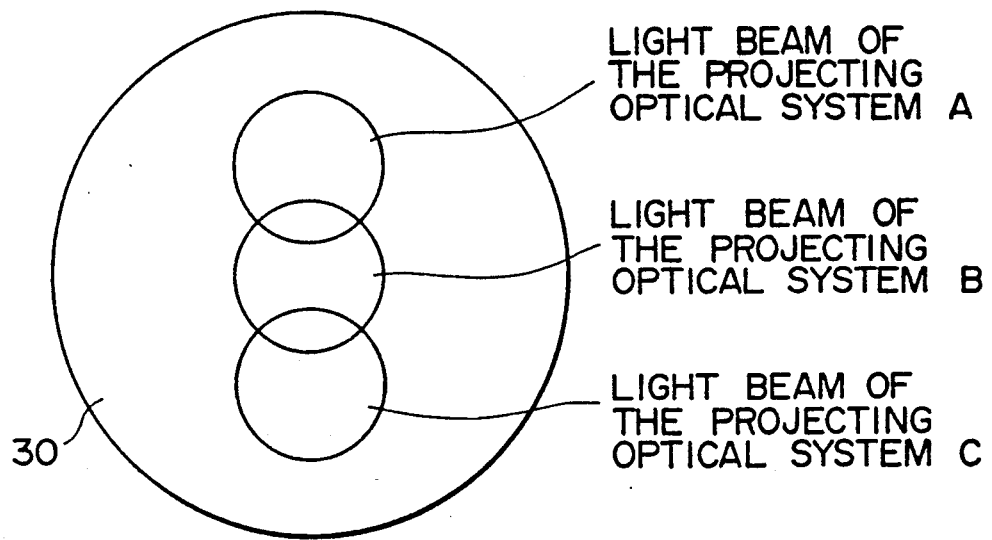
FIG. 24 is a schematic view showing the position of luminous flux transmitted the projecting lens in FIG. 22.

The central axes of the LCDs 10, 12 of the peripheral projecting optical systems A, C are shifted by 4.196 mm relative to the optical axis of the auxiliary lenses 13, 15. In the above-mentioned Embodiment 9, the respective luminous flux transmitting through the projecting lens 40 are partly overlapped and arranged in one row on the diameter of the incident pupil of the projecting lens (FIG. 24).

Embodiment 10

Figure 25:
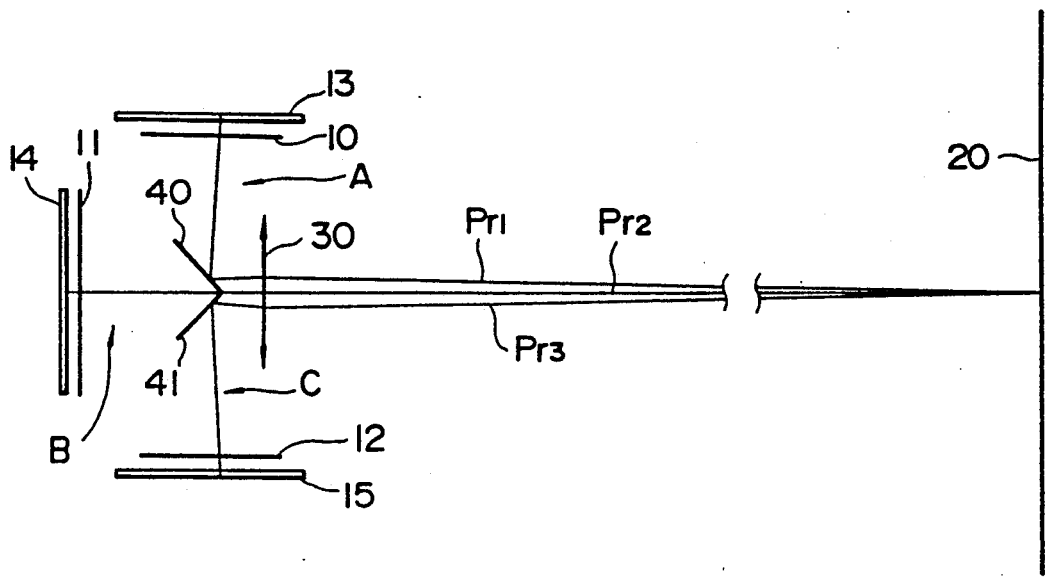
FIG. 25 is a schematic view of a projector of Embodiment 10 according to the present invention.
Figure 26:
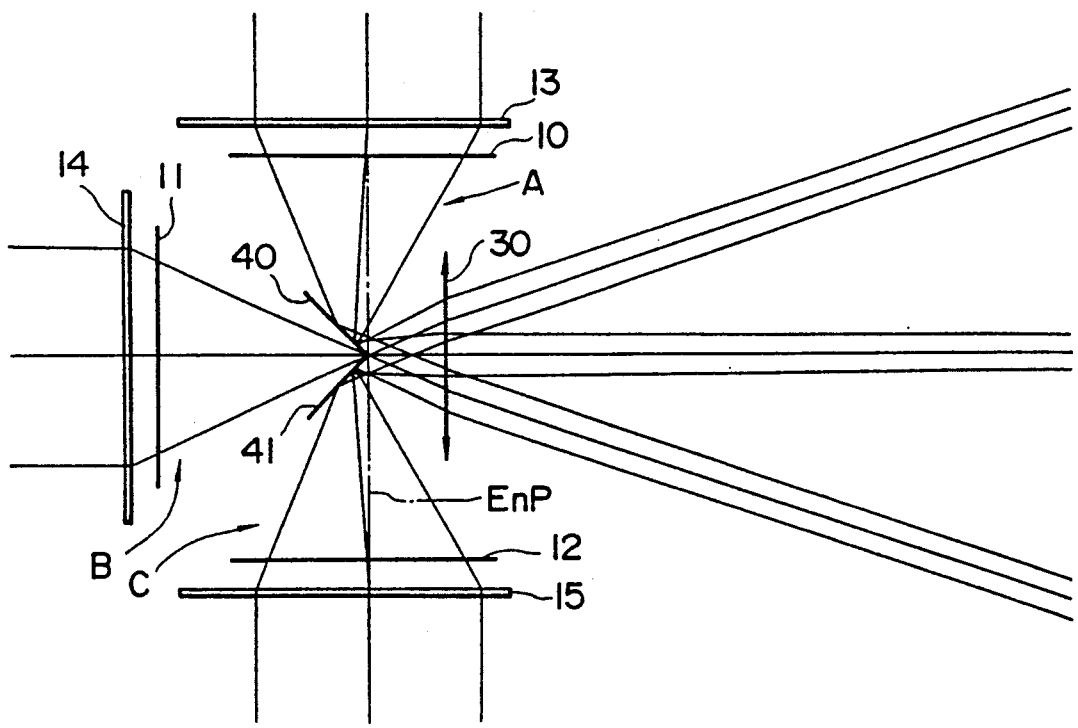
FIG. 26 is an enlarged view of the light path overlapping portion in FIG. 24.

FIG. 25 and FIG. 26 show Embodiment 10 of the projector according to the present invention.

This projector has an auxiliary lens disposed between a light source and a liquid crystal panel, so that the luminous flux made incident to the liquid crystal panel is made as a convergent light. All the other components are the same to the above-mentioned Embodiment 9.

Since the LCD is formed of a cell filled with liquid crystal sandwiched between a pair of polarizing plates, there is such a possibility that the transmittance will become irregular due to differences in angle when the incident luminous flux is not a parallel luminous flux. On the other hand, since the dichroic mirror is also changed in transmittance depending on degree of the angle when the incident light is not a parallel luminous flux, the incident luminous flux is preferably a parallel luminous flux.

If the auxiliary lens is disposed between the LCD and the dichroic mirror here as in Embodiment 9, the parallel luminous flux is made incident to the LCD and is thus preferably. However, since the distance between the auxiliary lens and the dichroic mirror is short, the degree of convergence of the luminous flux becomes comparatively sharp and there is created a state in which irregularity of transmittance readily occurs to the dichroic mirror.

On the contrary, if the auxiliary lens is disposed on the side of the light source from the LCD as in Embodiment 10, the distance between the auxiliary lens and the dichroic mirror becomes large and the degree of convergence becomes comparatively small. As a result, this construction is more preferably than the construction of Embodiment 9 in view of the performance of the dichroic mirror.

The arrangement of these auxiliary lenses is selected considering the balance as to which of the LCD and the dichroic mirror is more easily able to receive the effect cause by the difference in angle.

A concrete numerical construction will now be described.

| focal length of the auxiliary lens | 70.000 mm |
| focal length of the projecting lens | 80.000 mm |
| the outgoing surface of the auxiliary lens ~ the chart | 7.000 mm |
| the image forming means ~ entrance pupil | 63.000 mm |
| entrance pupil ~ the projecting lens | 22.161 mm |
| the projecting lens ~ the screen | 1320.000 mm |

The central axes of the liquid crystal panels 10, 12 of the peripheral projecting optical systems A, C are disposed in such a manner as to be shifted by 4.896 mm relative to the optical axis.

Embodiment 11

Figure 27:
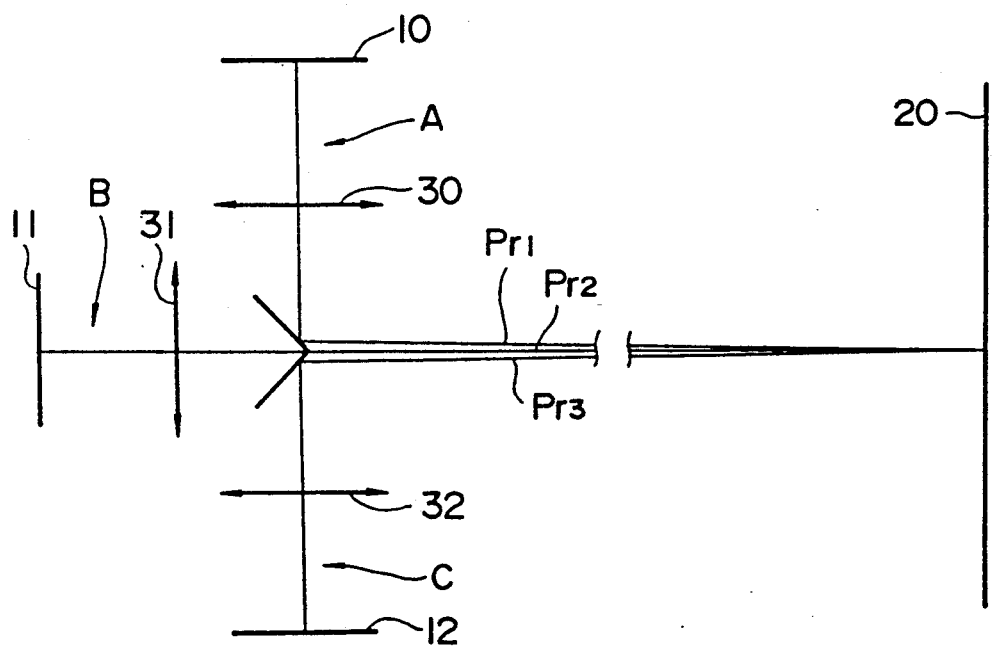
FIG. 27 is a schematic view of a projector of Embodiment 11 according to the present invention.
Figure 28:
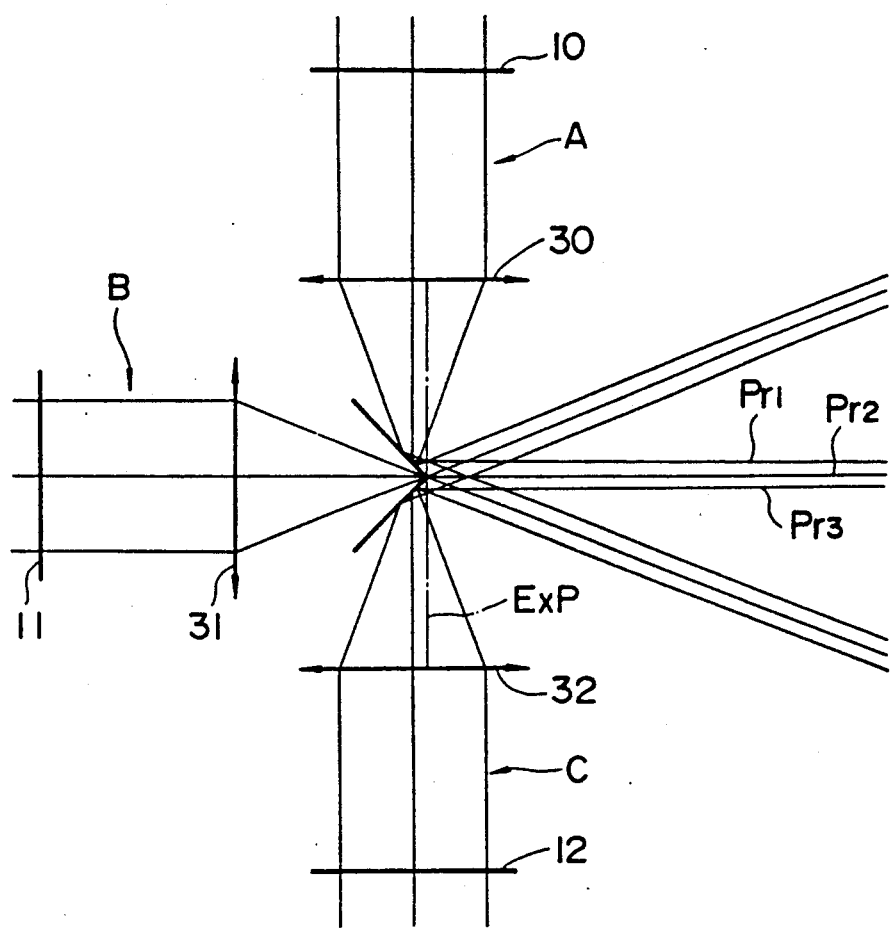
FIG. 28 is an enlarged view of the light path overlapping portion in FIG. 27.

FIG. 27 and FIG. 28 show Embodiment 11 of the projector according to the present invention.

This projector independently has the projecting lens for each projecting optical system and does not have the auxiliary lens. The optical axes of the projecting lenses 30, 32 are vertical to the optical axis of the projecting lens 31, and the dichroic mirrors 40, 41 are disposed in such a manner as to cover one half of the optical path of the central projecting optical system B at an angle 45° relative to the optical axis of the projecting lens 31 to form a roof-shape. Accordingly, the optical axes of the respective projecting lenses directing to the screen are mutually in parallel relation.

The respective LCDs 10, 11, 12 are perpendicular to the optical axis of the projecting lens, and in the central projecting optical system B, the central axis of the LCD 11 is disposed so that the perpendicular line of the LCD 11 is aligned with the optical axis of the projecting lens. Similarly, in the peripheral projecting optical systems A, C, the LCDs 10, 12 are shifted leftward in the Figures relative to the optical axes of the respective projecting lenses.

The exit pupil ExP of each projecting lens is located the point where the dichroic mirrors 40, 41 are intersected.

Figure 74:
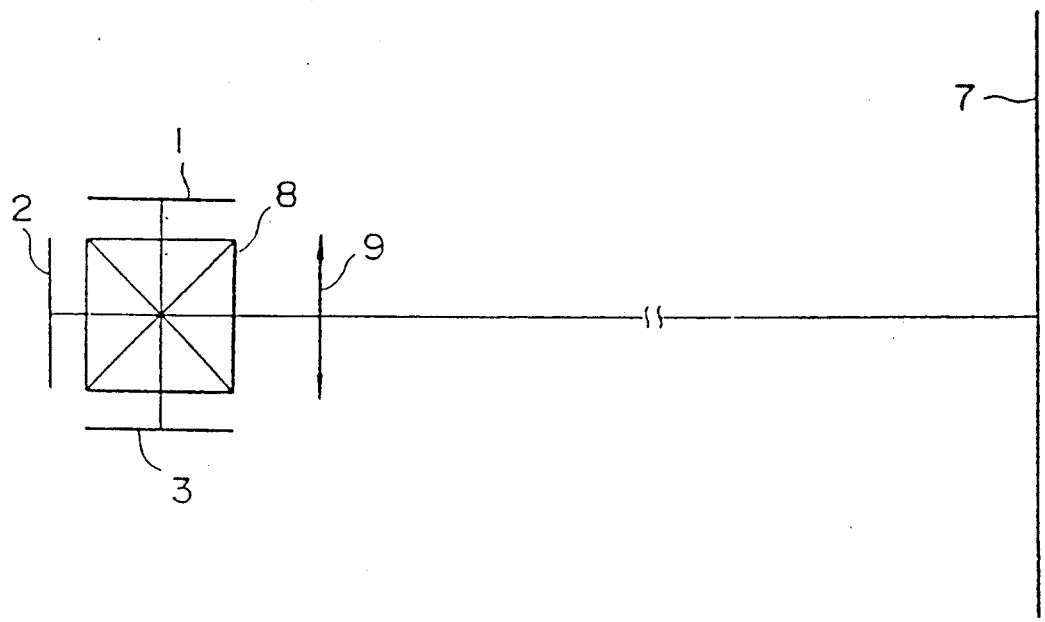
FIG. 74 is a schematic view of another type of a conventional projector.

In this way, in case the projecting lens is provided to each projecting optical system, it is good enough even if the respective projecting lenses are small. Therefore, the cost for each lens is low compared with the conventional lens shown in FIG. 74, and even a combination of three lenses is lower in cost than the lens of one piece construction.

According to the above-mentioned construction, the parallel luminous flux emitted from a light source (now shown) is transmitted through the respective charts and made incident to the projecting lenses of the respective projecting optical systems. The luminous flux from the projecting lenses are transmitted through the dichroic mirrors 40, 41 in the central projecting optical system B and is reflected by the dichroic mirror in the peripheral projecting optical systems A, C and then overlapped on the screen respectively.

Next, a concrete numerical example will be described.

| | |
|---|---|
| focal length of the projecting lenses | 80.000 mm |
| the image forming means ~ the projecting lens | 85.161 mm |
| the projecting lens ~ exit pupil | 80.000 mm |
| exit pupil ~ the screen | 1240.000 mm |

The central axes of the LCDs 10, 12 of the peripheral projecting optical systems A, C are shifted by 5.594 mm relative to the optical axes of the projecting lenses 3, 15.

Since the luminous flux is made incident to the projecting lenses 30, 32 at angles in the peripheral projecting optical systems A, C, the projecting lenses 30, 32 of the peripheral projecting optical system C are required to have large image circles than the projecting lens in the central projecting optical system B. The difference of the image circles is 0.361 mm.

Embodiment 12

Figure 29:
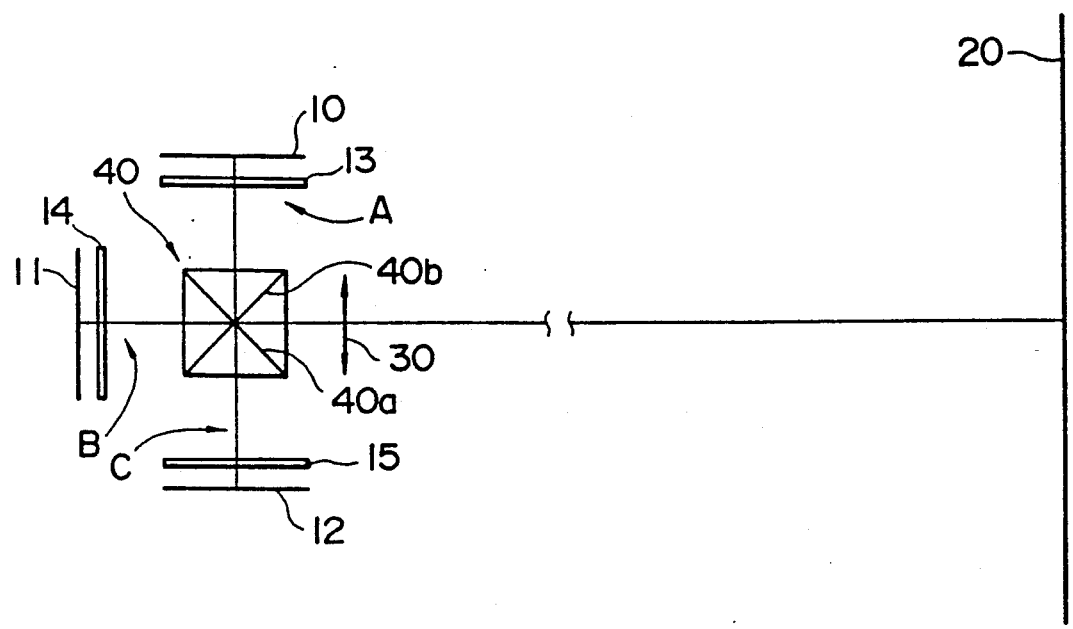
FIG. 29 is a schematic view of a projector of embodiment 12 according to the present invention.
Figure 30:
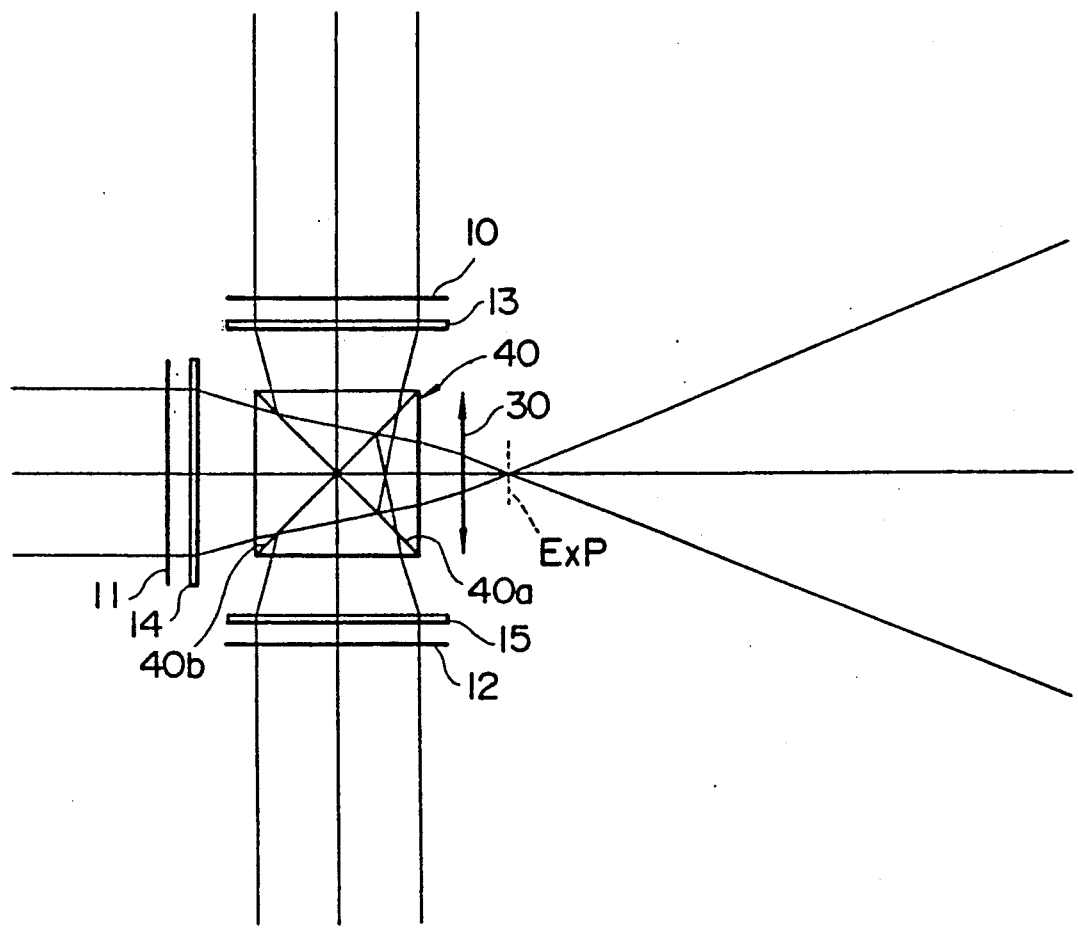
FIG. 30 is an enlarged view of the light path overlapping portion in FIG. 29.

FIGS. 29 and 30 show Embodiment 12 of the projector according to the present invention, FIG. 29 shows an overall view thereof, and FIG. 30 is an enlarged view of a portion for overlapping the luminous flux.

As shown in the Figures, this projector includes the LCDs 10, 11, 12, the auxiliary lenses 13, 14, 15, the projecting lens 30, and the dichroic prism 40 for overlapping the luminous flux of respective projecting optical systems.

In FIG. 29, one central principal ray is shown for each projecting optical system and in FIG. 30, three principal rays are shown for each of them.

The optical axes of the auxiliary lenses of the projecting optical systems are disposed so that the optical axis is aligned with the central axes of the LCDs. The optical axis of the auxiliary lens 14 in the central projecting optical system B is aligned with the optical axis of the projecting lens 30, while the optical axes of the auxiliary lenses 13, 15 of the peripheral projecting optical systems A and C, are perpendicular to the optical axis of the projecting lens.

The dichroic prism 40 is provided with a dichroic surface 40a having such characteristics as that the R component is reflected and other components are permitted to transmit therethrough, and with another dichroic surface 40b having such characteristics as that the B component is reflected and other components are permitted to transmit therethrough, the dichroic surfaces 40a, 40b being mutually intersected at the point of intersection of the optical axes of the respective auxiliary lenses. Also, the dichroic surfaces 40a, 40b are tilted by 45° relative to the optical axis of the projecting lens 30, respectively.

According to this construction, the parallel luminous flux of the various color components transmitted through the respective LCDs is made into convergent light by the auxiliary lens and made incident to the dichroic prism 40. These luminous fluxes are overlapped one upon the other by the dichroic prism 40 and projected onto the screen 20 in the overlapping state to form a color image thereon through the projecting lens.

A concrete numerical example will now be described.

The distances mentioned hereunder are along the optical axis, and the distance indication within the prism is not an air converted distance but an actual distance.

| | |
|---|---|
| focal length of the auxiliary lens | 100.000 mm |
| focal length of the projecting lens | 80.000 mm |
| refractive index of the prism | 1.51633 |
| the image forming means ~ incident surface of the auxiliary lens | 7.000 mm |
| the outgoing surface of the auxiliary lens ~ incident surface of the prism | 23.000 mm |
| incident surface of the prism ~ outgoing surface of the prism | 60.000 mm |
| outgoing surface of the prism ~ the projecting lens | 15.454 mm |
| the projecting lens ~ exit pupil | 17.851 mm |
| exit pupil ~ the screen | 1215.350 mm |
| effective aperture of the auxiliary lens | 80.000 mm |
| one side of the prism | 60.000 mm |
| effective aperture of the projecting lens | 50.000 mm |

In the case of the prior art in which no auxiliary lens is used, one side of the prism is 80.000 mm and the effective diameter of the projecting lens is 90.000 mm in order to project the similar image forming means to those mentioned above.

Embodiment 13

Figure 31:
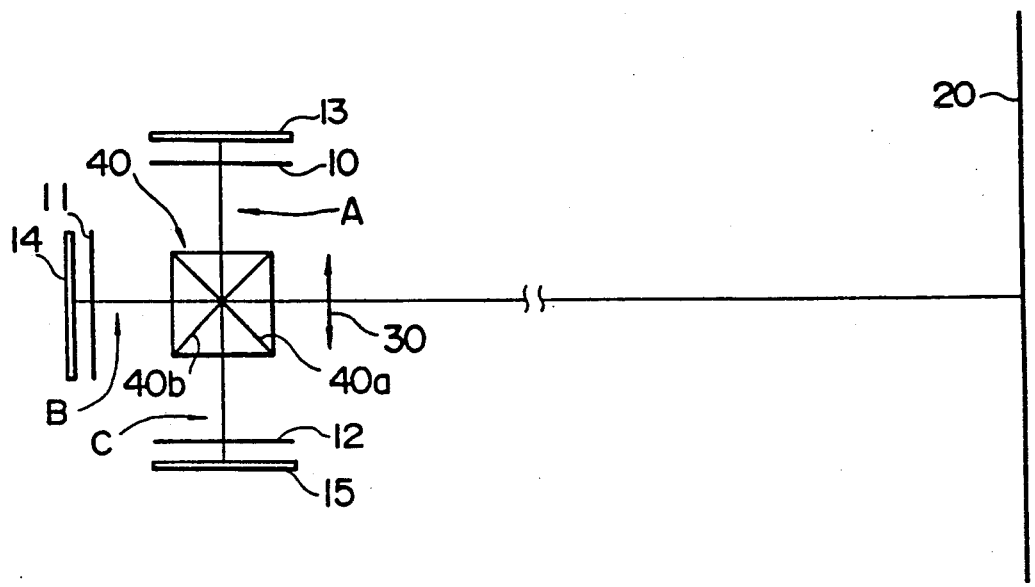
FIG. 31 is a schematic view of a projector of Embodiment 13 according to the present invention.
Figure 32:
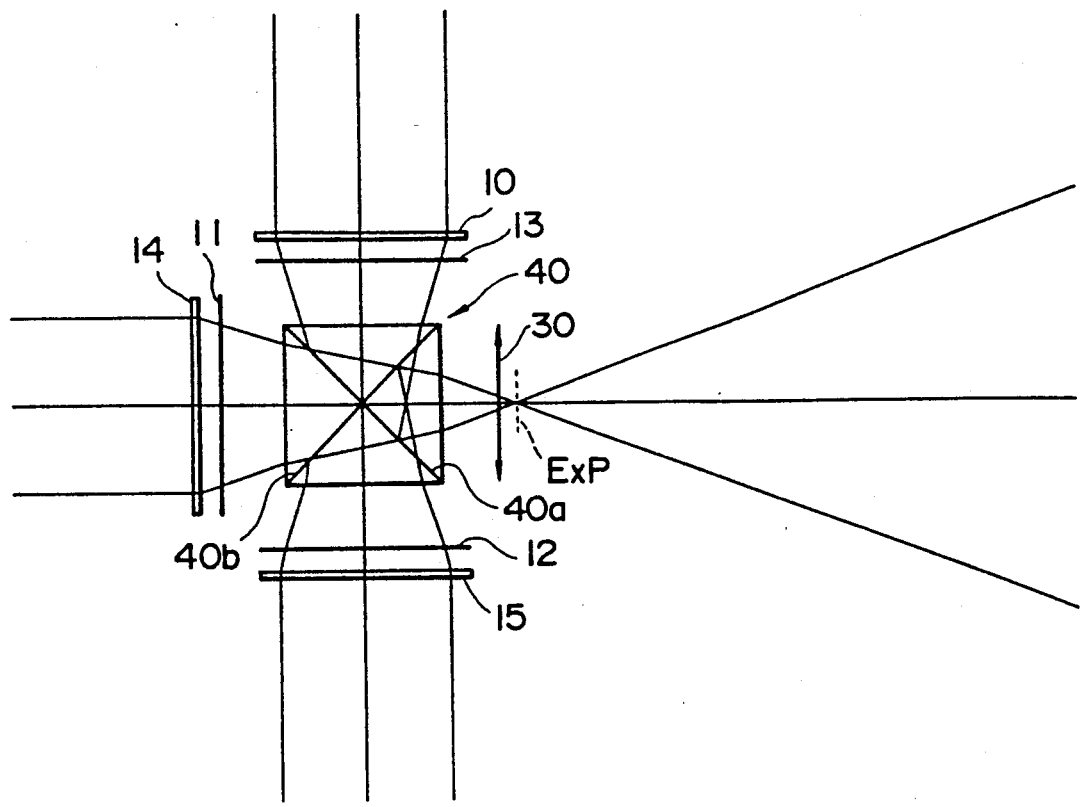
FIG. 32 is an enlarged view of the light path overlapping portion in FIG. 31.

FIG. 31 and FIG. 32 show Embodiment 13 of the projector according to the present invention.

This projector has an auxiliary lens disposed between a light source and the LCD, so that the luminous flux made incident to the LCD is made as a convergent light. All the other components are the same as the above-mentioned Embodiment 12.

In Embodiment 12, the parallel luminous flux is made incident to the LCD and thus preferable. However, it has created such a state where irregularity of transmittance readily occurs to the dichroic mirror. To the contrary, in the case of Embodiment 13, the projector is preferable to that of Embodiment 12 in view of the performance of the dichroic mirror.

A concrete numerical construction will now be described.

| | |
|---|---|
| focal length of the auxiliary lens | 100.000 mm |
| focal length of the projecting lens | 80.000 mm |
| refractive index of the prism | 1.51633 |
| the outgoing surface of the auxiliary lens ~ the image forming means | 7.000 mm |
| the chart ~ incident surface of the prism | 25.000 mm |
| incident surface of the prism ~ outgoing surface of the prism | 60.000 mm |
| outgoing surface of the prism ~ the projecting lens | 20.595 mm |
| the projecting lens ~ exit pupil | 8.079 mm |
| exit pupil ~ the screen | 1311.921 mm |
| effective aperture of the auxiliary lens | 80.000 mm |
| one side of the prism | 60.000 mm |
| effective aperture of the projecting lens | 50.000 mm |

Embodiment 14

Figure 33:
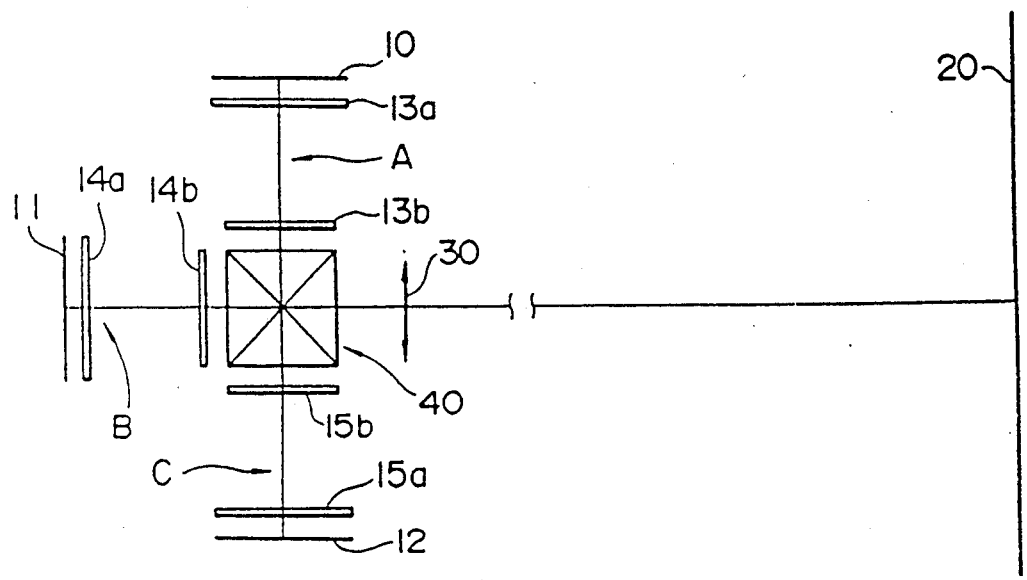
FIG. 33 is a schematic view of a projector of Embodiment 14 according to the present invention.
Figure 34:
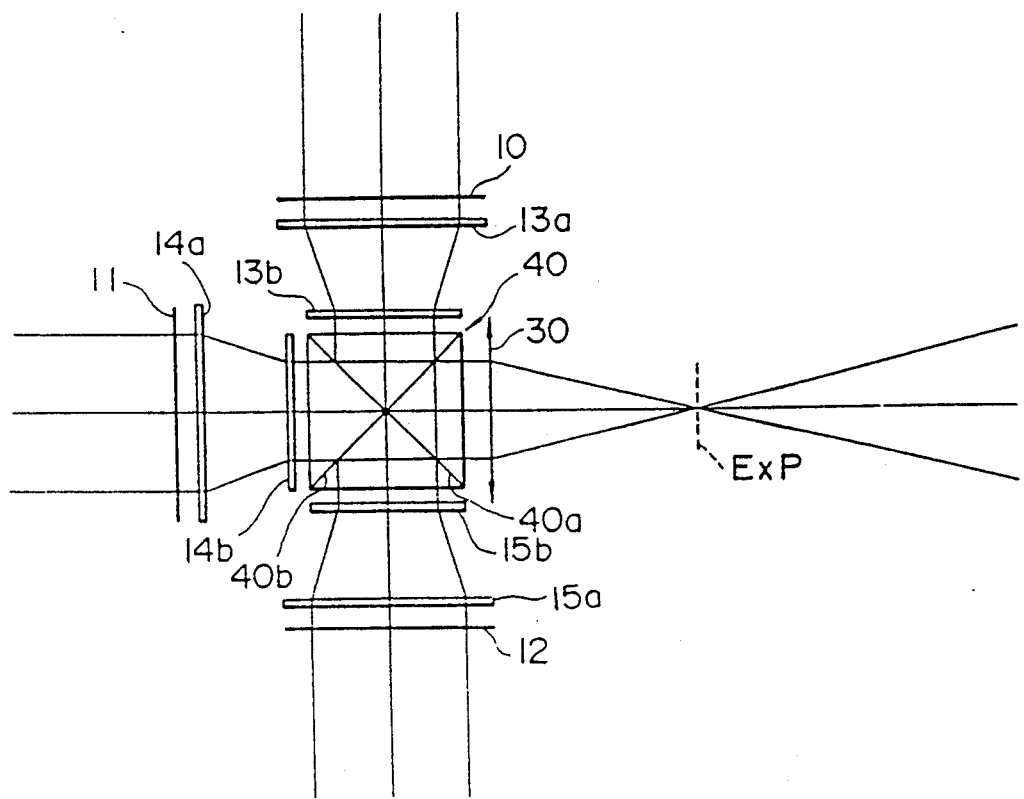
FIG. 34 is an enlarged view of the light path overlapping portion in FIG. 33.

FIG. 33 and FIG. 34 show Embodiment 14 of the projector according to the present invention.

This projector is provided with the positive auxiliary lenses 13a, 14a, 15a and the negative auxiliary lenses 13b, 14b, 15b disposed between the LCDs 10, 11, 12 and the dichroic prism 40, so that the luminous flux transmitted through the LCD is made incident to the dichroic prism after the luminous flux is converted to a parallel luminous flux of a small diameter.

Accordingly, since the parallel luminous flux is made incident to the projecting lens, a lens in which the exit pupil is located behind the lens such as, for example, a telecentric lens to the chart side, is used as the projecting lens 30. All the other constructions are the same as those of Embodiment 12.

According to this construction, irregularity of transmittance to the LCD and dichroic mirror can be reduced.

Next, a concrete numerical example will be described.

The thickness of six auxiliary lens are all 2.000 mm.

| | |
|---|---|
| focal length of the positive auxiliary lens | 100.000 mm |
| focal length of the negative auxiliary lens | −65.000 mm |
| focal length of the projecting lens | 80.000 mm |
| refractive index of the prism | 1.51633 |
| the chart ~ incident surface of the positive auxiliary lens | 7.000 mm |
| the outgoing surface of the positive auxiliary lens ~ incident surface of the negative auxiliary lens | 35.000 mm |
| the outgoing surface of the negative auxiliary lens ~ incident surface of the prism | 7.000 mm |
| incident surface of the prism ~ outgoing surface of the prism | 60.000 mm |
| outgoing surface of the prism ~ the projecting lens | 11.878 mm |
| the projecting lens ~ exit pupil | 80.000 mm |
| exit pupil ~ the screen | 1907.692 mm |
| effective aperture of the positive auxiliary lens | 80.000 mm |
| effective aperture of the negative auxiliary lens | 70.000 mm |
| one side of the prism | 60.000 mm |
| effective aperture of the projecting lens | 80.000 mm |

Embodiment 15

Figure 35:
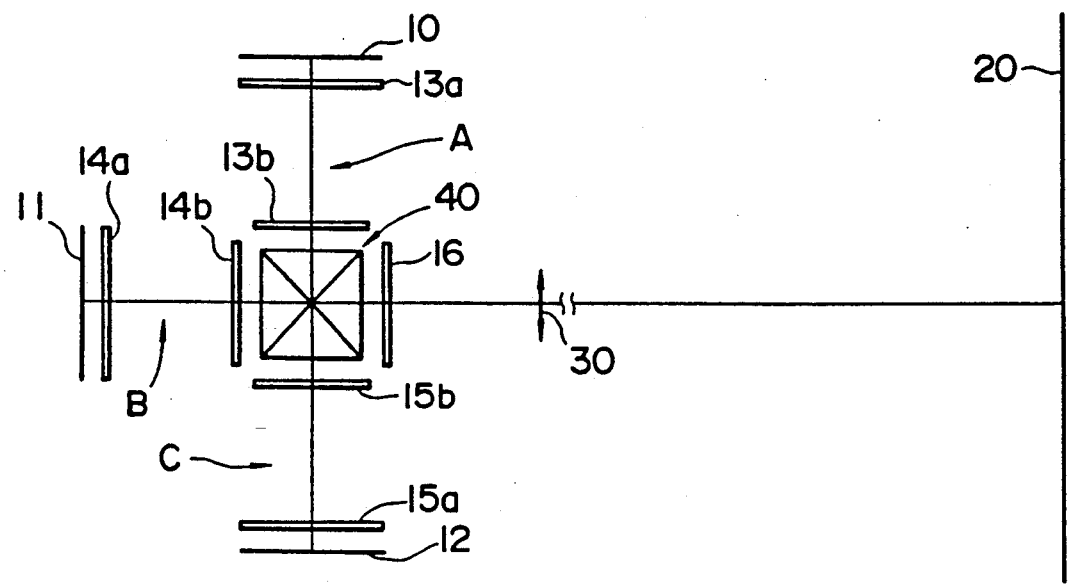
FIG. 35 is a schematic view of a projector of Embodiment 15 according to the present invention.
Figure 36:
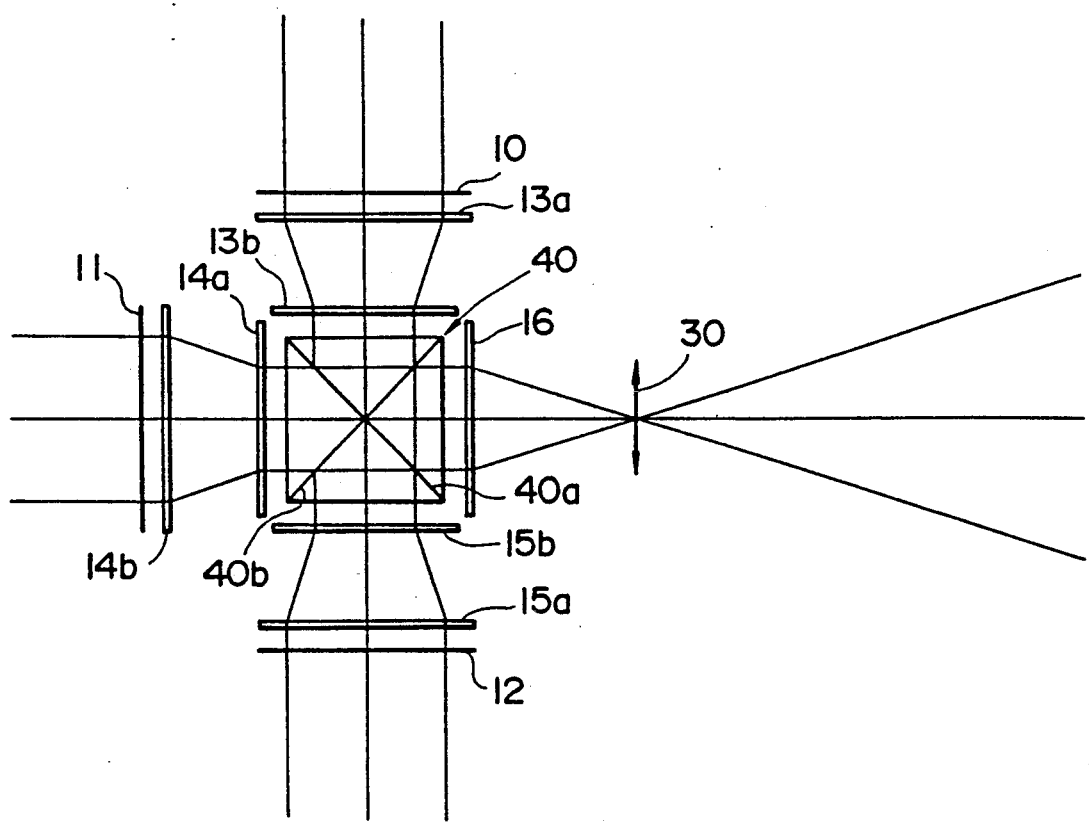
FIG. 36 is an enlarged view of the light path overlapping portion in FIG. 35.

FIG. 35 and FIG. 36 show Embodiment 15 of the projector according to the present invention.

In Embodiment 14, since a telecentric lens is used on the image forming means side as the projecting lens, a projecting lens having an equal size to the diameter of the luminous flux is required. In Embodiment 15, the auxiliary lens 16 for converging the luminous flux is disposed between the projecting lens and the dichroic prism in order to reduce the effective diameter required for the projecting lens.

A concrete numerical example will now be described.

The thickness of seven auxiliary lenses are all 2.000 mm.

| | |
|---|---|
| focal length of the positive auxiliary lens | 100.000 mm |
| focal length of the negative auxiliary lens | −65.000 mm |
| focal length of the auxiliary lens 16 | 65.000 mm |
| focal length of the projecting lens | −365.772 mm |
| refractive index of the prism | 1.51633 |
| the image forming means incident surface of the positive auxiliary lens | 7.000 mm |
| the outgoing surface of the positive auxiliary lens ~ incident surface of the negative auxiliary lens | 35.000 mm |
| the outgoing surface of the negative auxiliary lens ~ incident pupil of the prism | 7.000 mm |
| incident pupil of the prism ~ outgoing surface of the prism | 60.000 mm |
| outgoing surface of the prism ~ incident surface of the auxiliary lens 16 | 7.000 mm |
| outgoing surface of the auxiliary lens 16 ~ the projecting lens | 65.000 mm |
| the projecting lens ~ the screen | 1549.997 mm |
| effective aperture of the positive auxiliary lens | 80.000 mm |
| effective aperture of the negative auxiliary lens | 70.000 mm |
| one side of the prism | 60.000 mm |
| effective aperture of the auxiliary lens 16 | 70.000 mm |
| effective aperture of the projecting lens | 20.000 mm |

Embodiment 16

Figure 37:
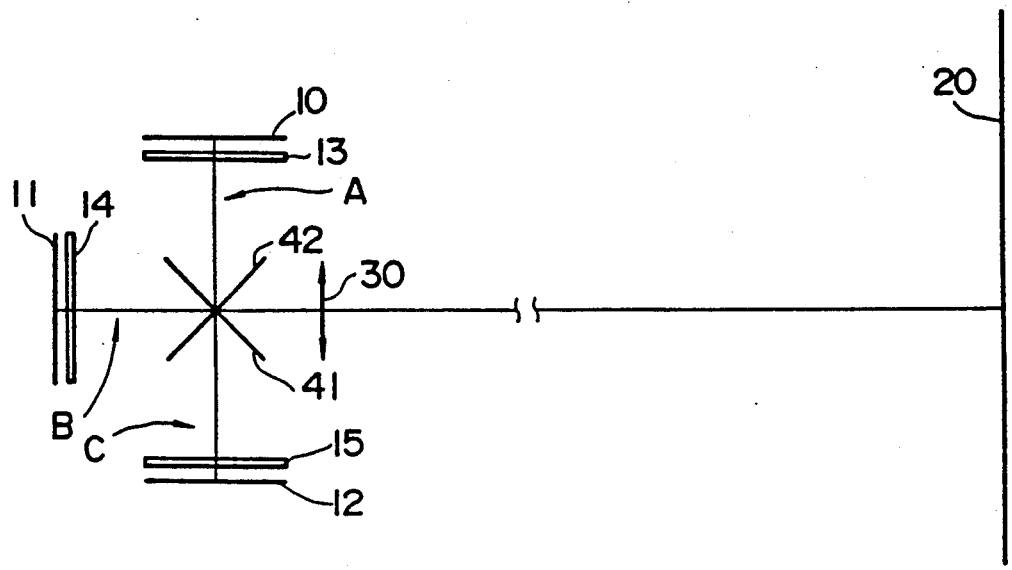
FIG. 37 is a schematic view of a projector of Embodiment 16 according to the present invention.
Figure 38:
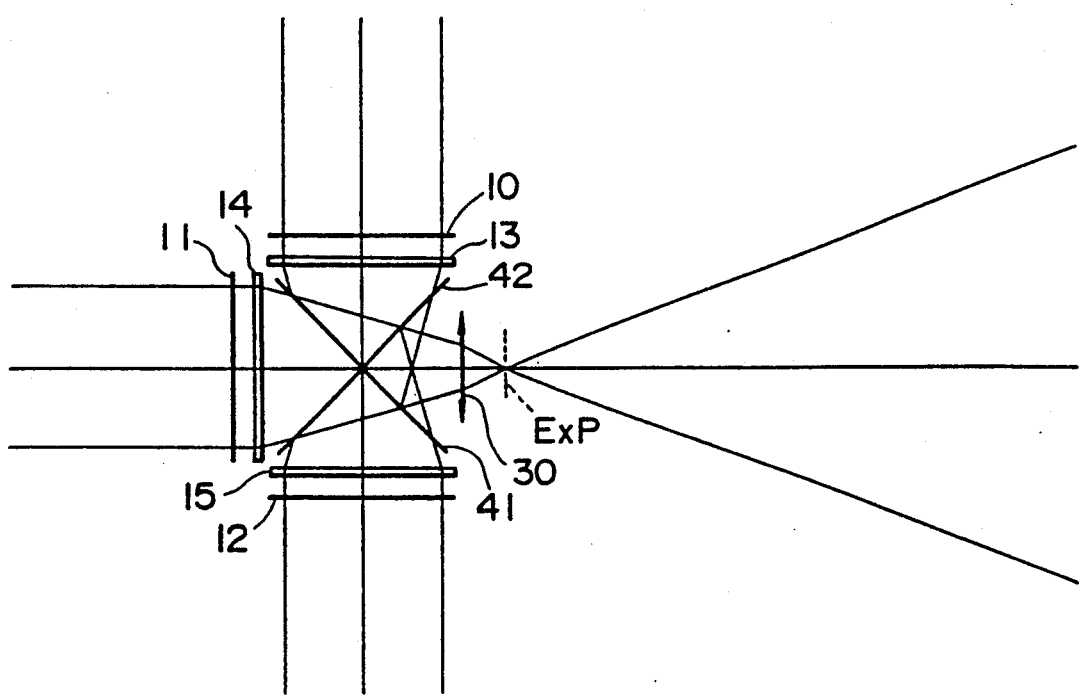
FIG. 38 is an enlarged view of the light path overlapping portion in FIG. 37.

FIG. 37 and FIG. 38 show Embodiment 16 of the projector according to the present invention, FIG. 37 is an overall view, and FIG. 38 is an enlarged view of a portion for overlapping the luminous flux.

As shown in the Figures, the projector is constructed such that the luminous flux coming from three projecting optical systems A, B, C comprising the LCDs 10, 11, 12 and the auxiliary lenses 13, 14, 15 are overlapped by two dichroic mirrors 41, 42 disposed in such a manner to be mutually intersected at the point of intersection of the optical axes of the respective auxiliary lenses and then made incident to the projecting lens 30.

Figure 39:
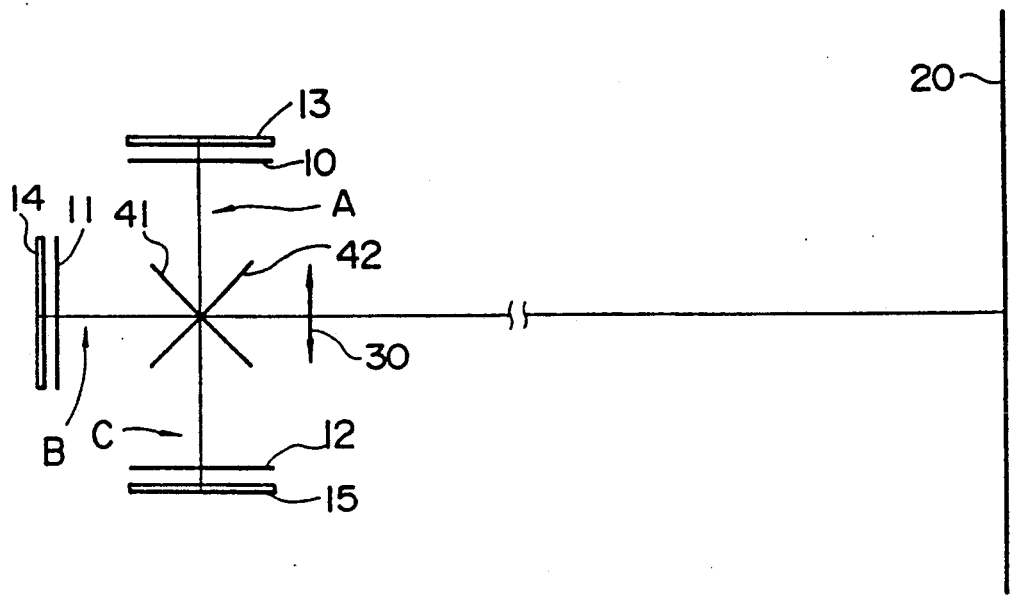
FIG. 39 is a schematic view of a projector of Embodiment 17 according to the present invention.

In FIG. 37, one central principal ray is shown for each projecting optical system, and in FIG. 39, three principal rays are shown for each of them.

The dichroic mirror 41 has such characteristics as that the R component is reflected and other components are permitted to transmit therethrough, and the other dichroic mirror 42 has such characteristics as that the B component is reflected and other components are permitted to transmit therethrough. Also, the dichroic mirrors are tilted by 45° relative to the optical axis of the projecting lens 30, respectively.

According to this construction, the parallel luminous fluxes of the various color components transmitted through the respective LCDs is made into a convergent light by the auxiliary lens and made incident to the dichroic mirrors 41, 42. And these luminous fluxes are overlapped one upon the other by the dichroic mirrors 41,42 and projected onto the screen 20 in the overlapping state to form a color image thereon through the projecting lens.

A concrete numerical example will now be described.
The thickness of the auxiliary lens is 2.000 mm.

| | |
|---|---|
| focal length of the auxiliary lens | 100.000 mm |
| focal length of the projecting lens | 80.000 mm |
| the image forming means ~ incident surface of the auxiliary lens | 7.000 mm |
| the outgoing surface of the auxiliary lens ~ the mirror | 40.000 mm |
| the mirror ~ the projecting lens | 38.023 mm |
| the projecting lens ~ exit pupil | 17.241 mm |
| exit pupil ~ the screen | 1215.960 mm |
| effective aperture of the auxiliary lens | 80.000 mm |
| effective aperture of the projecting lens | 50.000 mm |

Embodiment 17

Figure 40:
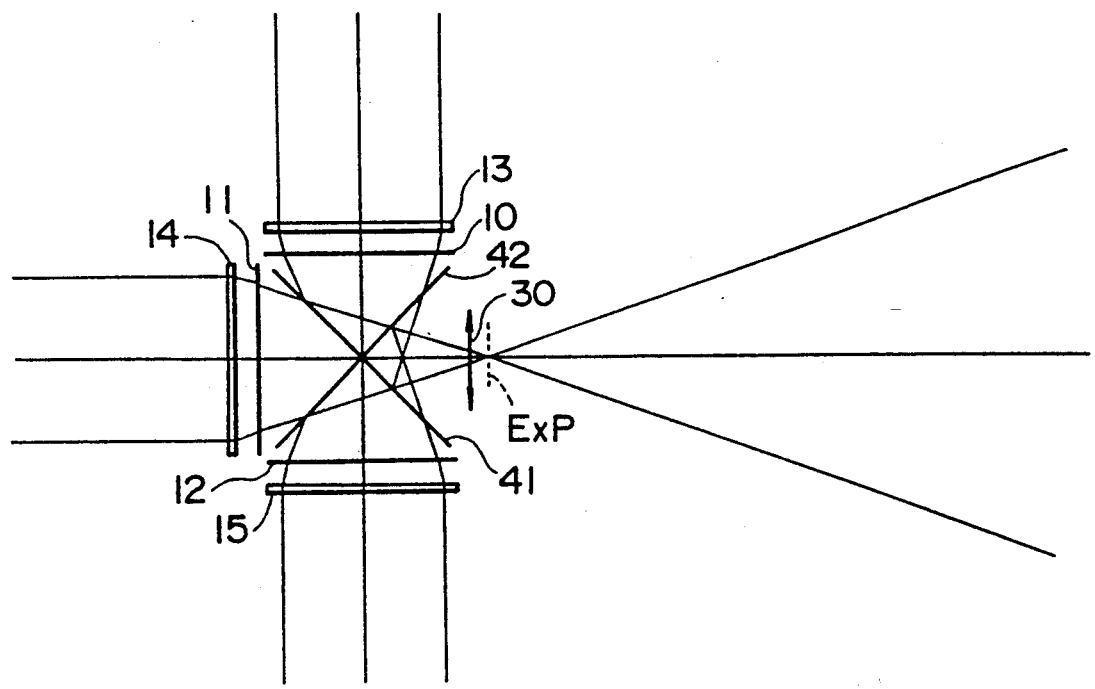
FIG. 40 is an enlarged view of the light path overlapping portion in FIG. 39.

FIG. 39 and FIG. 40 show Embodiment 17 of the projector according to the present invention.

This projector has the auxiliary lens disposed between the light source and the LCD, and all the other constructions are the same to the above-mentioned Embodiment 16.

In Embodiment 16, the parallel luminous flux is made incident to the LCD and is thus preferable. However, it has created such a state where irregularity of transmittance readily occurs to the dichroic mirror. To the contrary, in the case of Embodiment 17, the projector is more preferable than that of Embodiment 12 in view of the performance of the dichroic mirror.

A concrete numerical construction will now be described.

| | |
|---|---|
| focal length of the auxiliary lens | 100.000 mm |
| focal length of the projecting lens | 80.000 mm |
| the outgoing surface of the auxiliary lens ~ the image forming means | 7.000 mm |
| the image forming means ~ the mirror | 45.000 mm |
| the mirror ~ the projecting lens | 40.161 mm |
| the projecting lens ~ exit pupil | 7.138 mm |
| exit pupil ~ the screen | 1312.862 mm |
| effective aperture of the auxiliary lens | 80.000 mm |
| effective aperture of the projecting lens | 50.000 mm |

Embodiment 18

Figure 41:
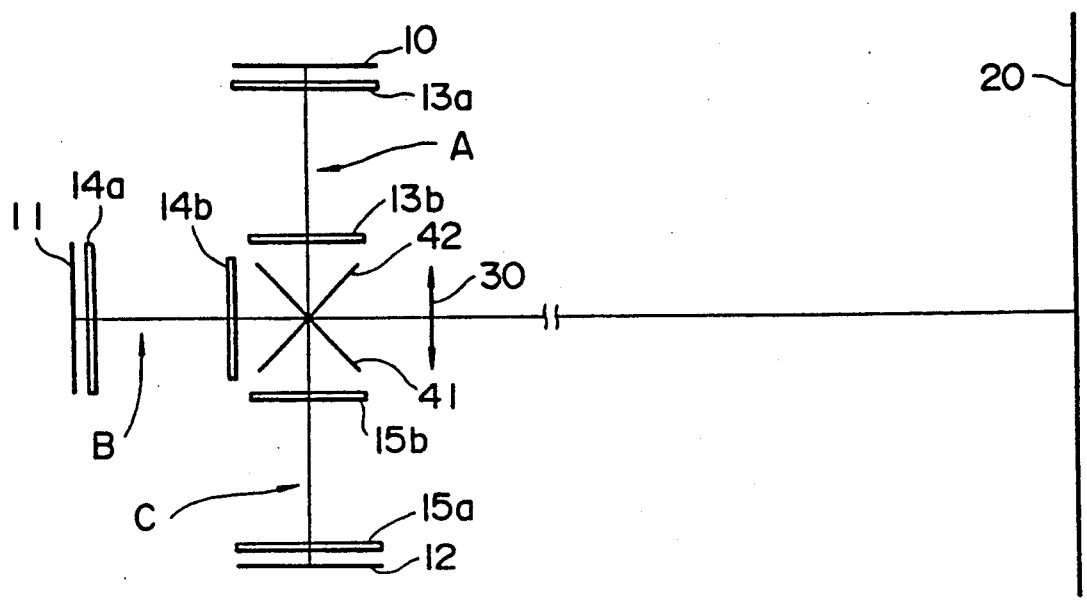
FIG. 41 is a schematic view of a projector of Embodiment 18 according to the present invention.
Figure 42:
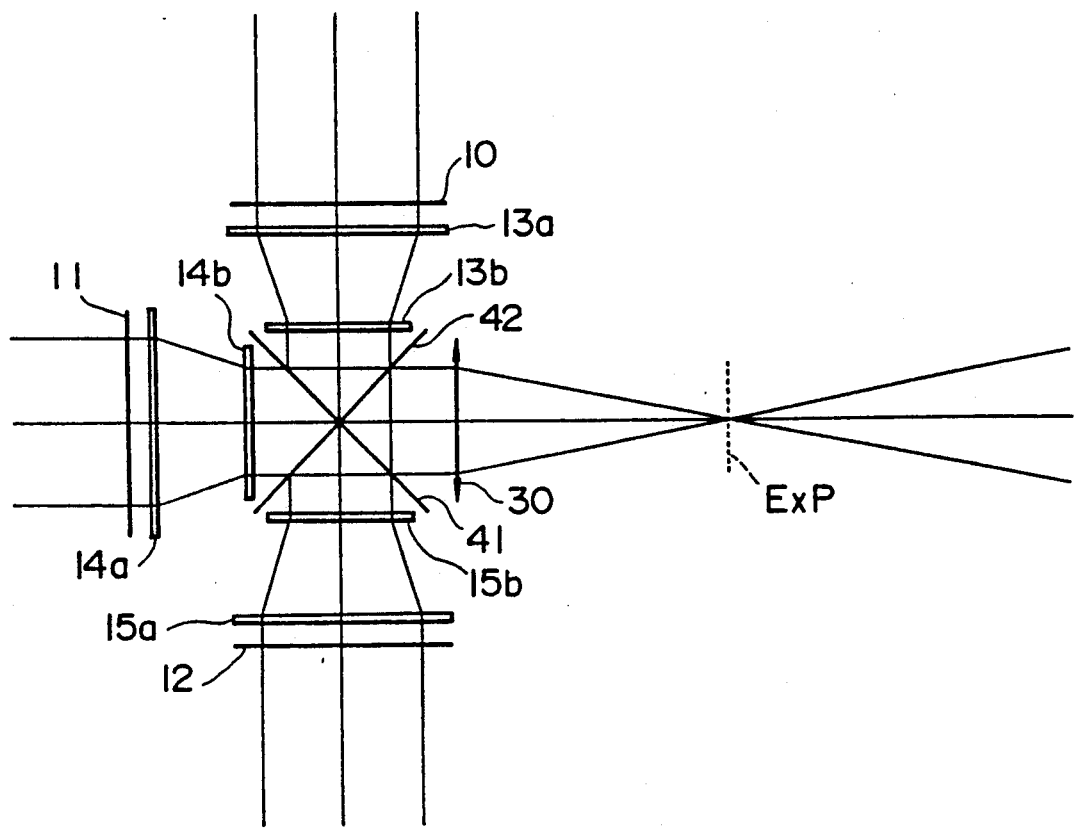
FIG. 42 is an enlarged view of the light path overlapping portion in FIG. 41.

FIG. 41 and FIG. 42 show Embodiment 18 of the projector according to the present invention.

This projector has the positive auxiliary lenses 13a, 14a, 15a and the negative auxiliary lenses 13b, 14b, 15b disposed between the LCDs 10, 11, 12 and the dichroic mirrors 41, 42, so that the luminous flux transmitted through the LCDs are made incident to the dichroic mirrors as a parallel luminous flux of a small diameter.

Accordingly, since the parallel luminous flux is made incident to the projecting lens 30, a lens in which the exit pupil is located behind the lens such as, for example, a telecentric lens on the chart side, is used as the projecting lens 30.

All the other constructions are the same as those of Embodiment 16.

According to this construction, irregularity of the transmittance can be reduced to both the LCDs and dichroic mirrors.

Next, a concrete numerical example will be described.

The thickness of six auxiliary lenses are all 2.000 mm.

| | |
|---|---|
| focal length of the positive auxiliary lens | 100.000 mm |
| focal length of the negative auxiliary lens | −65.000 mm |
| focal length of the projecting lens | 100.000 mm |
| the image forming means ~ incident surface of the positive auxiliary lens | 7.000 mm |
| the outgoing surface of the positive auxiliary lens ~ incident surface of the negative auxiliary lens | 35.000 mm |
| the outgoing surface of the negative auxiliary lens ~ the mirror | 35.000 mm |
| the mirror ~ the projecting lens | 43.486 mm |
| the projecting lens ~ exit pupil | 100.000 mm |
| exit pupil ~ the screen | 2284.615 mm |
| effective aperture of the positive auxiliary lens | 80.000 mm |
| effective aperture of the negative auxiliary lens | 60.000 mm |
| effective aperture of the projecting lens | 80.000 mm |

Embodiment 19

Figure 43:
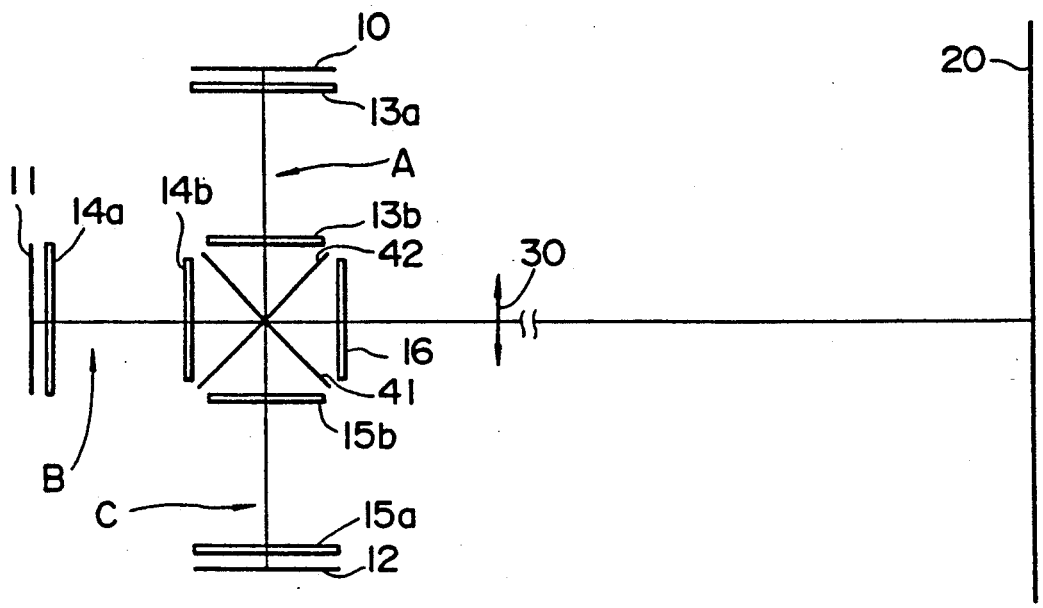
FIG. 43 is a schematic view of a projector of Embodiment 19 according to the present invention.
Figure 44:
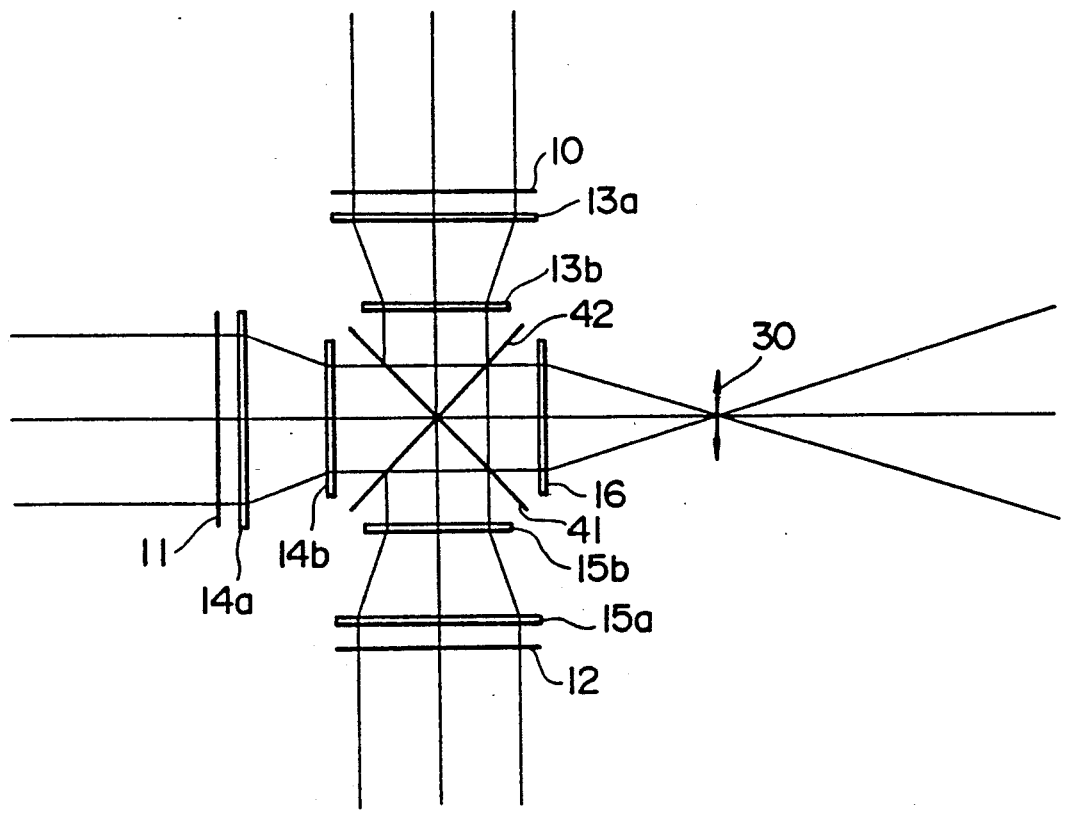
FIG. 44 is an enlarged view of the light path overlapping portion in FIG. 43.

FIG. 43 and FIG. 44 show Embodiment 19 of the projector according to the present invention.

In Embodiment 18, since a telecentric lens is used on the image side forming means of the projecting lens, a projecting lens having an equal size to the diameter of the luminous flux is required. In Embodiment 19, the auxiliary lens 16 for converging the luminous flux is disposed between the projecting lens 30 and the dichroic mirror in order to reduce the effective diameter required for the projecting lens.

A concrete numerical example will now be described.

The thickness of seven auxiliary lenses are all 2.000 mm.

| | |
|---|---|
| focal length of the positive auxiliary lens | 100.000 mm |
| focal length of the negative auxiliary lens | −65.000 mm |
| focal length of the auxiliary lens 16 | 65.000 mm |
| focal length of the projecting lens | −111.238 mm |
| the image forming means ~ incident surface of the positive auxiliary lens | 7.000 mm |
| the outgoing surface of the positive auxiliary lens ~ incident surface of the negative auxiliary lens | 35.000 mm |
| the outgoing surface of the negative auxiliary lens ~ the mirror | 40.000 mm |
| the mirror ~ incident surface of the auxiliary lens 16 | 40.000 mm |
| outgoing surface of the auxiliary lens 16 ~ the projecting lens | 65.000 mm |
| the projecting lens ~ the screen | 1549.961 mm |
| effective aperture of the positive auxiliary lens | 80.000 mm |
| effective aperture of the negative auxiliary lens | 70.000 mm |
| effective aperture of the auxiliary lens 16 | 80.000 mm |
| effective aperture of the projecting lens | 40.000 mm |

Embodiment 20

Figure 45:
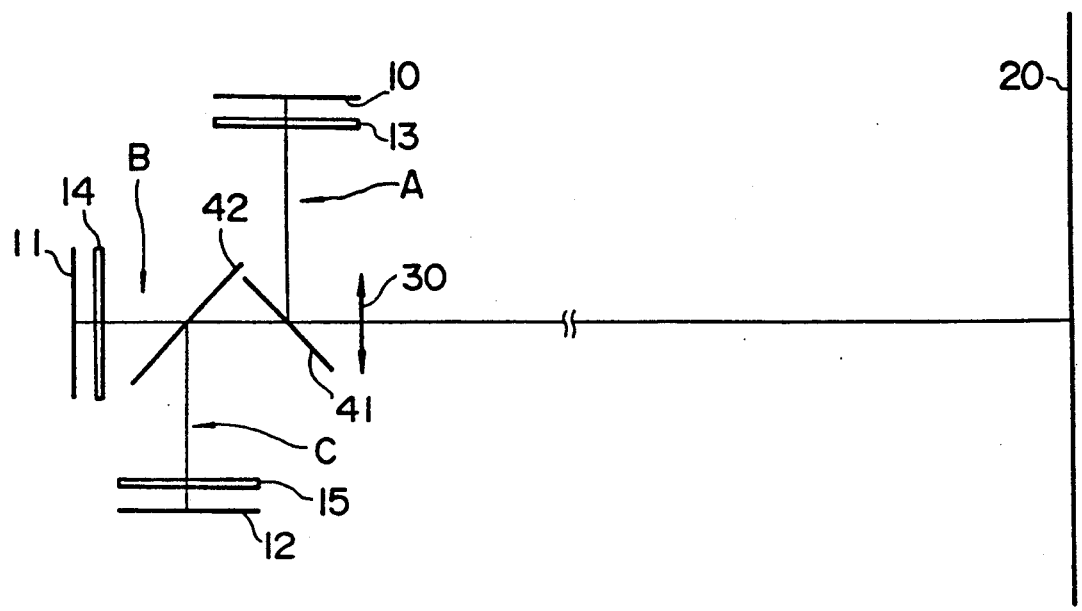
FIG. 45 is a schematic view of a projector of Embodiment 20 according to the present invention.
Figure 46:
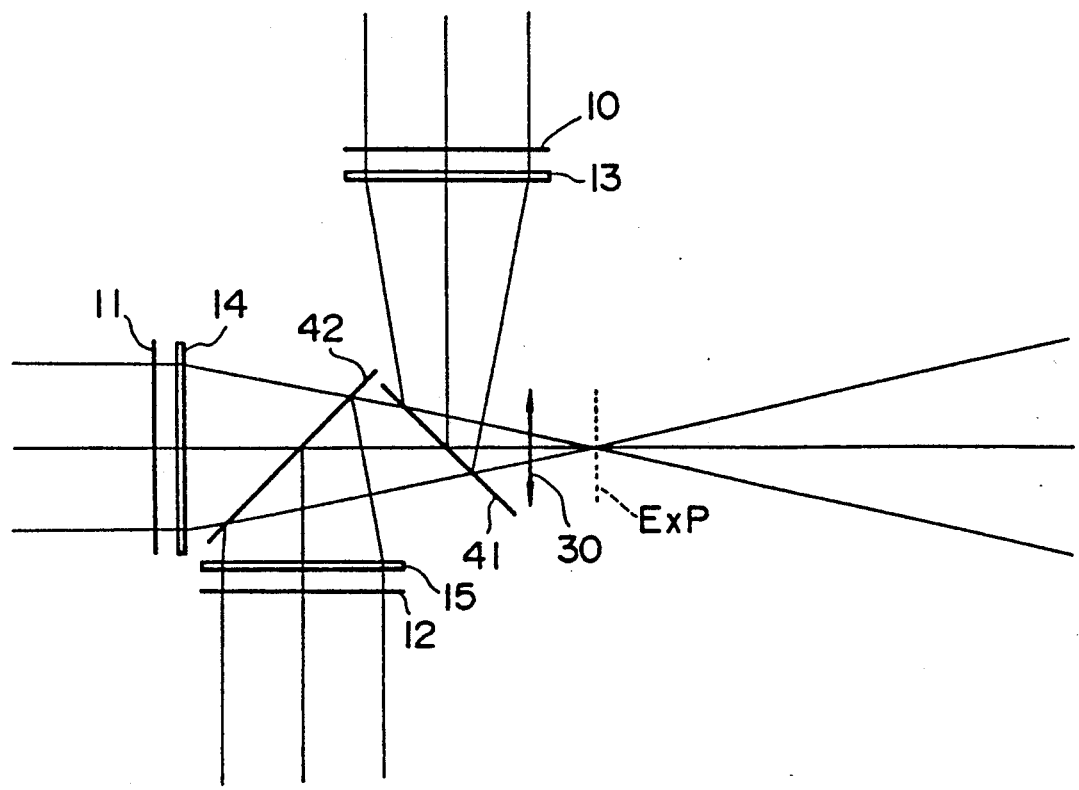
FIG. 46 is an enlarged view of the light path overlapping portion in FIG. 45.

FIG. 45 and FIG. 46 show Embodiment 20 of the projector according to the present invention, FIG. 45 is an overall view, and FIG. 46 is an enlarged view of a portion for overlapping the luminous flux.

As shown in the Figures, this projector is constructed such that the luminous flux coming from three projecting optical systems A, B, C comprising the LCDs 10, 11, 12 and the auxiliary lenses 13, 14, 15 are overlapped by two dichroic mirrors 41, 42 disposed independently and then made incident to the projecting lens 30.

In FIG. 45, one central principal ray is shown for each projecting optical system, and in FIG. 46, three principal rays are shown for each of them.

The dichroic mirror 41 has such characteristics that the R component is reflected and other components are permitted to transmit therethrough, and the other dichroic mirror 42 has such characteristics that the B component is reflected and other components are permitted to transmit therethrough. Also, the dichroic mirrors are tilted by 45° relative to the optical axis of the projecting lens 30, respectively.

According to this construction, the parallel luminous flux of the various color components transmitted through the respective LCDs is made into a convergent light by the auxiliary lens and made incident to the dichroic mirrors 41, 42. And these luminous flux are overlapped one upon the other by the dichroic mirrors 41, 42 and projected onto the screen 20 in the overlapping state to form a color image thereon through the projecting lens.

A concrete numerical example will now be described.

The numerical values set forth hereunder are related to the projecting optical systems B, C. With regard to the projecting optical system A, the distance from the auxiliary lens to the mirror 41 is the same (100 mm) as for the other projecting optical systems, although the mirror 42 is not provided.

The thickness of the auxiliary lens is 2.000 mm.

| focal length of the auxiliary lens | 160.000 mm |
|---|---|
| focal length of the projecting lens | 130.000 mm |
| the image forming means ~ incident surface of the auxiliary lens | 7.000 mm |
| the outgoing surface of the auxiliary lens ~ the mirror 42 | 45.000 mm |
| the mirror 42 ~ the mirror 41 | 55.000 mm |
| the mirror 41 ~ the projecting lens | 31.451 mm |
| the projecting lens ~ exit pupil | 23.407 mm |
| exit pupil ~ the screen | 2033.435 mm |
| effective aperture of the auxiliary lens | 80.000 mm |
| effective aperture of the projecting lens | 60.000 mm |

Embodiment 21

Figure 47:
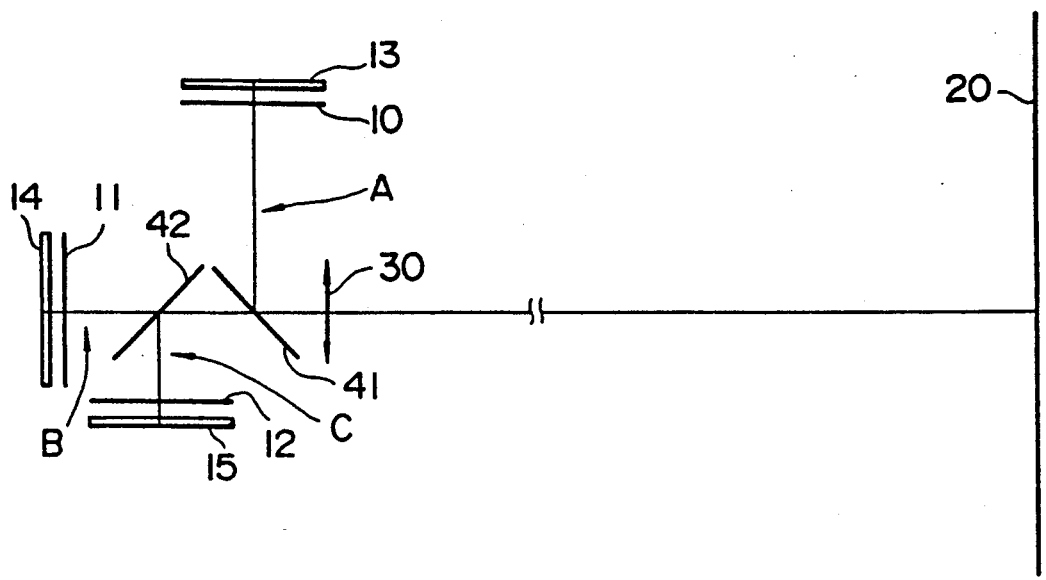
FIG. 47 is a schematic view of a projector of Embodiment 21 according to the present invention.
Figure 48:
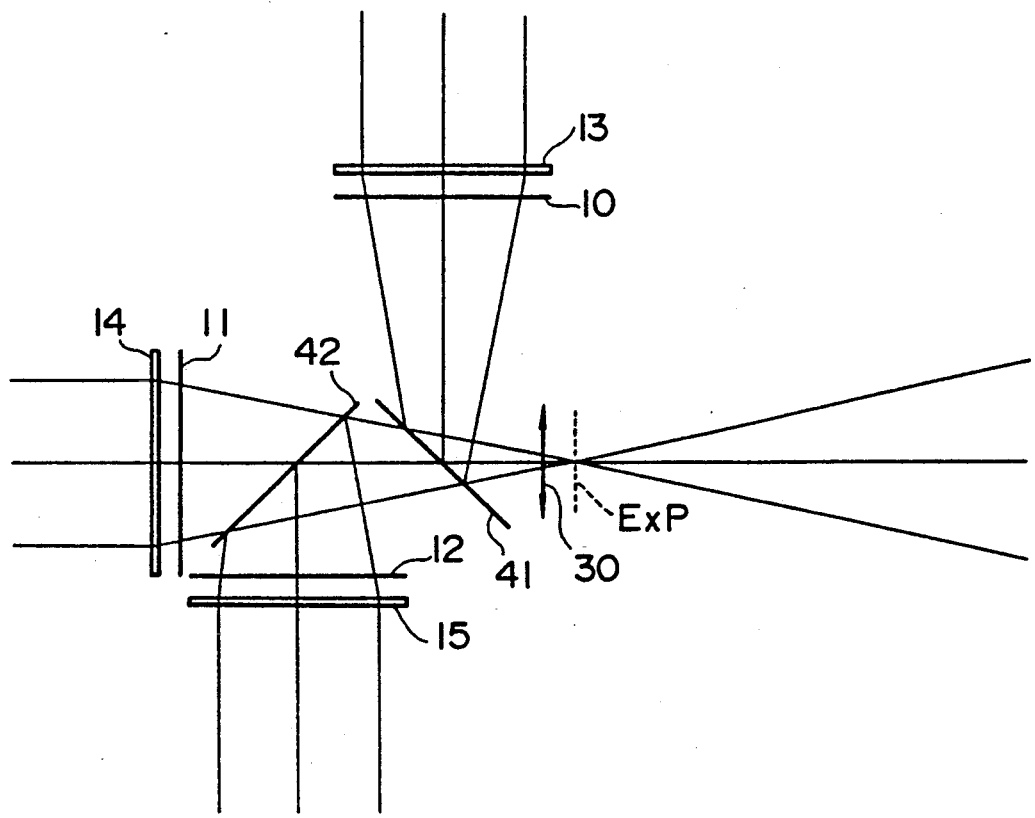
FIG. 48 is an enlarged view of the light path overlapping portion in FIG. 47.

FIG. 47 and FIG. 48 show Embodiment 21 of the projector according to the present invention.

In Embodiment 20, the parallel luminous flux is made incident to the LCD and thus this embodiment is preferable. However, it has created such a state where irregularity of transmittance readily occurs to the dichroic mirror. To the contrary, in the case of Embodiment 21, the projector is preferably to that of Embodiment 12 in view of the performance of the dichroic mirror.

A concrete numerical construction will now be described.

The numerical values set forth hereunder are related to the projecting optical systems B,C. With regard to the projecting optical system A, the distance from the auxiliary lens to the mirror 41 is the same (100 mm) to the other projecting optical systems, although the mirror 42 is not provided.

| focal length of the auxiliary lens | 160.000 mm |
|---|---|
| focal length of the projecting lens | 130.000 mm |
| the outgoing surface of the auxiliary lens ~ the image forming means | 7.000 mm |
| the image forming means ~ the mirror 42 | 45.000 mm |
| the mirror 42 ~ the mirror 41 | 55.000 mm |
| the mirror 41 ~ the projecting lens | 38.387 mm |
| the projecting lens ~ exit pupil | 13.136 mm |
| exit pupil ~ the screen | 2131.830 mm |
| effective aperture of the auxiliary lens | 80.000 mm |
| effective aperture of the projecting lens | 60.000 mm |

Embodiment 22

Figure 49:
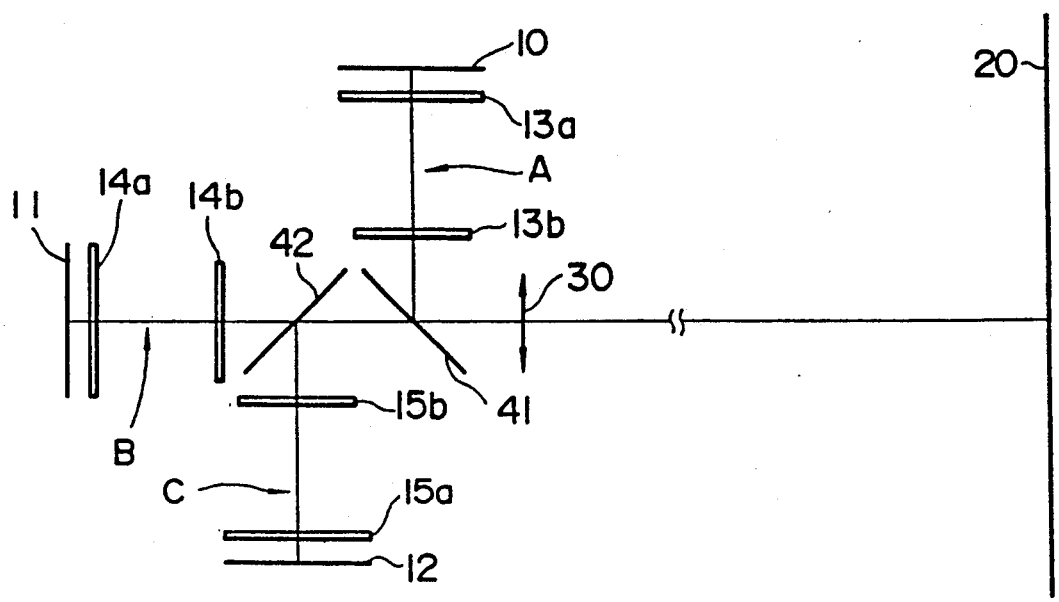
FIG. 49 is a schematic view of a projector of Embodiment 22 according to the present invention.
Figure 50:
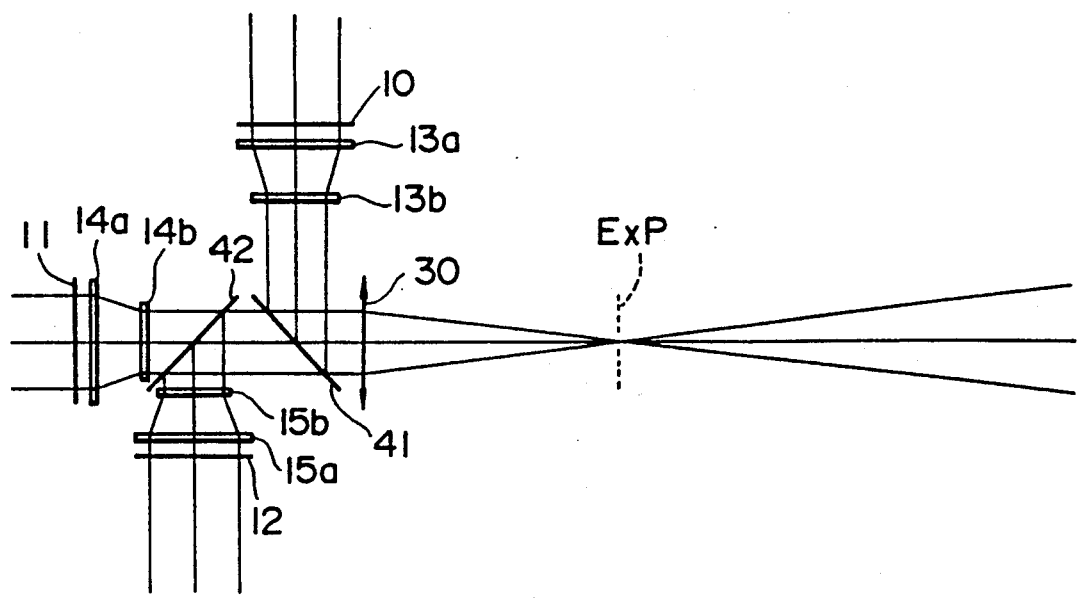
FIG. 50 is an enlarged view of the light path overlapping portion in FIG. 49.

FIG. 49 and FIG. 50 show Embodiment 22 of the projector according to the present invention.

This projector has the positive auxiliary lenses 13a, 14a, 15a and the negative auxiliary lenses 13b, 14b, 15b disposed between the LCDs 10, 11, 12 and the dichroic mirrors 40, 41, so that the luminous flux transmitted through the LCDs are made incident to the dichroic mirrors as a parallel luminous flux of a small diameter.

Accordingly, since the parallel luminous flux is made incident to the projecting lens 30, a lens in which the exit pupil is located behind the lens such as, for example, a telecentric lens to the chart side, is used as the projecting lens 30.

All the other constructions are the same as those of Embodiment 20.

According to this construction, irregularity of the transmittance can be reduced to both the LCDs and dichroic mirrors.

Next, a concrete numerical example will be described.

The numerical values set forth hereunder are related to the projecting optical systems B,C. With regard to the projecting optical system A, the distance from the auxiliary lens to the mirror 41 in the same (95 mm) as the other projecting optical systems, although the mirror 42 is not provided. The thickness of six auxiliary lenses are all 2.000 mm.

| focal length of the positive auxiliary lens | 100.000 mm |
|---|---|
| focal length of the negative auxiliary lens | −65.000 mm |
| focal length of the projecting lens | 160.000 mm |
| the image forming means ~ incident surface of the positive auxiliary lens | 7.000 mm |
| the outgoing surface of the positive auxiliary lens ~ incident surface of the negative auxiliary lens | 35.000 mm |
| the outgoing surface of the negative auxiliary lens ~ the mirror 42 | 30.000 mm |
| the mirror 42 ~ the mirror 41 | 65.000 mm |
| the mirror 41 ~ the projecting lens | 46.002 mm |
| the projecting lens ~ exit pupil | 160.000 mm |
| exit pupil ~ the screen | 3815.407 mm |
| effective aperture of the positive auxiliary lens | 80.000 mm |
| effective aperture of the negative auxiliary lens | 60.000 mm |
| effective aperture of the projecting lens | 90.000 mm |

Embodiment 23

Figure 51:
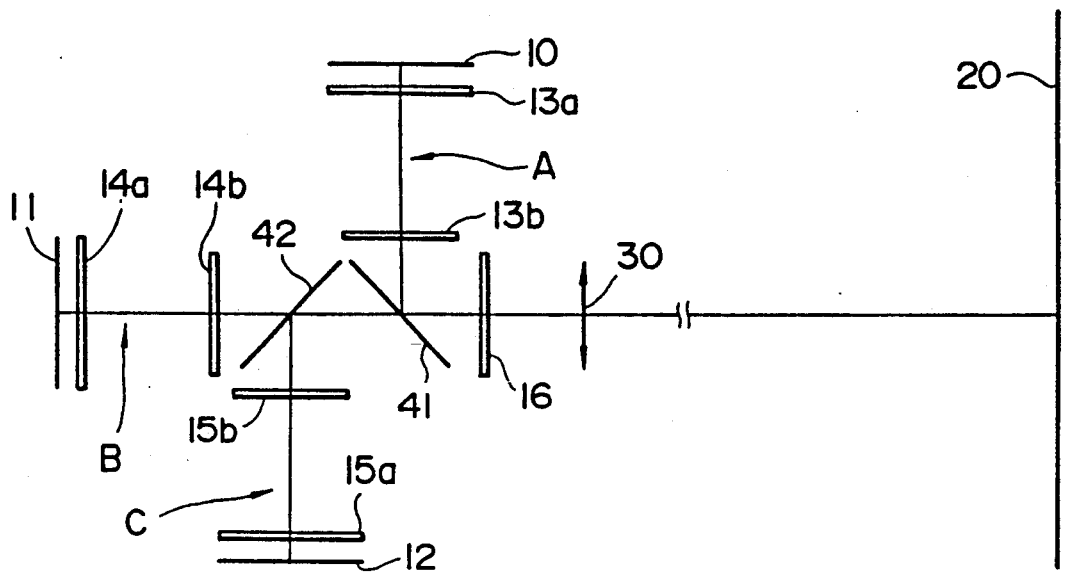
FIG. 51 is a schematic view of a projector of Embodiment 23 according to the present invention.
Figure 52:
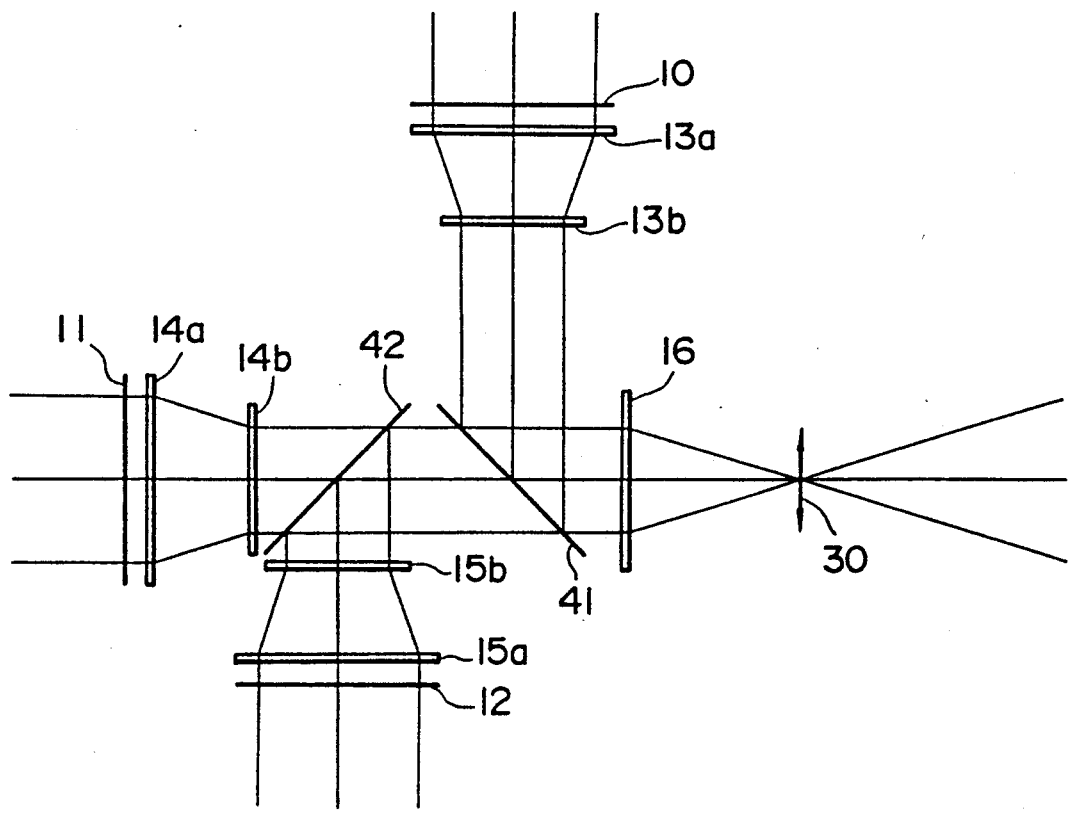
FIG. 52 is an enlarged view of the light path overlapping portion in FIG. 51.

FIG. 51 and FIG. 52 show Embodiment 23 of the projector according to the present invention.

In Embodiment 22, since a telecentric lens is used on the chart side as the projecting lens, a projecting lens having an equal size to the diameter of the luminous flux is required. In Embodiment 23, the auxiliary lens 16 for converging the luminous flux is disposed between the projecting lens 30 and the dichroic mirror in order to reduce the effective diameter required for the projecting lens.

A concrete numerical example will now be described.

The numerical values set forth hereunder are related to the projecting optical systems B, C. With regard to the projecting optical system A, the distance from the auxiliary lens to the mirror 41 is the same (97 mm) to the other projecting optical systems, although the mirror 42 is not provided. The thickness of seven auxiliary lenses are all 2.000 mm.

| focal length of the positive auxiliary lens | 100.000 mm |
|---|---|
| focal length of the negative auxiliary lens | −65.000 mm |
| focal length of the auxiliary lens 16 | 65.000 mm |
| focal length of the projecting lens | −43.120 mm |
| the image forming means ~ incident surface of the positive auxiliary lens | 7.000 mm |
| the outgoing surface of the positive auxiliary lens ~ incident surface of the negative auxiliary lens | 35.000 mm |
| the outgoing surface of the negative auxiliary lens ~ the mirror 42 | 32.000 mm |
| the mirror 42 ~ the mirror 41 | 65.000 mm |
| the mirror 41 ~ incident surface of the auxiliary lens 16 | 43.000 mm |
| outgoing surface of the auxiliary lens 16 ~ the projecting lens | 65.000 mm |
| the projecting lens ~ the screen | 1549.870 mm |
| effective aperture of the positive auxiliary lens | 80.000 mm |
| effective aperture of the negative auxiliary lens | 70.000 mm |
| effective aperture of the auxiliary lens 16 | 90.000 mm |
| effective aperture of the projecting lens | 40.000 mm |

Embodiment 24

Figure 53:
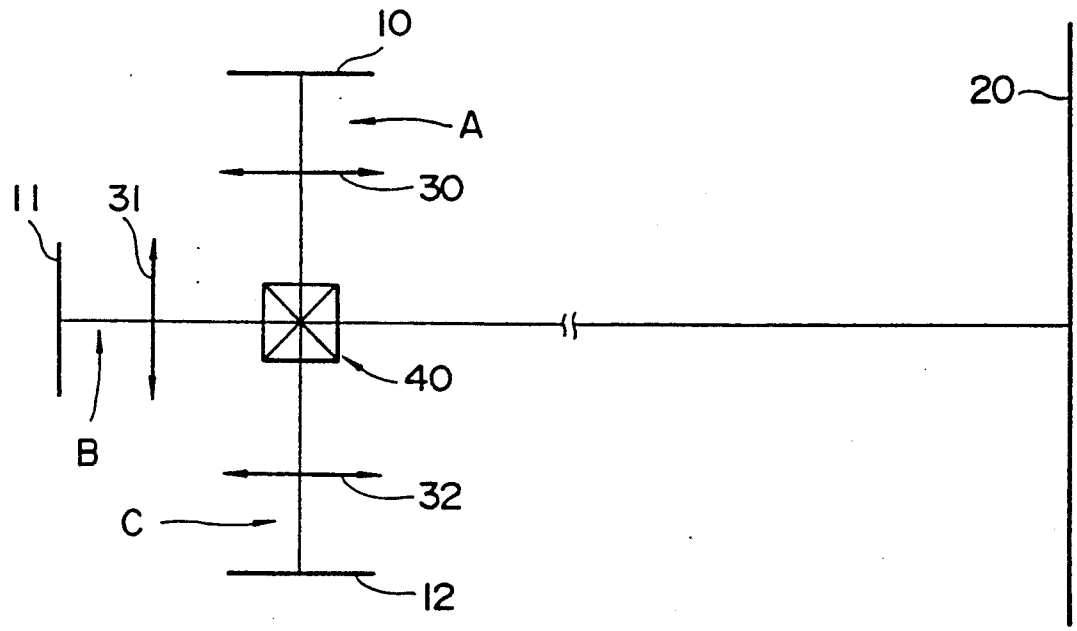
FIG. 53 is a schematic view of a projector of Embodiment 24 according to the present invention.
Figure 54:
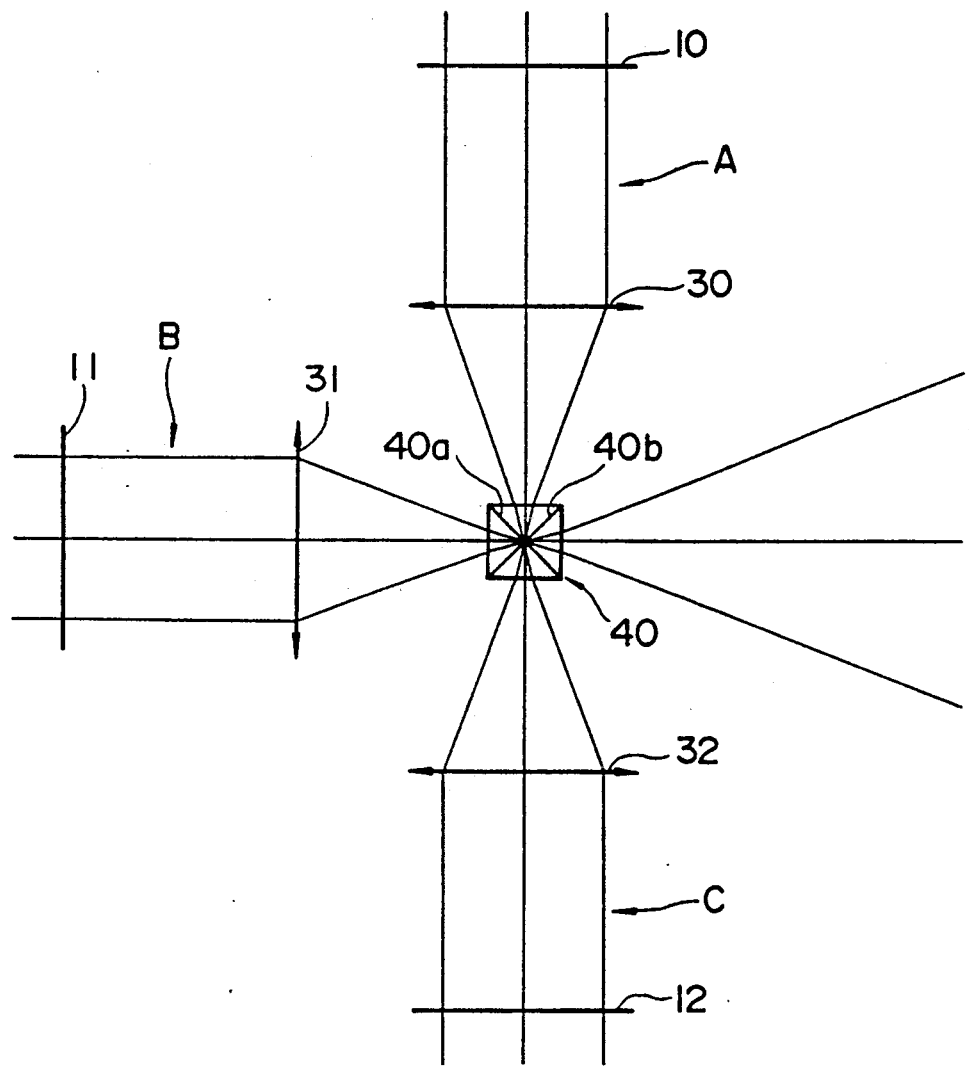
FIG. 54 is an enlarged view of the light path overlapping portion in FIG. 53.

FIG. 53 and FIG. 54 show Embodiment 24 of the projector according to the present invention, FIG. 53 is an overall view, and FIG. 54 is an enlarged view of a portion for overlapping the luminous flux.

This projector, as shown in FIG. 53, includes the LCDs 10, 11, 12, three projecting lenses 30, 31, 32 disposed corresponding to these LCDs, and the dichroic prism 40 for overlapping the luminous flux from the respective projecting lenses and projecting the same onto the screen 20 of the transmitting type.

In FIG. 53, one central principal ray is shown for each prejecting optical system, and in FIG. 54, three principal rays are shown for each of them.

The optical axes of the projecting lenses of the projecting optical systems are disposed to be aligned with the central axes of the LCDs. The optical axes of the projecting lenses 30, 32 of the peripheral projecting optical systems A, C is perpendicular to the optical axis of the projecting lens 31 of the central projecting optical system B.

The dichroic prism 40 is provided with a dichroic surface 40a having such characteristics that the R component is reflected and other components are permitted to transmit therethrough, and with another dichroic surface 40b having such characteristics that the B component is reflected and other components are permitted to transmit therethrough, the dichroic surfaces 40a, 40b being mutually intersected at the point of intersection of the optical axes of the respective projecting lenses. Also, the dichroic surfaces 40a, 40b are tilted by 45° relative to the optical axis of the projecting lens 31, respectively.

According to this construction, the parallel luminous flux of the various color components transmitted through the respective LCDs is made into a convergent light by the projecting lens and made incident to the dichroic prism 40. And these luminous fluxes are overlapped one upon the other by the dichroic prism 40 and projected onto the screen 20 in the overlapping fashion to form a color image thereon.

A concrete numerical example will be described.

The distances mentioned hereunder are along the optical axis, and the distance indication within the prism is not an air converted distance but an actual distance.

| | |
|---|---|
| focal length of the projecting lenses | 80.000 mm |
| refractive index of the prism | 1.51633 |
| the image forming means ~ the projecting lens | 85.161 mm |
| the projecting lens ~ incident surface of the prism | 70.108 mm |
| incident surface of the prism ~ outgoing surface of the prism | 30.000 mm |
| outgoing surface of the prism ~ the screen | 1230.108 mm |
| effective aperture of the projecting lenses | 90.000 mm |
| one side of the prism | 30.000 mm |

In the case of the prior art including only one projecting lens, it is necessary, in order to project the similar chart as in the case mentioned above, to form that one side of the prism for projecting the chart is 80.000 mm and the effective diameter of the projecting lens is 90.000 mm.

Embodiment 25

Figure 55:
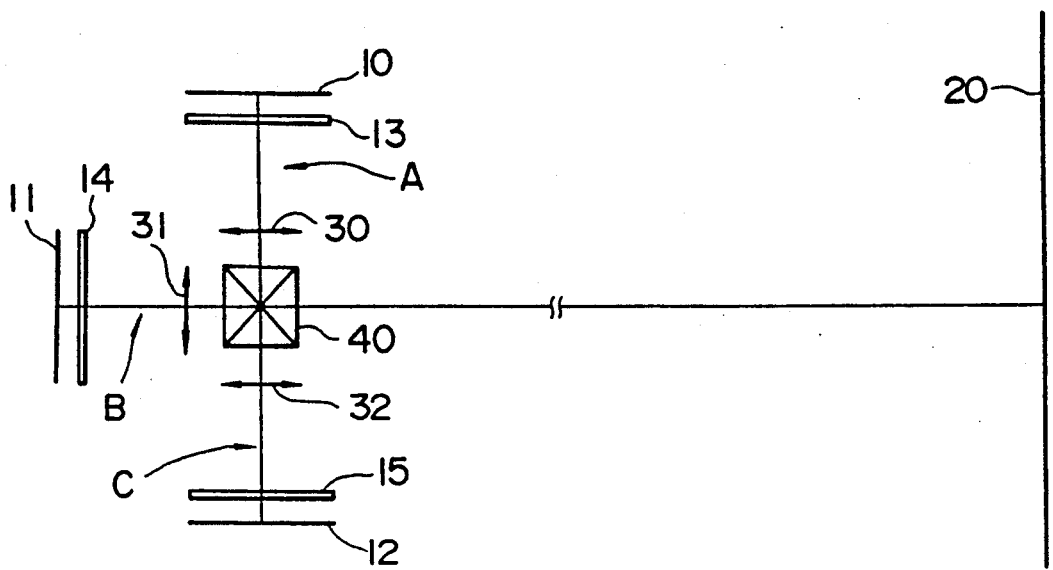
FIG. 55 is a schematic view of a projector of Embodiment 25 according to the present invention.
Figure 56:
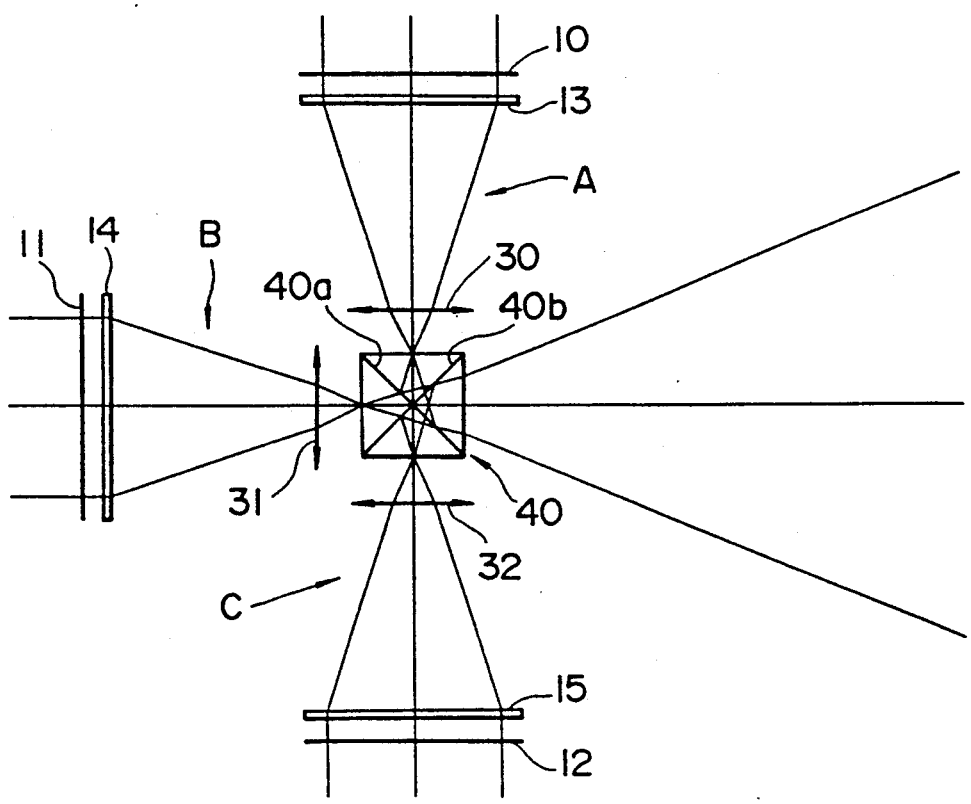
FIG. 56 is an enlarged view of the light path overlapping portion in FIG. 55.

FIG. 55 and FIG. 56 show Embodiment 25 of the projector according to the present invention, FIG. 55 is an overall view, and FIG. 56 is an enlarged view of a portion for overlapping the luminous flux.

This projector has the auxiliary lenses 13, 14, 15 disposed between the LCDs and the projecting lenses and adapted to reduce the diameter of the luminous flux coming from the respective LCDs. All the other constructions are the same as those of Embodiment 24.

With this construction, the diameter of the luminous flux made incident to the projecting lenses is smaller than that of Embodiment 24. In this example, the exit pupil of each projecting lens coincides with the end face on the incident side of the luminous flux of the prism.

Next, a concrete numerical example will be described.

| | |
|---|---|
| focal length of the auxiliary lens | 100.000 mm |
| focal length of the projecting lens | 80.000 mm |
| refractive index of the prism | 1.51633 |
| the image forming means ~ incident surface of the auxiliary lens | 7.000 mm |
| the outgoing surface of the auxiliary lens ~ the projecting lens | 78.023 mm |
| the projecting lens ~ incident surface of the prism | 17.241 mm |
| incident surface of the prism ~ outgoing surface of the prism | 40.000 mm |
| outgoing surface of the prism ~ the screen | 1189.581 mm |
| effective aperture of the auxiliary lens | 80.000 mm |
| effective aperture of the projecting lens | 40.000 mm |
| one side of the prism | 40.000 mm |

Embodiment 26

Figure 57:
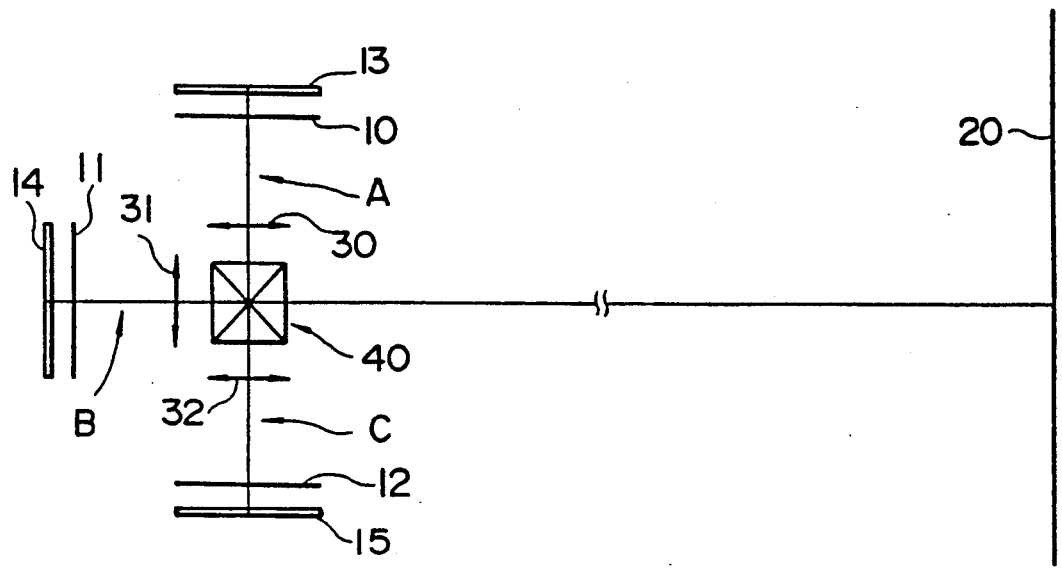
FIG. 57 is a schematic view of a projector of Embodiment 26 according to the present invention.
Figure 58:
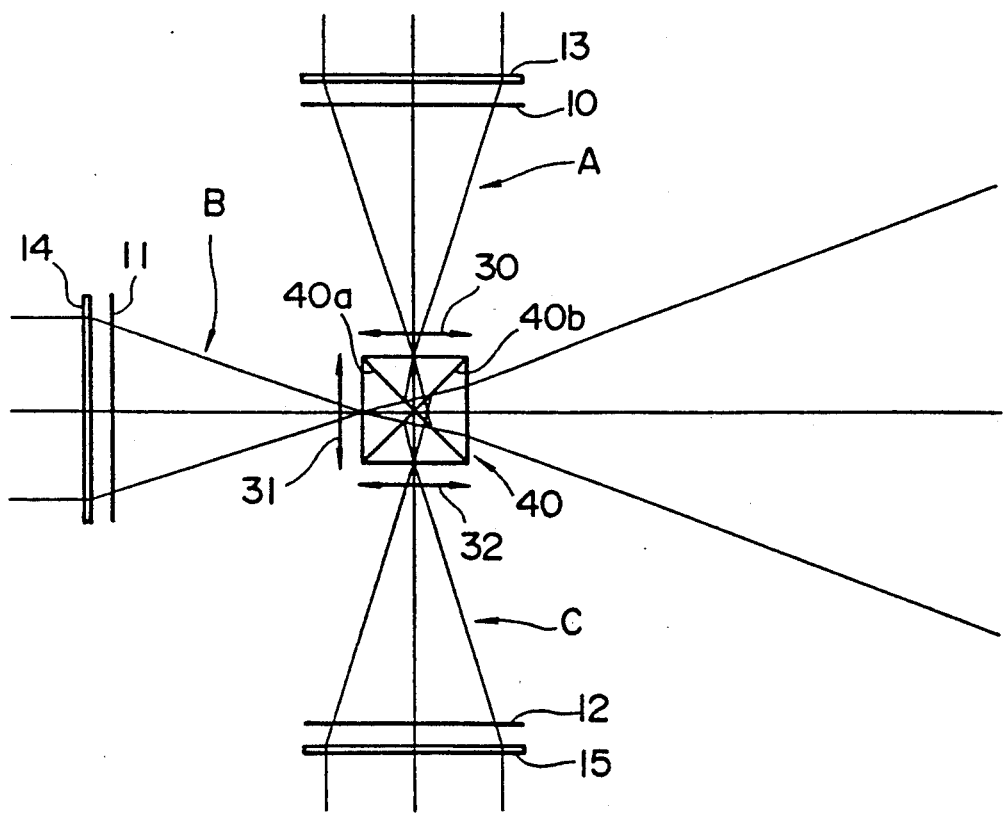
FIG. 58 is an enlarged view of the light path overlapping portion in FIG. 57.

FIG. 57 and FIG. 58 show Embodiment 26 of the projector according to the present invention, FIG. 57 is an overall view, and FIG. 58 is an enlarged view of a portion for overlapping the luminous flux.

This projector has the auxiliary lenses disposed between a light source and the LCDs, so that the luminous flux made incident to the LCDs are made into a convergent luminous flux. All the other constructions are the same to Embodiment 25. Also in this example, the exit pupil of the projecting lens coincides with the incident end face of the prism.

In Embodiment 25, the parallel luminous flux is made incident to the LCD and is thus preferable. However, it has created such a state where irregularity of transmittance readily occurs to the dichroic mirror. To the contrary, in the case of Embodiment 26, the projector is preferable to that of Embodiment 25 in view of the performance of the dichroic mirror.

A concrete numerical construction will now be described.

| | |
|---|---|
| focal length of the auxiliary lens | 100.000 mm |
| focal length of the projecting lens | 80.000 mm |
| refractive index of the prism | 1.51633 |
| the outgoing surface of the auxiliary lens ~ the image forming means | 7.000 mm |
| the chart ~ the projecting lens | 85.161 mm |
| the projecting lens ~ incident surface of the prism | 7.138 mm |
| incident surface of the prism ~ outgoing surface of the prism | 40.000 mm |
| outgoing surface of the prism ~ the screen | 1286.483 mm |
| effective aperture of the auxiliary lens | 80.000 mm |
| effective aperture of the projecting lens | 40.000 mm |
| one side of the prism | 40.000 mm |

Embodiment 27

Figure 59:
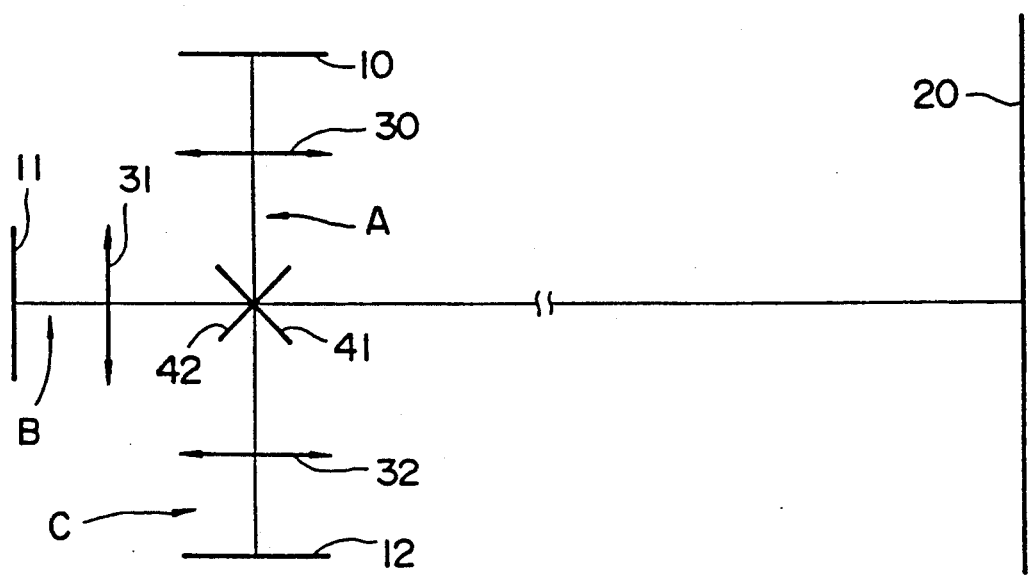
FIG. 59 is a schematic view of a projector of Embodiment 27 according to the present invention.
Figure 60:
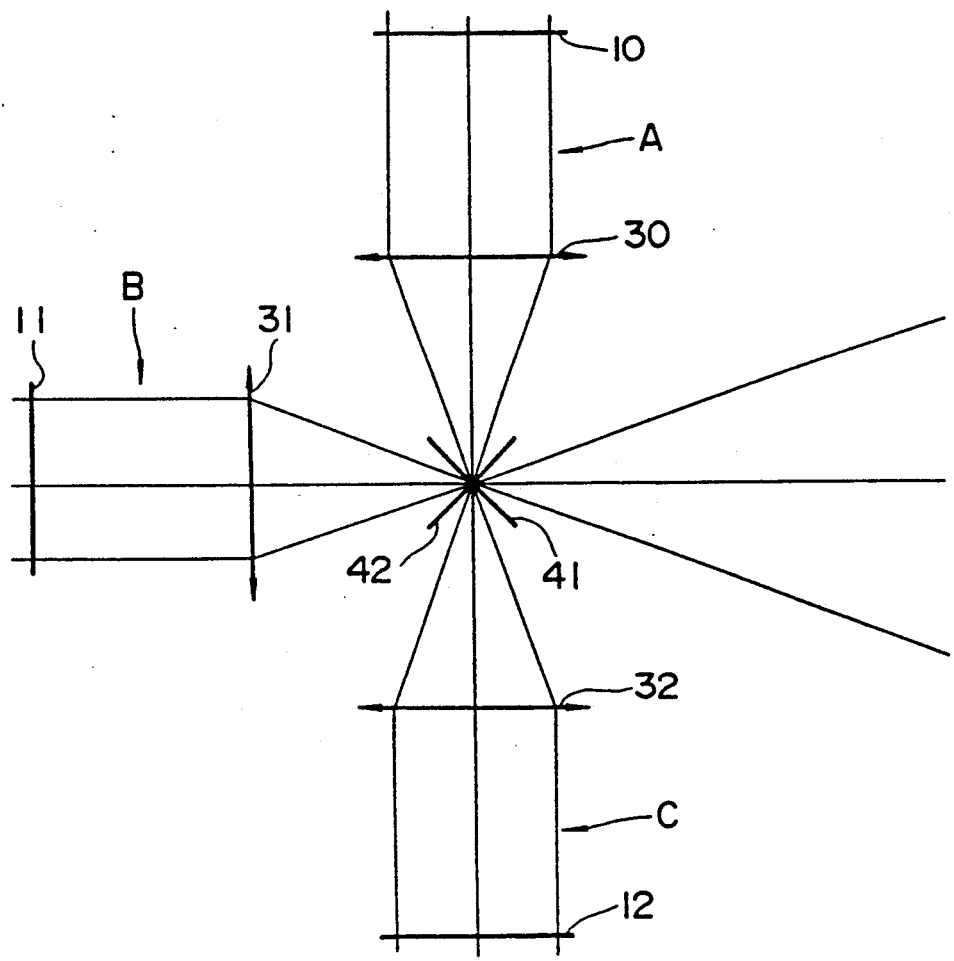
FIG. 60 is an enlarged view of the light path overlapping portion in FIG. 59.

FIG. 59 and FIG. 60 show Embodiment 27 of the projector according to the present invention, FIG. 59 is an overall view, and FIG. 60 is an enlarged view of a portion for overlapping the luminous flux.

As shown in the Figures, the projector is constructed such that the luminous flux coming from three projecting optical systems A, B, C comprising the LCDs 10, 11, 12 and the projecting lenses 30, 31, 32 are overlapped by two dichroic mirrors 41, 42 disposed in such a manner to be mutually intersected at the point of intersection of the optical axes of the respective projecting lenses and then made incident to the screen 20.

In FIG. 59, one central principal ray is shown for each projecting optical system, and in FIG. 60, three principal rays are shown for each of them.

The dichroic mirror 41 has such characteristics as that the R component is reflected and other components are permitted to transmit therethrough, and the other dichroic mirror 42 has such characteristics as that the B component is reflected and other components are permitted to transmit therethrough. Also, the dichroic mirrors are tilted by 45° relative to the optical axis of the projecting lens 31, respectively.

According to this construction, the parallel luminous flux of the various color components transmitted through the respective LCDs is made into a convergent light by the projecting lens and made incident to the dichroic mirrors 41, 42. And these luminous fluxes are overlapped one upon the other by the dichroic mirrors 41, 42 and projected onto the screen 20 in the overlapping state to form a color image thereon. The exit pupil of each projecting lens is coincident with the point of intersection of the mirror.

A concrete numerical example will now be described.

| | |
|---|---|
| focal length of the projecting lens | 80.000 mm |
| the image forming means ~ the projecting lens | 85.161 mm |
| the projecting lens ~ the mirror | 80.000 mm |
| the mirror ~ the screen | 1240.000 mm |
| effective aperture of the projecting lens | 90.000 mm |

Embodiment 28

Figure 61:
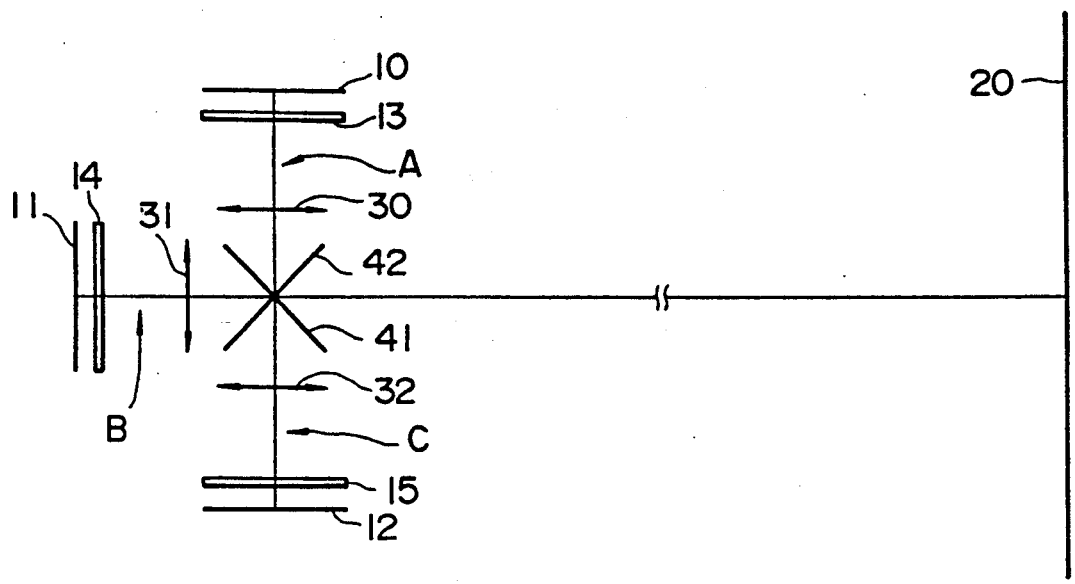
FIG. 61 is a schematic view of a projector of Embodiment 28 according to the present invention.
Figure 62:
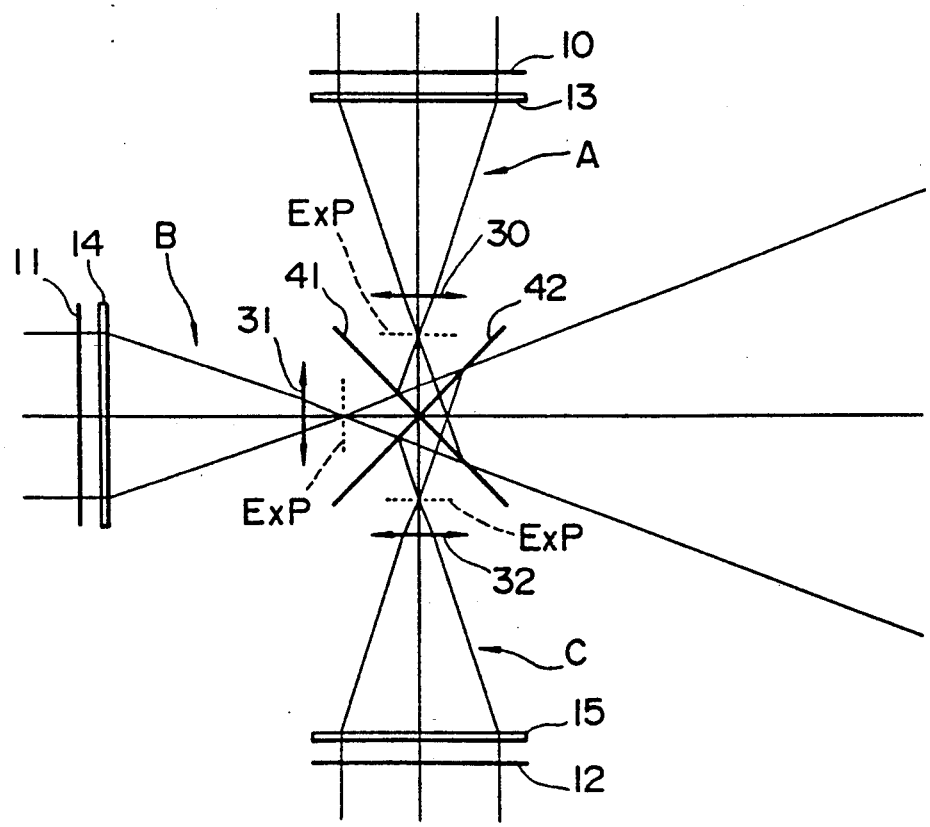
FIG. 62 is an enlarged view of the light path overlapping portion in FIG. 61.

FIG. 61 and FIG. 62 show Embodiment 28 of the projector according to the present invention, FIG. 61 is an overall view, and FIG. 62 is an enlarged view of a portion for overlapping the luminous flux.

This projector has the auxiliary lenses 13, 14, 15 disposed between the LCDs and the projecting lenses and adapted to reduce the diameter of the luminous flux coming from the respective LCDs. All the other constructions are the same as those of Embodiment 27.

With this construction, the diameter of the luminous flux made incident to the projecting lenses is reduced and the diameter of the projecting lens becomes smaller than Embodiment 27.

Next, a concrete numerical example will be described.

The thickness of the auxiliary lens is 2.000 mm.

| | |
|---|---|
| focal length of the auxiliary lens | 100.000 mm |
| focal length of the projecting lens | 80.000 mm |
| the image forming means ~ incident surface of the auxiliary lens | 7.000 mm |
| the outgoing surface of the auxiliary lens ~ the projecting lens | 78.023 mm |
| the projecting lens ~ exit pupil | 17.241 mm |
| exit pupil ~ the mirror | 30.000 mm |
| the mirror ~ the screen | 1185.960 mm |
| effective aperture of the auxiliary lens | 80.000 mm |
| effective aperture of the projecting lens | 50.000 mm |

Embodiment 29

Figure 63:
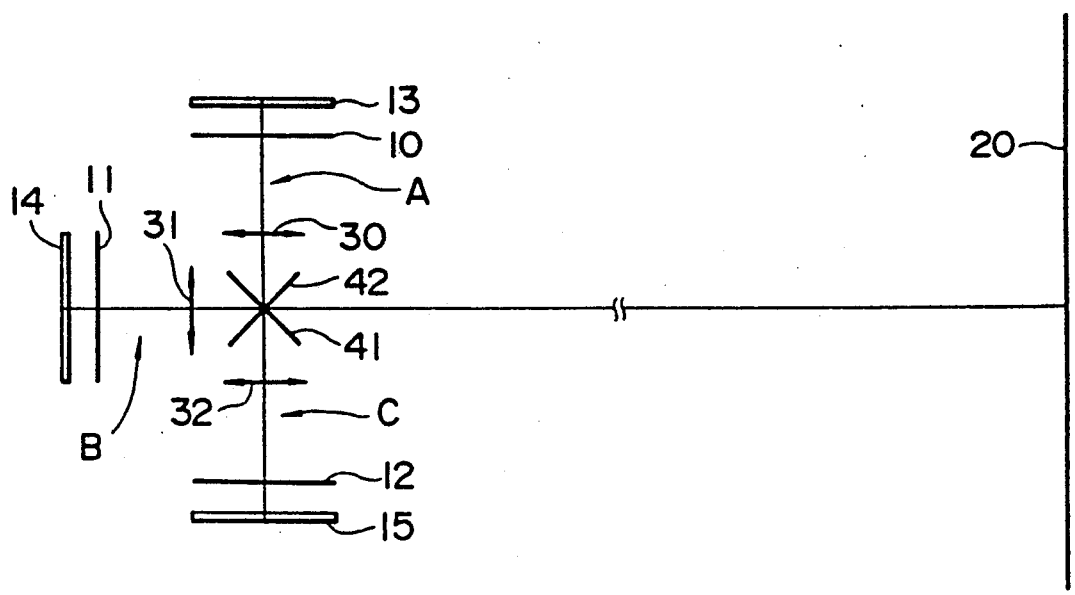
FIG. 63 is a schematic view of a projector of Embodiment 29 according to the present invention.
Figure 64:
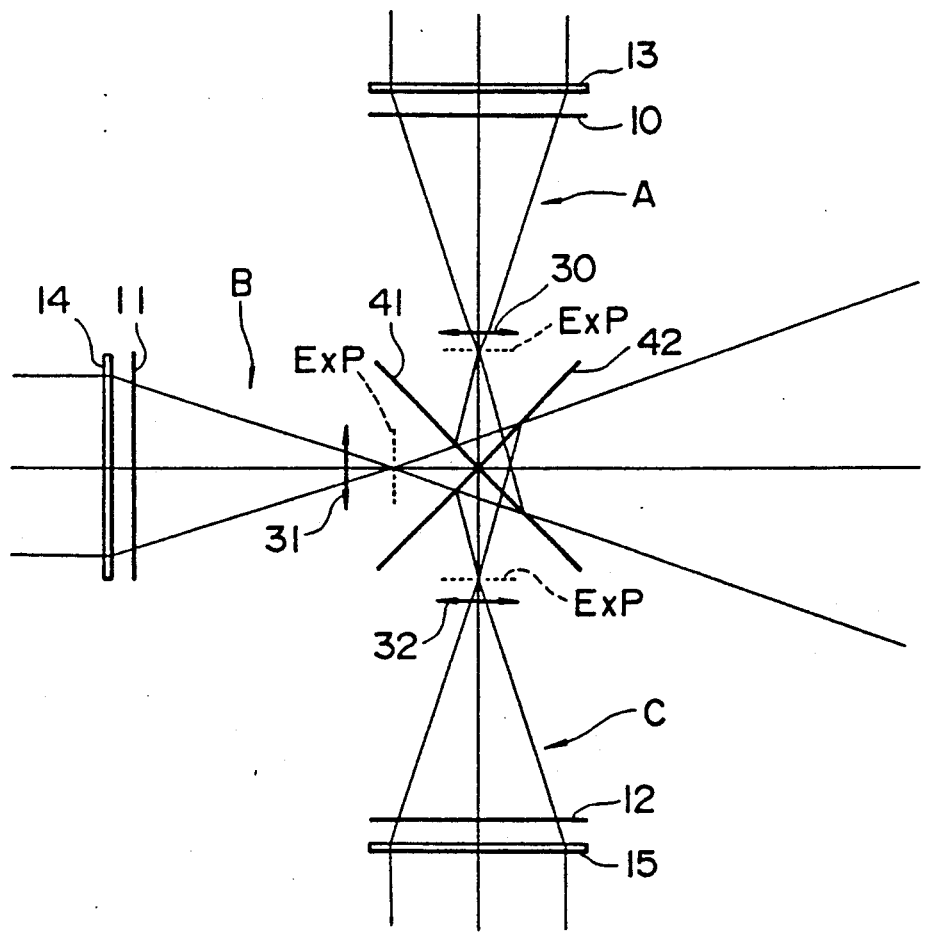
FIG. 64 is an enlarged view of the light path overlapping portion in FIG. 63.

FIG. 63 and FIG. 64 show Embodiment 29 of the projector according to the present invention, FIG. 63 is an overall view, and FIG. 64 is an enlarged view of a portion for overlapping the luminous flux.

This projector has the auxiliary lenses disposed between a light source and the LCDs, so that the luminous flux made incident to the ICDs is made into a convergent luminous flux. All the other constructions are the same as those of Embodiment 28.

In Embodiment 28, the parallel luminous flux is made incident to the LCD and is thus preferable. However, it has created such a state where irregularity of transmittance readily occurs to the dichroic mirror. To the contrary, in the case of Embodiment 29, the projector is preferable to that of Embodiment 28 in view of the performance of the dichroic mirror.

A concrete numerical construction will now be described.

| | |
|---|---|
| focal length of the auxiliary lens | 100.000 mm |
| focal length of the projecting lens | 80.000 mm |
| the outgoing surface of the auxiliary lens ~ the image forming means | 7.000 mm |
| the image forming means ~ the projecting lens | 85.161 mm |
| the projecting lens ~ exit pupil | 7.138 mm |
| exit pupil ~ the mirror | 42.862 mm |
| the mirror ~ the screen | 1270.000 mm |
| effective aperture of the auxiliary lens | 80.000 mm |
| effective aperture of the projecting lens | 40.000 mm |

Embodiment 30

Figure 65:
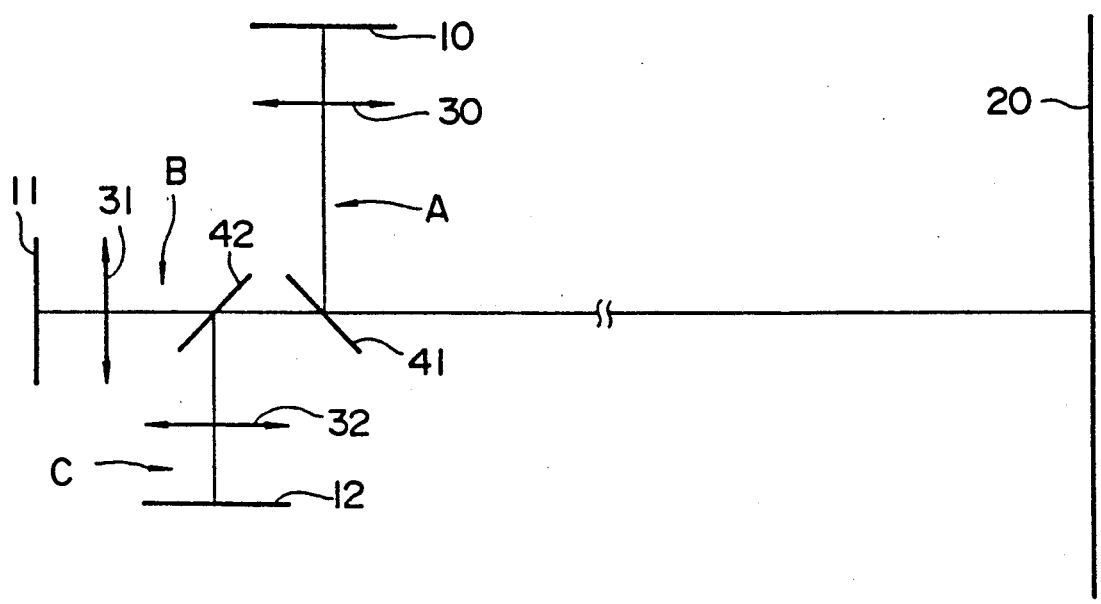
FIG. 65 is a schematic view of a projector of Embodiment 30 according to the present invention.
Figure 66:
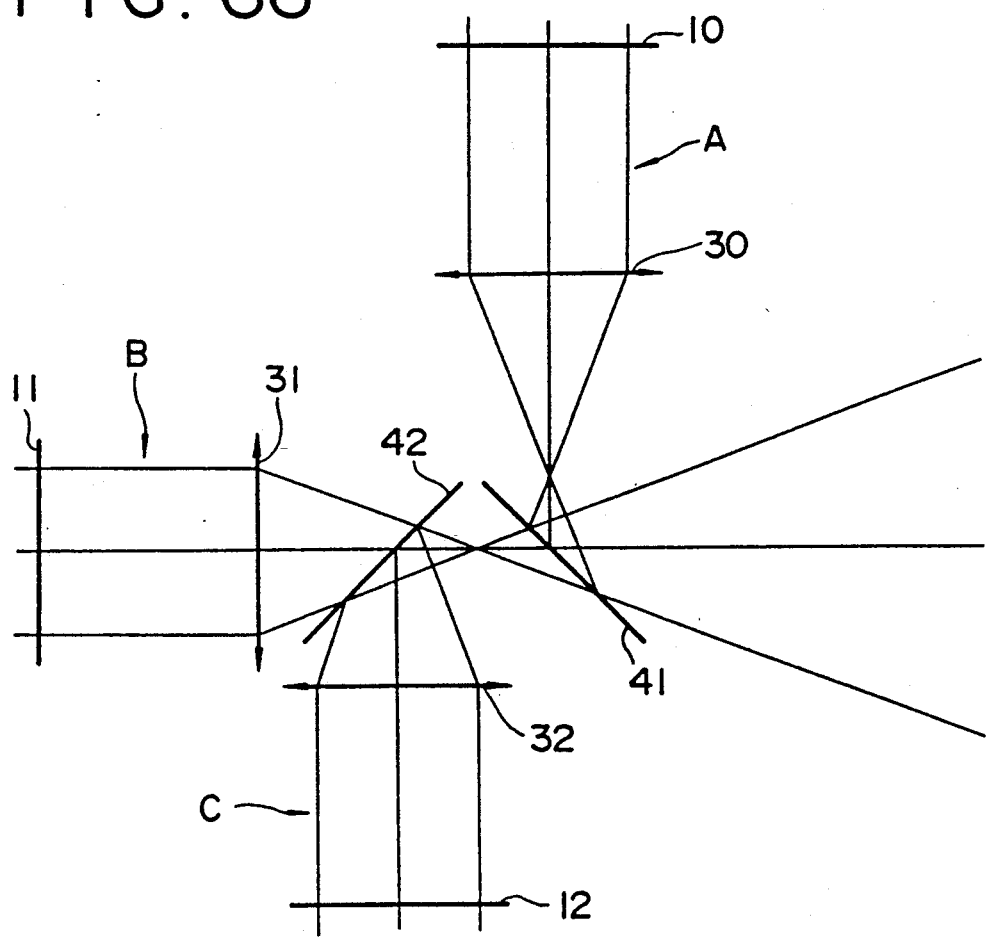
FIG. 66 is an enlarged view of the light path overlapping portion in FIG. 65.

FIG. 65 and FIG. 66 show Embodiment 30 of the projector according to the present invention, FIG. 65 is an overall view, and FIG. 66 is an enlarged view of a portion for overlapping the luminous flux.

As shown in the Figures, the projector is constructed such that the luminous flux coming from three projecting optical systems A, B, C comprising the LCDs 10, 11, 12 and the auxiliary lenses 13, 14, 15 are overlapped by two dichroic mirrors 41, 42 disposed independently and then made incident to the projecting lens 30.

In FIG. 65, one central principal ray is shown for each projecting optical system, and in FIG. 66, three principal rays are shown for each of them.

The dichroic mirror 41 has such characteristics that the R component is reflected and other components are permitted to transmit therethrough, and the other dichroic mirror 42 has such characteristics that the B component is reflected and other components are permitted to transmit therethrough. Also, the dichroic mirrors are tilted by 45° relative to the optical axis of the projecting lens 31, respectively.

According to this construction, the parallel luminous flux of the various color components transmitted through the respective LCDs is made into a convergent light by the projecting lens and made incident to the dichroic mirrors 41, 42. And these luminous fluxes, are overlapped one upon the other by the dichroic mirrors 41, 42 and projected onto the screen 20 in the overlapping state to form a color image thereon.

A concrete numerical example will now be described.

The numerical values set forth hereunder are related to the projecting optical systems B, C. With regard to the projecting optical system A, the distance from the exit pupil to the mirror 41 is the same (110 mm) to the other projecting optical systems although the mirror 42 is not provided.

| | |
|---|---|
| focal length of the projecting lens | 80.000 mm |
| the image forming means ~ the projecting lens | 85.161 mm |
| the projecting lens ~ the mirror 42 | 50.000 mm |
| the mirror 42 ~ the mirror 41 | 60.000 mm |
| the mirror 41 ~ the screen | 1210.000 mm |
| effective aperture of the projecting lenses | 90.000 mm |

Embodiment 31

Figure 67:
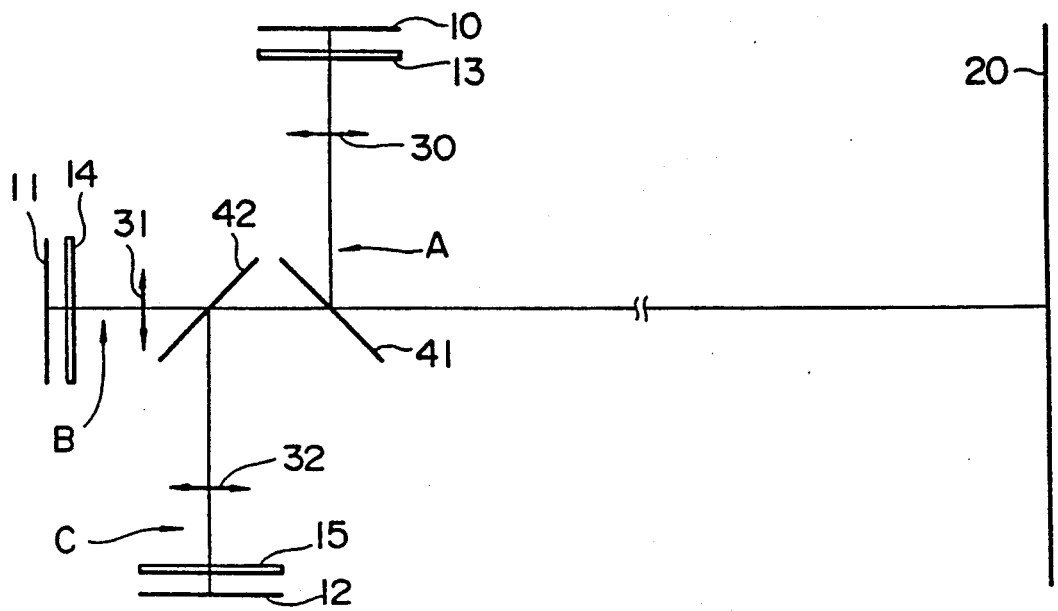
FIG. 67 is a schematic view of a projector of Embodiment 31 according to the present invention.
Figure 68:
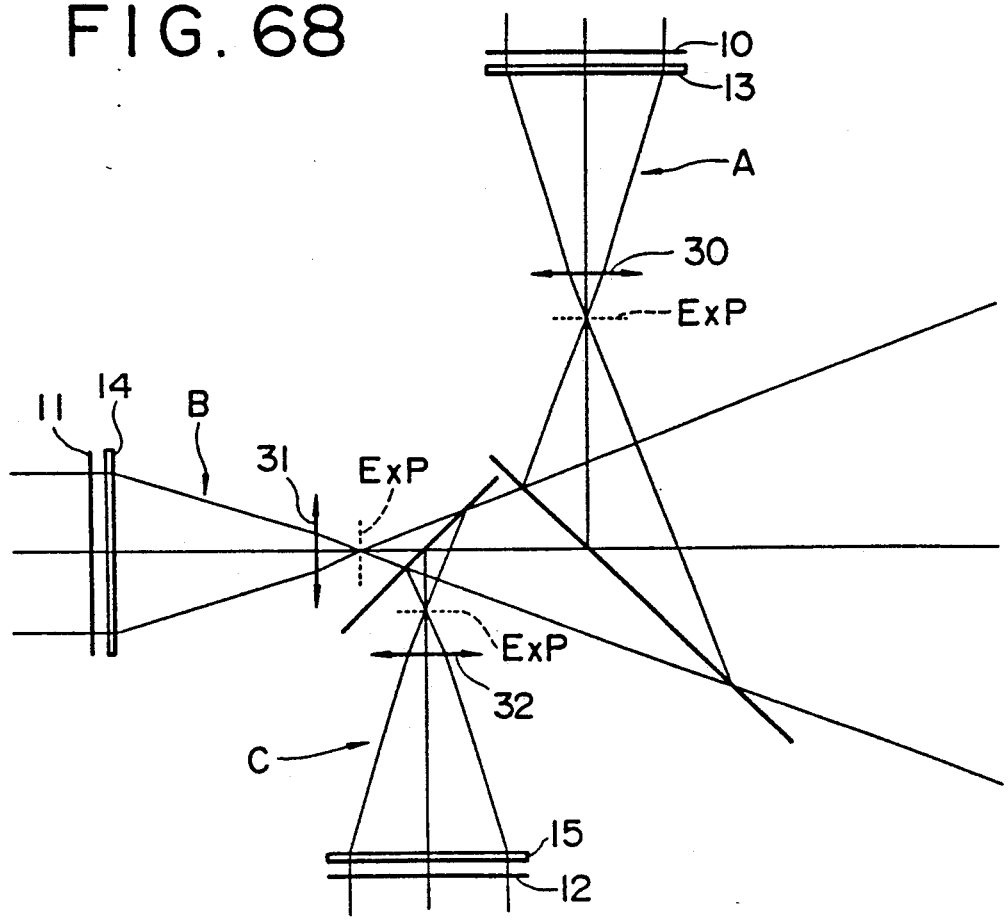
FIG. 68 is an enlarged view of the light path overlapping portion in FIG. 67.

FIG. 67 and FIG. 68 show Embodiment 31 of the projector according to the present invention, FIG. 67 is an overall view, and FIG. 68 is an enlarged view of a portion for overlapping the luminous flux.

This projector has the auxiliary lenses 13, 14, 15 disposed between the LCDs and is the projecting lenses and adapted to reduce the diameter of the luminous flux coming from the respective LCDs. All the other constructions are the same as those of Embodiment 30.

With this construction, the diameter of the luminous flux made incident to the projecting lenses is reduced and the diameter of the projecting lens becomes smaller than Embodiment 30.

Next, a concrete numerical example will be described.

The thickness of the auxiliary lens is 2.000 mm.

The numerical values set forth hereunder are related to the projecting optical systems B, C. With regard to the projecting optical system A, the distance from the exit pupil to the mirror 41 is the same (90 mm) to the other projecting optical systems, although the mirror 42 is not provided.

| | |
|---|---|
| focal length of the auxiliary lens | 100.000 mm |
| focal length of the projecting lens | 80.000 mm |
| the chart ~ incident surface of the auxiliary lens | 7.000 mm |
| the outgoing surface of the auxiliary lens ~ the projecting lens | 78.023 mm |
| the projecting lens ~ exit pupil | 17.241 mm |
| exit pupil ~ the mirror 42 | 25.000 mm |
| the mirror 42 ~ the mirror 41 | 65.000 mm |
| the mirror 41 ~ the screen | 1125.960 mm |
| effective aperture of the auxiliary lens | 80.000 mm |
| effective aperture of the projecting lens | 50.000 mm |

Embodiment 32

Figure 69:
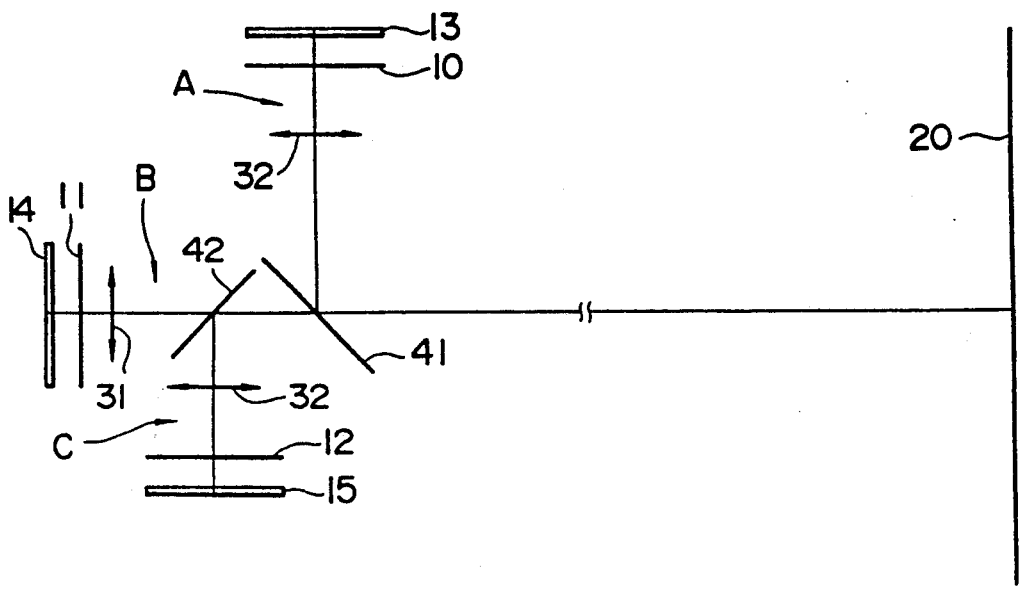
FIG. 69 is a schematic view of a projector of Embodiment 32 according to the present invention.
Figure 70:
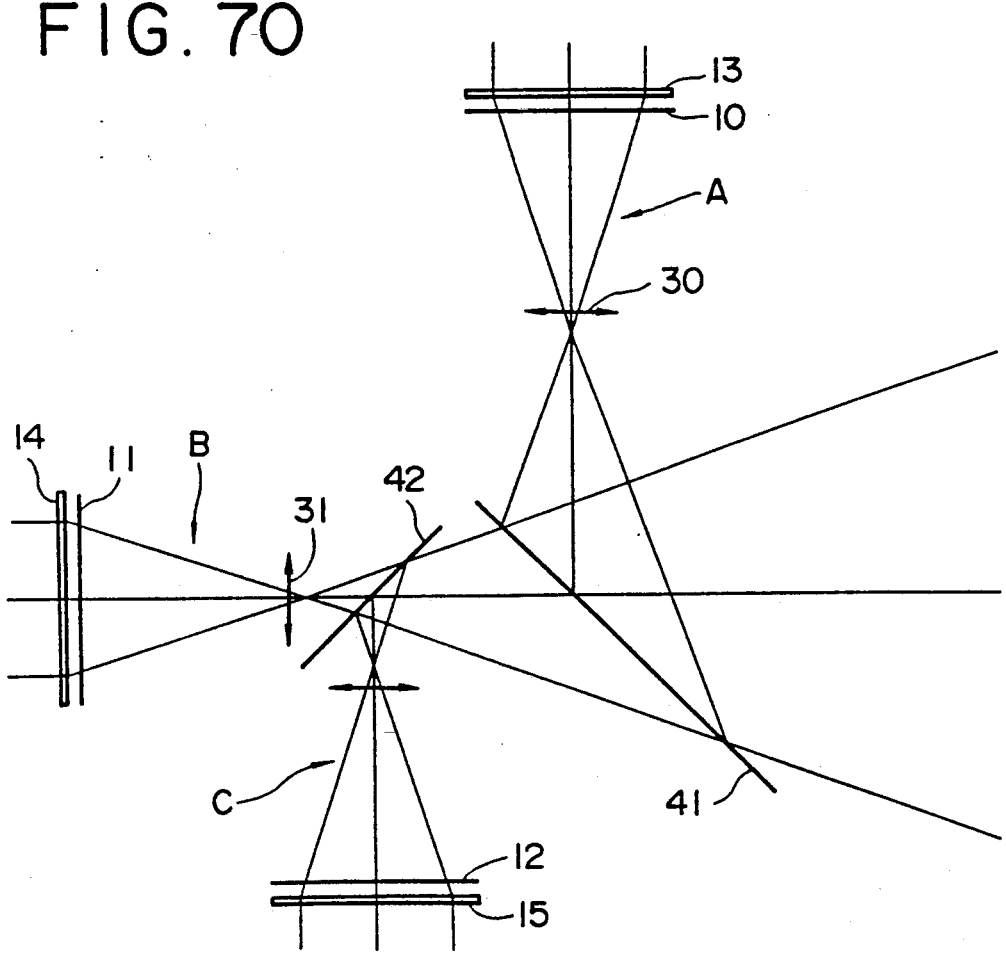
FIG. 70 is an enlarged view of the light path overlapping portion in FIG. 69.

FIG. 69 and FIG. 70 show Embodiment 32 of the projector according to the present invention, FIG. 69 is an overall view, and FIG. 70 is an enlarged view of a portion for overlapping the luminous flux.

This projector has the auxiliary lenses disposed between a light source and the LCDs and is adapted to reduce the diameter of the luminous flux made incident to the LCD. All the other constructions are the same as those of Embodiment 31.

In Embodiment 31, the parallel luminous flux is made incident to the LCD and is thus preferable. However, it is created such a state where irregularity of transmittance readily occurs to the dichroic mirror. To the contrary, in the case of Embodiment 32, the projector is preferable to that of Embodiment 31 in view of the performance of the dichroic mirror.

A concrete numerical construction will now be described.

The numerical values set forth hereunder are related to the projecting optical systems B, C. With regard to the projecting optical system A, the distance from the projecting lens to the mirror 41 is the same (110 mm) as the other projecting optical systems, although the mirror 42 is not provided.

| | |
|---|---|
| focal length of the auxiliary lens | 100.000 mm |
| focal length of the projecting lens | 80.000 mm |
| the outgoing surface of the auxiliary lens ~ the image forming means | 7.000 mm |
| the image forming means ~ the projecting lens | 85.161 mm |
| the projecting lens ~ the mirror 42 | 30.000 mm |
| the mirror 42 ~ the mirror 41 | 80.000 mm |
| the mirror 41 ~ the screen | 1210.000 mm |
| effective aperture of the auxiliary lens | 80.000 mm |
| effective aperture of the projecting lens | 40.000 mm |

What is claimed is:

1. A projector comprising:
   a central projecting optical system positioned perpendicularly to a screen;
   a peripheral projecting optical system disposed on each of two sides of said central projecting optical system, wherein each optical system defines a respective optical axis;
   each of said peripheral projecting optical systems includes a mirror adapted to deflect each respective optical axis toward said screen and in parallel with the optical axis of said central projecting optical system.

2. A projector according to claim 1, which includes a pivot mechanism for pivoting said mirror.

3. The projector of claim 1, wherein at least one of said peripheral projecting optical systems is located substantially perpendicular to said central projecting optical system.

4. The projector of claim 1, wherein each said mirror is adapted to reduce the distance, between said respective optical axes.

5. A projector comprising:
   projecting optical systems including means for forming images and projecting lenses for projecting said images onto a screen having a side nearer said projecting optical systems, wherein said projecting optical systems are arranged so that the optical axes of said projecting lenses intersect at a point substantially short of said screen;
   at least one of said projecting optical systems including a mirror disposed between said image forming means and said point to deflect the optical axis toward said screen so that said optical axes intersect with each other substantially on said side nearer said projecting optical systems.

6. A projector according to claim 5, wherein said mirror is a total reflection mirror.

7. A projector according to claim 5, wherein said mirror is a dichroic mirror.

8. A projector according to claim 5, wherein said projecting lenses of said projecting optical systems are compatible lenses.

9. A projector according to claim 5, wherein at least one of said projecting lenses of said projecting optical systems has a diameter which is substantially different than a diameter of the other said projecting lenses of said projecting optical systems.

10. A projector according to claim 5, which includes a pivot mechanism for pivoting said mirror for adjustment.

11. The projector of claim 5, wherein at least one of said projecting lenses is located substantially perpendicular to at least one other of said projecting lenses.

12. A projector for projecting plural images onto a screen in an overlapping fashion, comprising:
   means for forming plural images comprising at least two means for forming images, wherein the optical axes of said image forming means intersect with each other at a point substantially short of said screen;
   at least one projecting lens for projecting images which are formed by said plural images forming means; and
   at least one mirror disposed between one of said means for forming images and said point, wherein each said at least one mirror deflects only light beams which are emitted from said means for forming images.

13. The projector of claim 12, wherein at least one of said means for forming images emits light beams which are unobstructed by mirrors.

14. The projector of claim 13, wherein said screen has a side nearer said at least one projecting lens; and
   each said at least one mirror which is disposed between one of said image forming means and said screen deflects only light beams which are emitted from said image forming means, said light beams converging substantially on said nearer side of said screen.

15. The projector of claim 12, wherein said plural image forming means comprises a central optical projecting system and at least a peripheral projecting optical system disposed on each of two sides of said central projecting optical system, wherein each said optical projection system is oriented to define an optical axis.

16. The projector of claim 15, wherein said at least one mirror reduces an angle of intersection between light beams emitted from at least one of said peripheral projecting optical systems and light beams emitted from said central optical projecting system.

17. The projector of claim 12, wherein said at least one mirror is adapted to reduce a minimum distance, between optical axes which are defined by said means for forming plural images.

18. The projector of claim 12, further comprising:
   an auxiliary lens, corresponding to each said image forming means, for reducing the diameter of luminous flux which is incident into said at least one projecting lens.

19. The projector of claim 18, comprising:
   a projecting lens, corresponding to each said auxiliary lens, for projecting the luminous flux transmitted through each said auxiliary lens.

20. The projector of claim 12, wherein said plural images forming means comprises projecting optical systems, each said projecting optical system comprising:
   means for forming an image and an auxiliary lens adapted to reduce a diameter of luminous flux projected from said means for forming an image;
   said at least one projecting lens comprises a single lens for projecting luminous flux coming from each said projecting optical system onto said screen; and
   said at least one mirror adapted to reflect the luminous flux of a corresponding one of said projecting optical systems.

21. The projector of claim 12, wherein said plural image forming means comprises projecting optical systems, each said projecting optical system comprising:
   means for forming an image and an auxiliary lens adapted to reduce a diameter of luminous flux projected from said means for forming an image;
   said at least one projecting lens comprises a projecting lens, corresponding to each said projecting optical system, for projecting luminous flux coming from said respective projecting optical system onto said screen; and
   said at least one mirror adapted to reflect the luminous flux of a corresponding one of said projecting optical systems.

22. The projector of claim 20, wherein said means for forming an image of each said projecting optical system associated with one of said mirrors, is asymmetrically arranged with respect to the optical axis of said corresponding auxiliary lens, and said means for forming an image of each said projecting optical system which is not associated with one of said mirrors is symmetrically arranged with respect to the optical axis of said corresponding auxiliary lens.

23. The projector of claim 21, wherein said means for forming an image of each said projecting optical system associated with one of said mirrors, is asymmetrically arranged with respect to the optical axis of said corresponding auxiliary lens, and said means for forming an image of each said projecting optical system which is not associated with one of said mirrors is symmetrically arranged with respect to the optical axis of said corresponding auxiliary lens.

* * * * *